United States Patent
Reece et al.

(10) Patent No.: US 9,630,462 B2
(45) Date of Patent: Apr. 25, 2017

(54) VIBRATING TIRE INFLATOR

(71) Applicant: Android Industries LLC, Auburn Hills, MI (US)

(72) Inventors: Robert Reece, Clarkston, MI (US); Barry A. Clark, Ortonville, MI (US); David H. Larson, Swartz Creek, MI (US); Ramsey Richard Niazy, Clarkston, MI (US); Donald G. Straitiff, Howell, MI (US); Lawrence J. Lawson, Troy, MI (US); Joshua J. Hicks, Clarkston, MI (US)

(73) Assignee: Android Industries LLC, Auburn Hills, MI (US)

( * ) Notice: Subject to any disclaimer, the term of this patent is extended or adjusted under 35 U.S.C. 154(b) by 295 days.

(21) Appl. No.: 14/252,500

(22) Filed: Apr. 14, 2014

(65) Prior Publication Data

US 2014/0305598 A1 Oct. 16, 2014

Related U.S. Application Data

(60) Provisional application No. 61/909,068, filed on Nov. 26, 2013, provisional application No. 61/887,806, filed on Oct. 7, 2013, provisional application No. 61/812,391, filed on Apr. 16, 2013.

(51) Int. Cl.
*B60C 25/14* (2006.01)

(52) U.S. Cl.
CPC ................... *B60C 25/145* (2013.04)

(58) Field of Classification Search
CPC ............................ B60C 25/145; B60C 25/132

USPC .................................................... 157/1.17
See application file for complete search history.

(56) References Cited

U.S. PATENT DOCUMENTS

| | | | | |
|---|---|---|---|---|
| 2,648,374 A | * | 8/1953 | Qualen | B60C 25/132 157/1.1 |
| 4,886,101 A | * | 12/1989 | Kinnick | G01M 17/022 157/1 |
| 6,176,288 B1 | * | 1/2001 | Kane | B60C 25/00 157/1 |
| 6,249,954 B1 | * | 6/2001 | Kawabe | B60B 29/00 269/236 |
| 6,324,753 B1 | | 12/2001 | Naruse | |
| 6,557,610 B2 | * | 5/2003 | Koerner | B60C 25/145 157/1 |
| 7,367,375 B2 | | 5/2008 | Lawson et al. | |
| 7,640,963 B2 | | 1/2010 | Lawson et al. | |
| 2002/0001103 A1 | | 1/2002 | Moreau et al. | |
| 2005/0006031 A1 | | 1/2005 | Pellerin et al. | |

(Continued)

OTHER PUBLICATIONS

International Search Report for Application PCT/US2014/034143 dated Aug. 19, 2014.

*Primary Examiner* — Hadi Shakeri
(74) *Attorney, Agent, or Firm* — Honigman Miller Schwartz and Cohn LLP

(57) ABSTRACT

An apparatus for processing a tire-wheel assembly including a tire and a wheel that removes entrapments between a bead seat of the wheel and bead of the tire is disclosed. The apparatus includes a tire-wheel assembly exerciser having a tire-engaging portion. The tire-engaging portion includes at least one tire-engaging device that is adjustably-connected to a base portion. A system is disclosed. A method is also disclosed.

20 Claims, 42 Drawing Sheets

(56) References Cited

U.S. PATENT DOCUMENTS

| | | | |
|---|---|---|---|
| 2006/0169415 A1* | 8/2006 | Lawson | B60C 25/132 157/1.1 |
| 2010/0263801 A1 | 10/2010 | Lawson et al. | |
| 2012/0205054 A1 | 8/2012 | Kirstatter | |

* cited by examiner

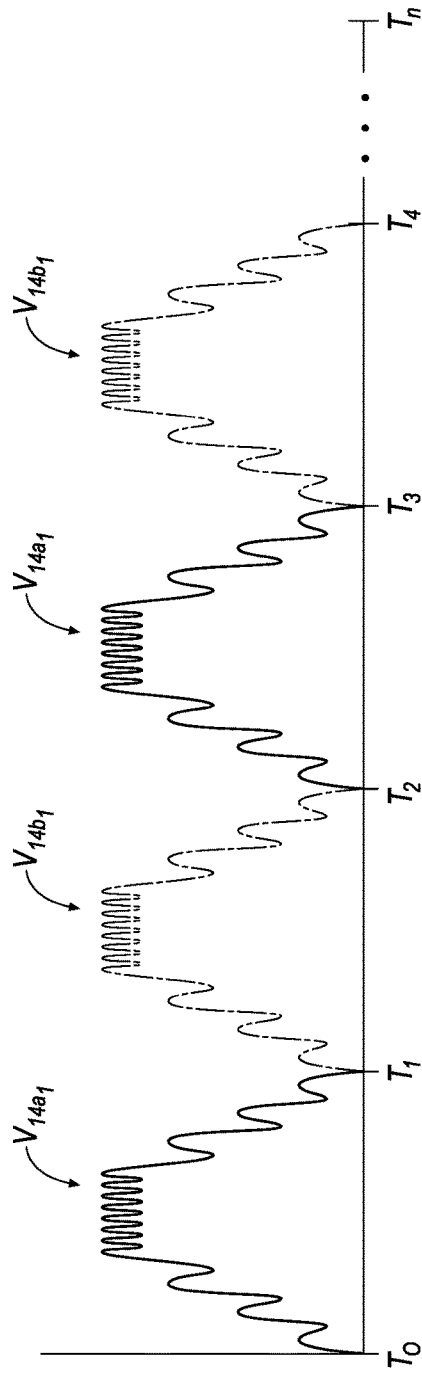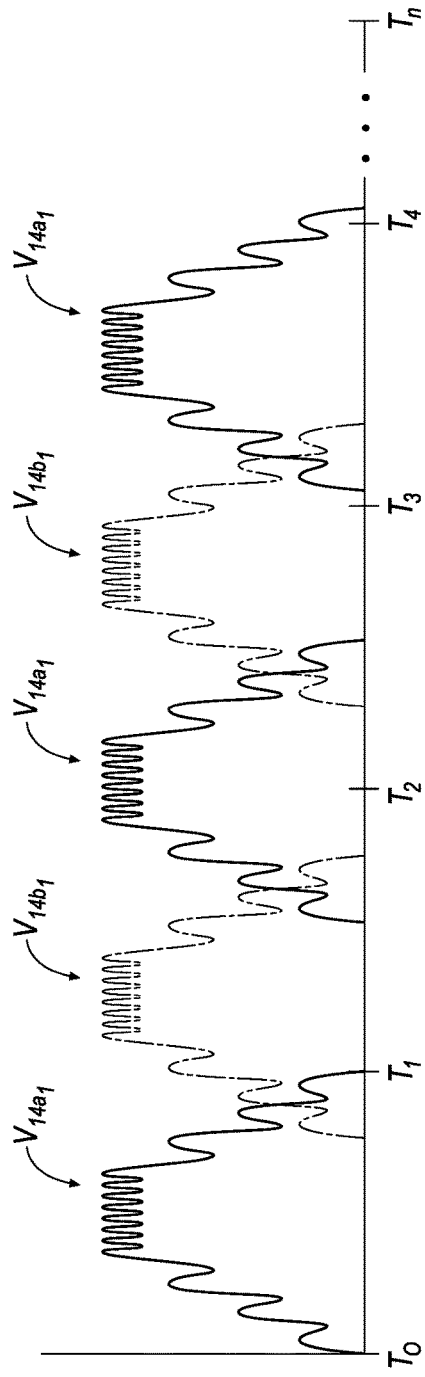

VIBRATING TIRE INFLATOR

RELATED APPLICATIONS

This application claims the benefit of U.S. Provisional Application Ser. No. 61/812,391 filed on Apr. 16, 2013; U.S. Provisional Application Ser. No. 61/887,806 filed on Oct. 7, 2013; and U.S. Provisional Application Ser. No. 61/909,068 filed on Nov. 26, 2013 which is entirely incorporated herein by reference.

FIELD OF THE INVENTION

The disclosure relates to tire-wheel assemblies and to an apparatus, system and method for assembling a tire-wheel assembly.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method for assembling a tire-wheel assembly.

BRIEF DESCRIPTION OF THE DRAWINGS

The disclosure will now be described, by way of example, with reference to the accompanying drawings, in which:

FIG. 11 is an exemplary graph representing curves related to vibrations imparted to a tire-wheel assembly by the apparatus of FIG. 8.

FIG. 12 is another exemplary graph representing curves related to vibrations imparted to a tire-wheel assembly by the apparatus of FIG. 8.

SUMMARY

Figure 1A:
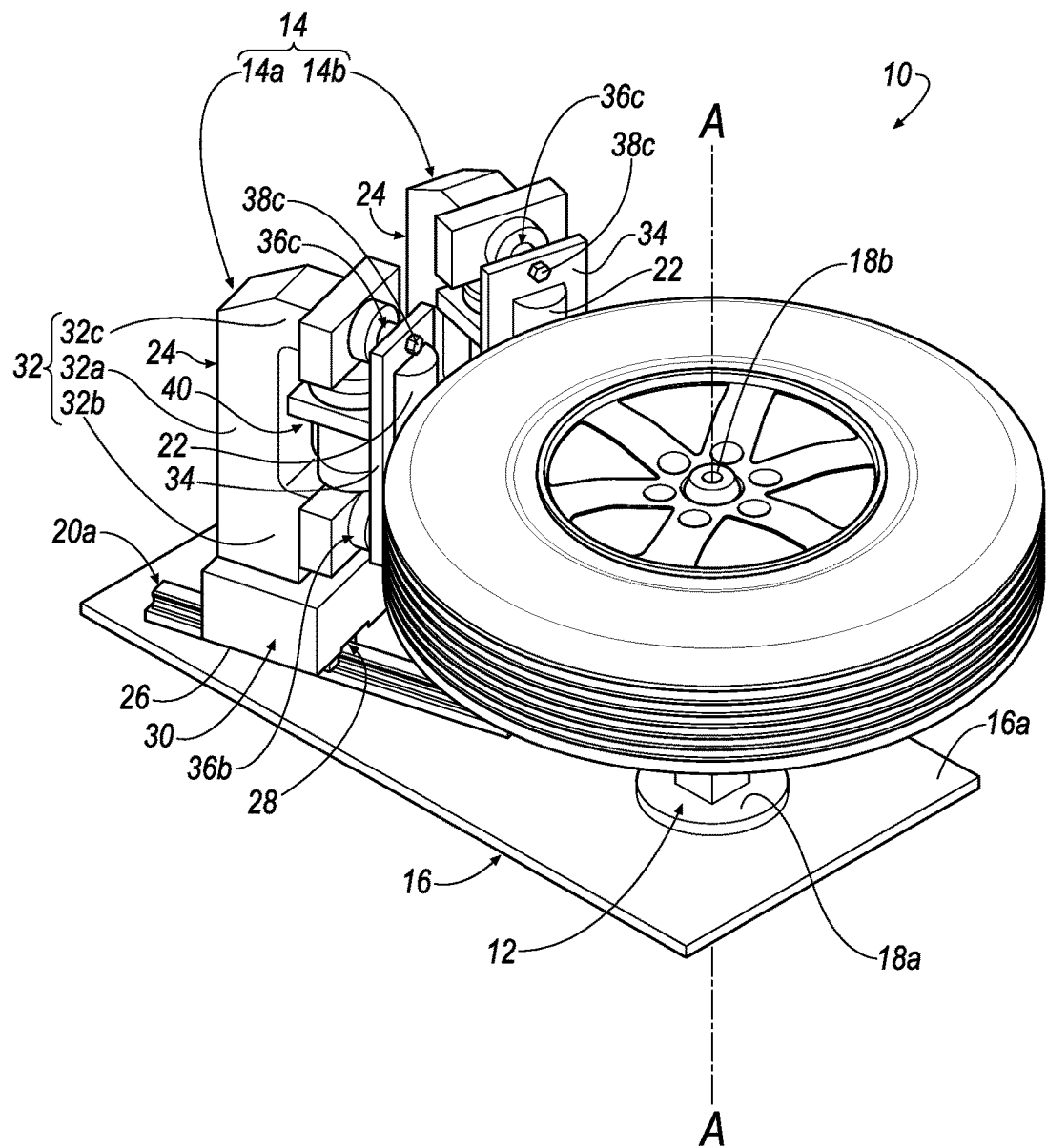
FIG. 1A is a perspective view of an apparatus for processing a tire and a wheel in accordance with an exemplary embodiment of the invention.

One aspect of the disclosure provides an apparatus for processing a tire-wheel assembly including a tire and a wheel that removes entrapments between a bead seat of the wheel and bead of the tire. The apparatus includes a tire-wheel assembly exerciser having a tire-engaging portion. The tire-engaging portion includes at least one tire-engaging device that is adjustably-connected to a base portion.

In some implementations, the at least one tire-tread-engaging device is slidably-arranged upon at least one guide track that is connected to an upper surface of the base portion.

In some examples, the at least one tire-tread-engaging device includes a first tire-tread-engaging device and a second tire-tread-engaging device. The at least one guide track includes a first guide track and a second guide track. The first guide track is aligned with a first radius that projects away from a central axis extending through an axis of rotation of the wheel. The second guide track is aligned with a second radius that projects away from the central axis. The first radius is offset from the second radius at an angle. The first tire-tread-engaging device is selectively slidably-arranged upon the first guide track radially toward or radially away from the central axis. The second tire-tread-engaging device is selectively slidably-arranged upon the second guide track radially toward or radially away from the central axis.

In some instances, the angle is equal to approximately 30°.

In some implementations, each of the first and second tire-tread-engaging devices include a tire-tread-engaging member for engaging a tread surface of the tire and a support member connected to the tire-tread-engaging member.

In some examples, the support member includes a neck portion, a head portion, an elongated support plate, a first resilient coupling, a second resilient coupling and a vibration source. The head portion is connected to the neck portion. The head portion includes an elongated base portion that terminates with a proximal flange portion and a distal flange portion. The elongated support plate is connected to the head portion and has a radially-inwardly-facing surface and a radially-outwardly-facing surface. The first resilient coupling is disposed between the radially-outwardly-facing surface of the elongated support plate and the proximal flange portion of the head portion for resiliently-connecting the proximal flange portion of the head portion to the radially-outwardly-facing surface of the elongated support plate. The second resilient coupling is disposed between the radially-outwardly-facing surface of the elongated support plate and the distal flange portion of the head portion for resiliently-connecting the distal flange portion of the head portion to the radially-outwardly-facing surface of the elongated support plate. The vibration source is attached to the radially-outwardly-facing surface of the elongated support plate. The tire-tread-engaging member is attached to the radially-inwardly-facing surface of the elongated support plate.

In some instances, a proximal end of the support member formed by the neck portion includes a female portion that slidably-mates with the first guide track or the second guide track.

In some implementations, the first and second resilient couplings include an elastomeric material.

In some examples, the first and second resilient couplings include a spring member.

In some instances, the apparatus includes means for controlling and actuating slidable movement of the first and second tire-tread-engaging devices radially toward or radially away from the central axis.

In some implementations, the apparatus includes means for controlling and actuating the first and second tire-tread-engaging devices for achieving a resonant vibrational response imparted to the tire-wheel assembly.

In some examples, the tire-wheel assembly exerciser further includes a wheel-engaging portion. The wheel-engaging portion includes a stem member having a proximal end and a distal end. An axis extends through the stem member.

In some instances, the wheel-engaging portion is connected to the base portion. The proximal end of the stem member is connected to the upper surface of the base portion. The axis is orthogonal to the upper surface of the base portion.

Another aspect of the disclosure provides a system for processing a tire-wheel assembly including a tire and a wheel that removes entrapments between a bead seat of the wheel and bead of the tire. The system includes a tire-wheel assembly exerciser, a wheel-engaging portion and an inflator device. The wheel-engaging portion is arranged relative to the tire-wheel assembly exerciser such that a tread surface of the tire is radially-aligned with the tire-wheel assembly exerciser. The wheel-engaging portion supports the wheel of the tire-wheel assembly about central axis extending through an axis of rotation of the wheel. The inflator device axially arranged relative to the wheel-engaging portion for inflating the tire-wheel assembly.

In some implementations, the wheel-engaging portion is a conveyor.

In some examples, the wheel-engaging portion is a distal end of a robotic arm.

In some instances, the system includes means for controlling and actuating slidable movement of the first and second tire-tread-engaging devices radially toward or radially away from the central axis.

In some implementations, the system includes means for controlling and actuating the first and second tire-tread-engaging devices and inflator device for achieving a resonant vibrational response imparted to the tire-wheel assembly during actuation of the inflator device before the bead of the tire is disposed adjacent the bead seat of the wheel.

In some examples, the system includes means for controlling and actuating the first and second tire-tread-engaging devices and inflator device for achieving a resonant vibrational response imparted to the tire-wheel assembly after deactivation of the inflator device when the bead of the tire is disposed adjacent the bead seat of the wheel.

In some instances, the system includes means for controlling and actuating the first and second tire-tread-engaging devices and inflator device for achieving a resonant vibrational response imparted to the tire-wheel assembly during actuation of the inflator device before the bead of the tire is disposed adjacent the bead seat of the wheel and after deactivation of the inflator device when the bead of the tire is disposed adjacent the bead seat of the wheel.

In yet another aspect of the disclosure, a method for processing a tire-wheel assembly including a tire and a wheel for removing entrapments between a bead seat of the wheel and bead of the tire includes the steps of: mounting a tire to a wheel for forming a tire-wheel assembly; and disposing a portion of a tire-wheel assembly exerciser adjacent a tread surface of the tire; and actuating the tire-wheel assembly exerciser for achieving a resonant vibrational response imparted to the tire-wheel assembly.

In some implementations, the actuating step includes arranging the tire-wheel assembly exerciser in an activated state. The activated state includes repeatedly cycling a vibration source of the tire-wheel assembly exerciser in an on state and an off state.

In some examples, the method includes the steps of aligning a first tire-tread-engaging device of the tire-wheel assembly exerciser with a first radius that projects away from a central axis extending through an axis of rotation of the wheel; aligning a second tire-tread-engaging device of the tire-wheel assembly exerciser with a second radius that projects away from the central axis extending through the axis of rotation of the wheel, and arranging at least one of the first tire-tread-engaging device and the second tire-tread-engaging device in an activated state by repeatedly cycling a vibration source of first tire-tread-engaging device and the second tire-tread-engaging device in an on state and an off state. The first radius is offset from the second radius at an angle. The resonant vibrational response imparted to the tire-wheel assembly includes vibrating the tire for shaping the tire to include a plurality of anti-nodes that are periodically formed about the tire with nodes that are located between adjacent anti-nodes.

In some instances, the actuating the tire-wheel assembly exerciser step occurs when a bead of the tire is firstly arranged in a spaced apart relationship with a bead seat of the wheel.

In some implementations, the method includes the step of actuating an inflator device for at least partially inflating the tire-wheel assembly and shifting an orientation of the bead of the tire relative the wheel such that the bead of the tire is secondly arranged in an engaged relationship with the bead seat of the wheel.

In some examples, the method includes the steps of deactivating the inflator device; and continuing the actuating of the tire-wheel assembly exerciser step for continuously achieving the resonant vibrational response imparted to the tire-wheel assembly after the inflator device has been deactivated.

Another aspect of the disclosure provides an apparatus for processing a tire-wheel assembly including a tire and a wheel that removes entrapments between a bead seat of the wheel and bead of the tire. The apparatus includes a tire-wheel assembly exerciser having a tire-engaging portion. The tire-engaging portion includes at least one pair of tire-engaging devices that are adjustably-connected to a base portion.

In some implementations, the at least one pair of tire-engaging devices includes: a first pair tire-engaging devices. A first tire-engaging device of the first pair tire-engaging devices is an 'active' tire-tread-engaging device and includes a vibration source. A second tire-engaging device of the first pair tire-engaging devices is a passive tire-tread-engaging device and includes a biasing member.

In some examples, the first tire-engaging device is aligned with a first radius that projects away from a central axis that extends through an axis of rotation of the wheel. The second tire-engaging device is aligned with a second radius that projects away from the central axis that extends through the axis of rotation of the wheel. The first radius is offset from the second radius at an angle.

In some instances, the at least one pair of tire-engaging devices includes: a second pair tire-engaging devices. The first tire-engaging device of the first pair tire-engaging devices is an 'active' tire-tread-engaging device and includes a vibration source. A second tire-engaging device of the first pair tire-engaging devices is a passive tire-tread-engaging device and includes a biasing member.

In some implementations, the first tire-engaging device is aligned with a third radius that projects away from the central axis that extends through the axis of rotation of the wheel. The second tire-engaging device is aligned with a fourth radius that projects away from the central axis that extends through the axis of rotation of the wheel. The third radius is offset from the fourth radius at an angle.

In some examples, each tire-tread-engaging device of the at least one pair of tire-tread-engaging devices is slidably-arranged upon a guide track that is connected to an upper surface of the base portion. The base portion includes a cart and a docking station. The upper surface is a surface of the docking station.

In some instances, each tire-tread-engaging device of the at least one pair of tire-tread-engaging devices include: a tire-tread-engaging member for engaging a tread surface of the tire and a support member connected to the tire-tread-engaging member.

In some implementations, the support member includes a neck portion and a head portion connected to the neck portion. The head portion includes an elongated base portion that terminates with a proximal flange portion and a distal flange portion. An elongated support plate is connected to the head portion and has a radially-inwardly-facing surface and a radially-outwardly-facing surface. A first resilient coupling is disposed between the radially-outwardly-facing surface of the elongated support plate and the proximal flange portion of the head portion for resiliently-connecting the proximal flange portion of the head portion to the radially-outwardly-facing surface of the elongated support plate. A second resilient coupling is disposed between the radially-outwardly-facing surface of the elongated support plate and the distal flange portion of the head portion for resiliently-connecting the distal flange portion of the head portion to the radially-outwardly-facing surface of the elongated support plate, A vibration source is attached to the radially-outwardly-facing surface of the elongated support plate. The tire-tread-engaging member is attached to the radially-inwardly-facing surface of the elongated support plate.

In some examples, a proximal end of the support member formed by the neck portion includes: a female portion that slidably-mates with the first guide track or the second guide track.

In some instances, the first and second resilient couplings include an elastomeric material.

In some implementations, the first and second resilient couplings include a spring member.

In some examples, the apparatus includes means for controlling and actuating slidable movement of the first and second tire-tread-engaging devices radially toward or radially away from the central axis.

In some instances, the apparatus includes means for controlling and actuating the first and second tire-tread-engaging devices for achieving a resonant vibrational response imparted to the tire-wheel assembly.

In some implementations, the tire-wheel assembly exerciser further includes a wheel-engaging portion. The wheel-engaging portion includes a stem member having a proximal end and a distal end. An axis extends through the stem member. The proximal end of the stem member is removably-joined to an opening formed by the wheel.

In yet another aspect of the disclosure, a method for processing a tire-wheel assembly including a tire and a wheel for removing entrapments between a bead seat of the wheel and bead of the tire includes the steps of: mounting a tire to a wheel for forming a tire-wheel assembly; disposing a portion of a tire-wheel assembly exerciser adjacent a tread surface of the tire; actuating the tire-wheel assembly exerciser for achieving a resonant vibrational response imparted to the tire-wheel assembly; utilizing the tire-wheel assembly exerciser for clamping the tire in order to prevent axial movement of the tire; and utilizing a wheel-engaging portion connected to the wheel for axially-adjusting an orientation of the wheel while the tire is axially-fixed as a result of the tire-wheel assembly exerciser clamping the tire.

In some implementations, the axially-adjusting an orientation of the wheel step includes: axially moving the wheel relative the tire in a first axial direction, and axially moving the wheel relative the tire in a second axial direction. The second axial direction is opposite the first axial direction.

In some examples, the actuating step includes: arranging the tire-wheel assembly exerciser in an activated state, wherein the activated state includes repeatedly cycling a vibration source of the tire-wheel assembly exerciser in an on state and an off state.

In some instances, the method includes the steps of aligning a first tire-tread-engaging device of the tire-wheel assembly exerciser with a first radius that projects away from a central axis extending through an axis of rotation of the wheel; aligning a second tire-tread-engaging device of the tire-wheel assembly exerciser with a second radius that projects away from the central axis extending through the axis of rotation of the wheel. The first radius is offset from the second radius at a first angle. The method also includes the step of arranging the first tire-tread-engaging device in an activated state by repeatedly cycling a vibration source of first tire-tread-engaging device in an on state and an off state while the second tire-tread-engaging device passively responds to the vibration source of first tire-tread-engaging device. The resonant vibrational response imparted to the tire-wheel assembly includes: vibrating the tire for shaping the tire to include a plurality of anti-nodes that are periodically formed about the tire with nodes that are located between adjacent anti-nodes.

In some implementations, the method includes the steps of aligning a third tire-tread-engaging device of the tire-wheel assembly exerciser with a third radius that projects away from the central axis extending through the axis of rotation of the wheel; aligning a fourth tire-tread-engaging device of the tire-wheel assembly exerciser with a fourth radius that projects away from the central axis extending through the axis of rotation of the wheel. The third radius is offset from the fourth radius at a second angle. The method also includes the step of arranging the third tire-tread-engaging device in an activated state by repeatedly cycling a vibration source of third tire-tread-engaging device in an on state and an off state while the fourth tire-tread-engaging device passively responds to the vibration source of third tire-tread-engaging device. The resonant vibrational response imparted to the tire-wheel assembly includes: vibrating the tire for shaping the tire to include a plurality of anti-nodes that are periodically formed about the tire with nodes that are located between adjacent anti-nodes.

In some examples, the actuating the tire-wheel assembly exerciser step occurs just prior to, during or after when beads of the tire are arranged adjacent to bead seats of the wheel as a result of actuating an inflator device.

In some instances, the method includes the step of: deactivating the inflator device prior to utilizing the wheel-engaging portion connected to the wheel for axially-adjusting an orientation of the wheel.

DETAILED DESCRIPTION OF THE INVENTION

The Figures illustrate exemplary embodiments of apparatuses and methods for assembling a tire-wheel assembly. Based on the foregoing, it is to be generally understood that the nomenclature used herein is simply for convenience and the terms used to describe the invention should be given the broadest meaning by one of ordinary skill in the art.

Prior to describing embodiments of the invention, reference is made to FIGS. 17A-17D, which illustrate an exemplary tire, T. Further, in describing embodiments of the invention in the present disclosure, reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure (e.g., of one or more components of the apparatus 10 or robotic arm 104) that supports/engages the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 17A), a lower sidewall surface, $T_{SL}$, (see, e.g., FIG. 17D), and a tread surface, $T_T$ (see, e.g., FIGS. 17B-17C), that joins the upper sidewall surface, $T_{SU}$, to the lower sidewall surface, $T_{SL}$. Referring to FIG. 17B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$. The tread surface, $T_T$, may also define a height, $T_H$, of the tire, T, that extends between the upper sidewall surface, $T_{SU}$, and the lower sidewall surface, $T_{SL}$.

As seen in FIG. 17B, when the tire, T, is in a relaxed, unbiased state, the upper bead, $T_{BU}$, forms a circular, upper tire opening, $T_{OU}$; similarly, when the tire, T, is in a relaxed, unbiased state, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include a non-circular shape, such as, for example, an oval shape.

Referring to FIG. 17B, when in the relaxed, unbiased state, each of the upper tire opening, $T_{OU}$, and the lower tire opening, $T_{OL}$, form, respectively, an upper tire opening diameter, $T_{OU-D}$, and a lower tire opening diameter, $T_{OL-D}$. Further, as seen in FIGS. 17A-17B, when in the relaxed, unbiased state, the upper sidewall surface, $T_{SU}$, and the lower sidewall surface, $T_{SL}$, define the tire, T, to include a tire diameter, $T_D$.

Figure 17A:
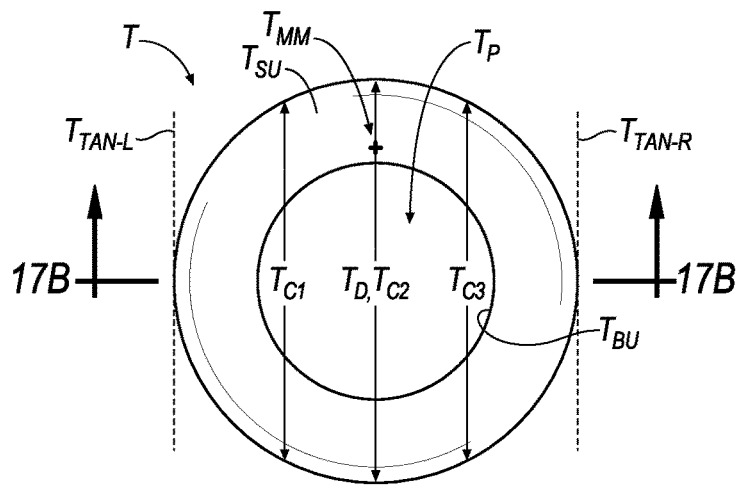
FIG. 17A is a top view of an exemplary tire.
Figure 17B:
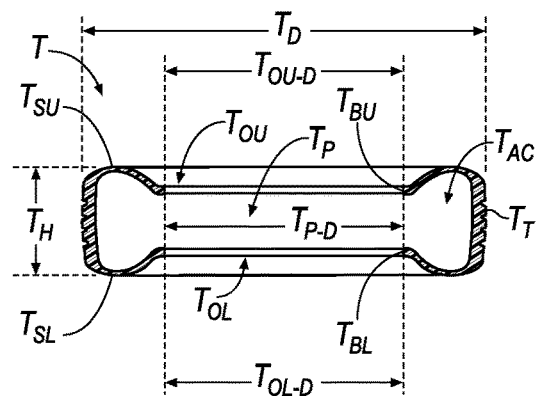
FIG. 17B is a cross-sectional view of the tire according to line 17B-17B of FIG. 17A.
Figure 17C:
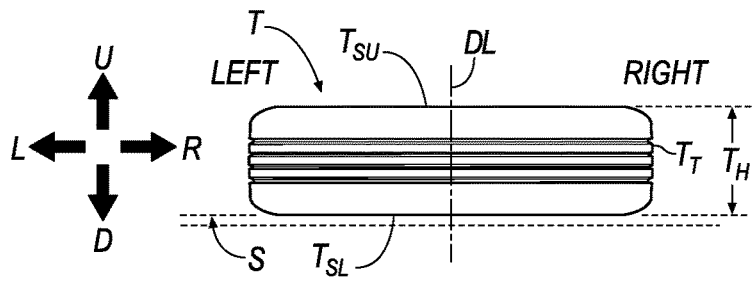
FIG. 17C is a side view of the tire of FIG. 17A.
Figure 17D:
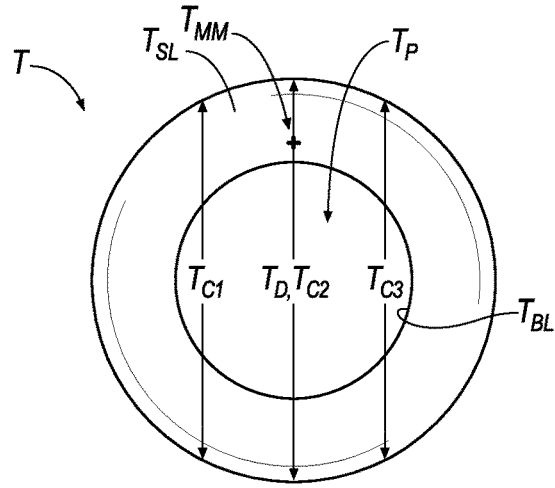
FIG. 17D is a bottom view of the tire of FIG. 17A.

Referring to FIGS. 17A-17B and 17D, the tire, T, also includes a passage, T. Access to the passage, $T_P$, is permitted by either of the upper tire opening, $T_{OU}$, and the lower tire opening, $T_{OL}$. Referring to FIG. 17B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 17B, the tire, T, includes a circumferential air cavity, $T_{AC}$, that is in communication with the passage, $T_P$. After joining the tire, T, to a wheel, W, pressurized air is deposited into the circumferential air cavity, $T_{AC}$, for inflating the tire, T.

Further, when the tire, T, is arranged adjacent structure or a wheel, W (see, e.g., FIGS. 18A-18B), as described in the following disclosure, the written description may reference a "left" portion or a "right" portion of the tire, T. Referring to FIG. 17C, the tire, T, is shown relative to a support member, S; the support member, S, is provided (and shown in phantom) in order to establish a frame of reference for the "left" portion and the "right" portion of the tire, T. In FIG. 17C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center dividing line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 17A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$/tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth (¼) of the tire diameter, $T_D$, from the left tire tangent line, $T_{TAN-L}$. The right chord, $T_{C3}$, is spaced apart approximately one-fourth (¼) of the tire diameter, $T_D$, from the right tire tangent line, $T_{TAN-R}$. Each of the left and right tire chords, $T_{C1}$, $T_{C3}$, may be spaced apart about one-fourth (¼) of the tire diameter, $T_D$, from the central chord, $T_{C2}$. The above spacings referenced from the tire diameter, $T_D$, are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 17C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Figure 18A:
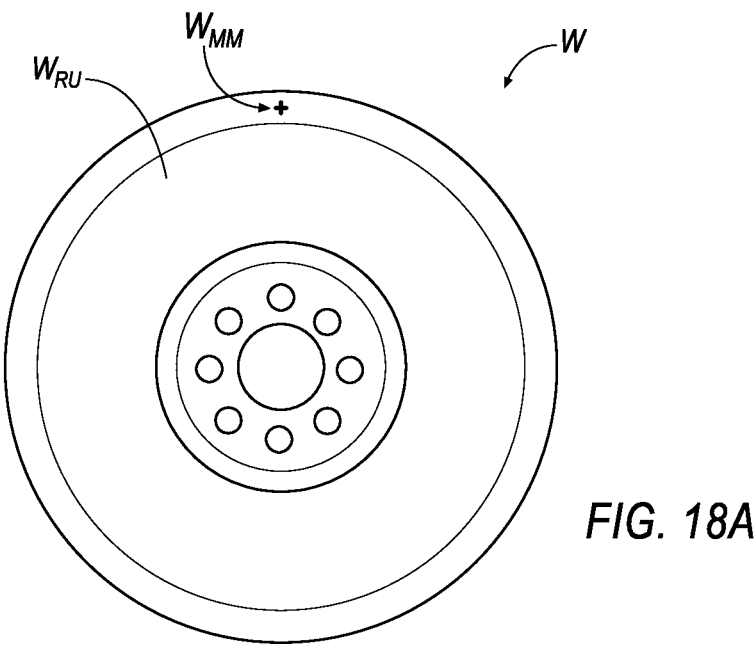
FIG. 18A is a top view of an exemplary wheel.
Figure 18B:
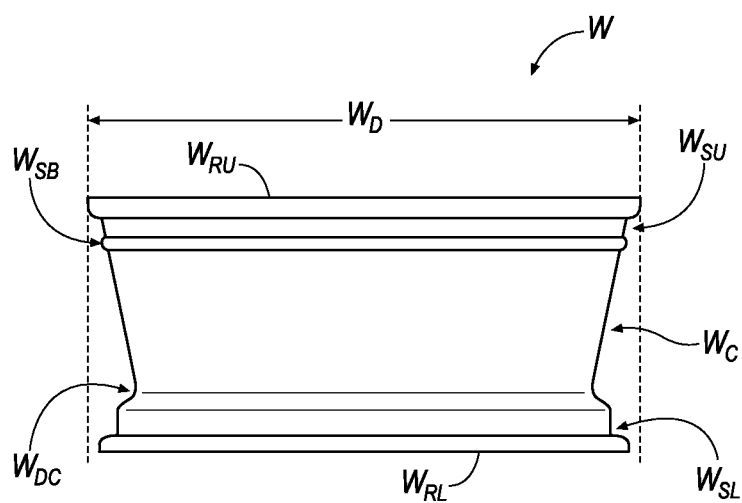
FIG. 18B is a side view of the wheel of FIG. 18A.

Prior to describing embodiments of the invention, reference is made to FIGS. 18A-18B, which illustrate an exemplary wheel, W. Further, in describing embodiments of the invention in the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure (e.g., of one or more components of the apparatus 10 or robotic arm 104) that supports/engages the wheel, W. Accordingly, the above nomenclature should not be utilized to limit the scope of the claimed invention and is utilized herein for exemplary purposes in describing an embodiment of the invention.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 18B, upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

Figure 20B:
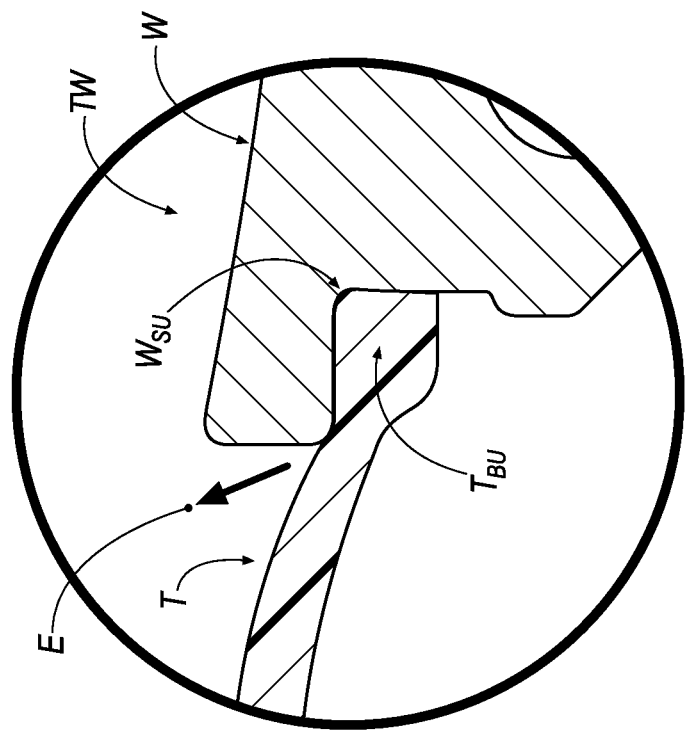
FIG. 20B is another enlarged, cross-sectional view of the inflated tire-wheel assembly of FIG. 20A without with entrapment of FIG. 20A.
Figure 20A:
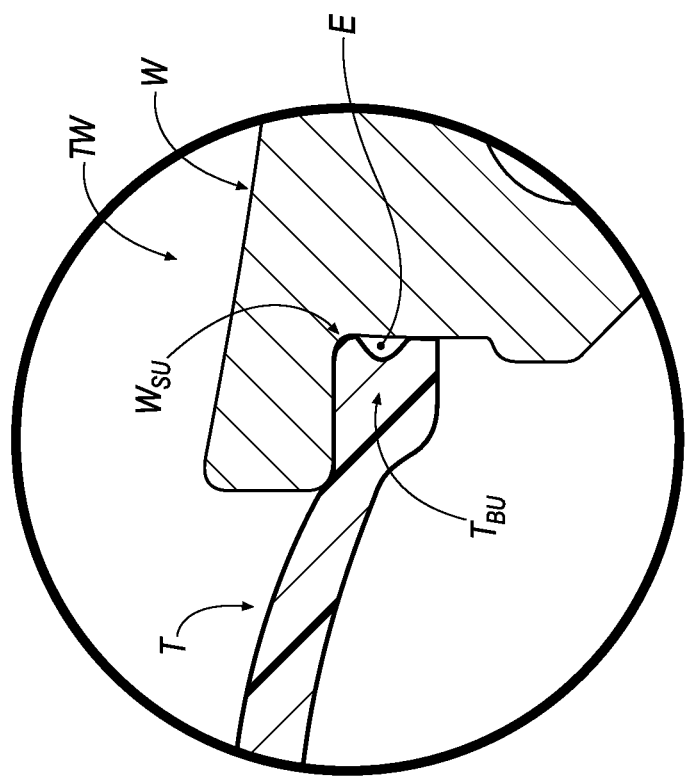
FIG. 20A is an enlarged, cross-sectional view of a portion of an inflated tire-wheel assembly including an entrapment.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, W. Upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$. In some circumstances, after inflation of the tire, T, entrapments, E (see, e.g., FIG. 20A), such as, for example, contaminants, lubricant or the like, may be trapped between the bead, $T_{BU}$/$T_{BL}$, of the tire, T, and the bead seat $W_{SU}$/$W_{SL}$ of the wheel, W; the entrapments, E, may be removed after the inflated tire-wheel assembly, TW, is subjected to a bead exerciser (see, e.g., the apparatus 10).

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere, the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

With reference now to FIGS. 17A and 18A, physical attributes of the tire, T, and the wheel, W, are described. It should be noted that the discussed physical attributes may be inherent aspects/characteristics of each of the tire, T, and the wheel, W, which may arise from, for example, a manufacturing technique (e.g., molding, casting or the like) of each of the tire, T, and the wheel, W.

As seen in FIG. 17A, the tire, T, may include an inherent physical attribute that is referred to as a "high point of radial force variation" (see $T_{MM}$). When the tire, T, is in use, the high point of radial force variation may be described as a region of the tire, T, where there is a fluctuation in force that appears in the rotating axis of the tire, T, when a specific load is applied, and, when the tire, T, is rotated at a specific speed.

Referring to FIG. 18A, the wheel, W, may include an inherent physical attribute that is referred to as a "point of minimum radial run out" (see $W_{MM}$). To a certain extent, about every wheel, W, may be manufactured with an inherent imperfection (which may arise from, for example, material distribution and/or flow of material during the manufacturing process of the wheel, W). Accordingly, the imperfection of the wheel, W, may result in the wheel, W, being "out-of-round," or, having a "run-out" (i.e., the wheel, W, therefore, may include the aforementioned "point of minimum radial run out").

Figure 19:
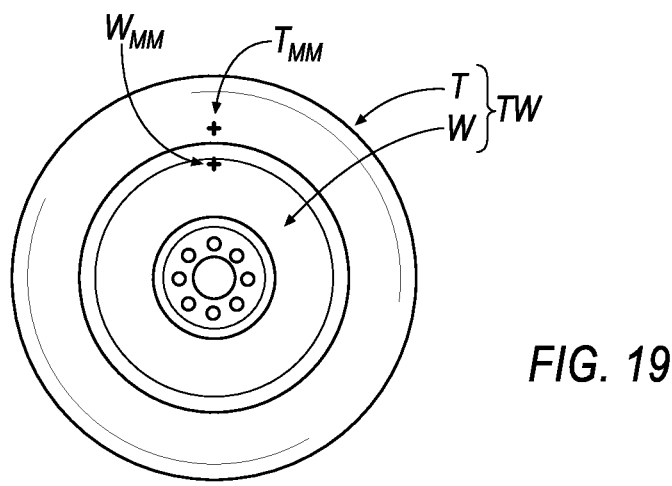
FIG. 19 is a top view of the tire of FIGS. 17A-17D joined to the wheel of FIGS. 18A-18B.

When the tire, T, and the wheel, W, are joined (i.e., mounted) together as seen in FIG. 19, it may be desirable to align (or match) the high point of radial force variation, $T_{MM}$, of the tire, T, with the point of minimum radial run out, $W_{MM}$, of the wheel, W. The alignment or "matching" described above may, for example, improve stability of a vehicle to which a tire-wheel assembly, TW, is joined to and/or mitigate abnormal tread-wear patterns to the tire, T. The alignment or "matching" of the high point of radial force variation of the tire, T, with the point of minimum radial run out of the wheel, W, may be referred to as a "uniformity method" of "match mounting."

If, however, one or more of the high point of radial force variation, $T_{MM}$, of the tire, T, and the point of minimum radial run out, $W_{MM}$, of the wheel, W, are not determined or identified by, for example, an original equipment supplier, at the time the tire, T, and the wheel, W, are to be joined (i.e., mounted) together, one (e.g., a person or business entity) may have to determine or locate a point of lightest weight (see $T_{MM}$) of the tire, T, and/or a point of heaviest weight (see $W_{MM}$) of the wheel, W; upon determining/locating the above-described lightest/heaviest points, a substantially similar alignment/"matching" is conducted as described above prior to joining (i.e., mounting) the tire, T, and the wheel, W. In some circumstances, if a valve-stem hole (see $W_{MM}$) is provided on the wheel, W, the point of lightest weight of the tire, T, may be aligned with the valve stem hole on the wheel, W (rather than aligning the point of lightest weight of the tire, T, with the point of heaviest weight of the wheel, W). The alignment of the point of lightest weight of the tire, T, with the valve stem hole/point of heaviest weight of the wheel, W, may be referred to as a "weight method" of "match mounting."

For purposes of describing an embodiment of either of the "uniformity method" or the "weight method" of "match mounting," reference is made to FIGS. 17A, 18A and 19 where: 1) a region of the tire, T, is identified by the reference numeral "$T_{MM}$" and 2) a region of the wheel, W, is identified by the reference numeral "$W_{MM}$." The subscript "MM" for each of the reference numerals $T_{MM}$ and $W_{MM}$ may generally stand for "match mark," and, may be utilized in one of the "uniformity method" or "weight method" for "match mounting" the tire, T, and the wheel, W, together to form a "match-mounted" tire-wheel assembly, TW. Accordingly, if a "uniformity method" is employed in the described match mounting embodiment: 1) the reference numeral "$T_{MM}$" may stand for a region of high point of radial force variation of the tire, T, and 2) the reference numeral $W_{MM}$ may stand for a region of point of minimum radial run out of the wheel, W. Alternatively, if a "weight method" is employed in the described match mounting embodiment: 1) the reference numeral "$T_{MM}$" may stand for a point of lightest weight of the tire, T, and 2) the reference numeral $W_{MM}$ may stand for a point of heaviest weight of the wheel, W, or, a location of a valve stem hole of the wheel, W.

In describing one or more of the match mounting embodiments of the invention, the illustrated "dot" or "spot" seen in the Figures that the reference signs, $T_{MM}$, and, $W_{MM}$, point to should not be construed to be limited to a physical/visible/tactile markings on one or more of the tire, T, and the wheel, W. In some conventional match-marking/match-mounting systems/methodologies, the tire, T, and the wheel, W, may include, for example, a physical marking, object or the like, such as, for example, a paint dot, a tag, a sticker, an engraving, an embossment or the like that is applied to or formed in, upon or within a surface or body portion of one or more of a tire, T, and a wheel, W. However, in one or more alternative embodiments of the present invention, match-mounting techniques may not include any kind of or type of a physical/visible/tactile marking applied to either of the tire, T, and the wheel, W; accordingly, one of, or, many benefits realized by the present invention may be that additional material, time or steps associated with the application and/or formation of the physical marking, object or the like upon one or more of the tire, T, and the wheel, W, is obviated, thereby realizing a cost and/or time savings benefit in the assembling of a tire-wheel assembly, TW. If a physical marking, object or the like is not included on either of the tire, T, and the wheel, W, the spatial region of where the physical marking, object or the like may otherwise be located may be initially unknown to a processing apparatus, but, after one or more processing steps, the spatial region of where the physical marking, object or the like would otherwise by located may become known to/detected/learned by, for example, a computer or microprocessor associated with, for example, the apparatus.

Referring to FIG. 1A, an apparatus 10 for processing a tire-wheel assembly, TW, is shown according to an embodiment. Upon being interfaced with the apparatus 10, the tire-wheel assembly, TW, has previously been subjected to one or more processing acts. The one or more earlier processing acts may include, for example, an act of: "joining" or "mounting" a tire, T, to a wheel, W, for forming an un-inflated tire-wheel assembly, TW; the act of "joining" or "mounting" may mean to physically couple, connect or marry the tire, T, and wheel, W, such that the wheel, W, may be referred to as a male portion that is inserted into a passage, $T_P$, of the tire, T, being a female portion. The one or more earlier processing acts may also include, for example, the act of "inflating" the tire-wheel assembly, TW; the act of "inflating" may include directing air into the circumferential air cavity, $T_{AC}$ (see, e.g., FIG. 8B), of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, as seen in, for example, FIG. 11A. Therefore, upon being interfaced with the apparatus 10, in some implementations, the tire-wheel assembly, TW, may be said to be in an inflated state. In other implementations, as seen in, for example, FIGS. 6A-6E and 7A-7E, the tire-wheel assembly, TW, may not be in an inflated state upon being presented to/interfaced with the apparatus 10.

The processing act conducted by the apparatus 10 may include the act of "exercising" the tire, T, relative the wheel, W, in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively, as seen in, for example, FIG. 11B. In some circumstances, entrapments, E (see, e.g., FIG. 11A), such as, for example: air bubbles, lubricant/soap, impurities or the like may be undesirably located between a bead, $T_{BU}$/$T_{BL}$, of the tire, T, and the seat, $W_{SU}$/$W_{SL}$, of the wheel, W; by "exercising" the tire, T, relative the wheel, W, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W, as seen in, for example, FIG. 11B. Accordingly, in the following disclosure, the apparatus 10 may hereinafter be referred to as a "tire-wheel assembly exerciser."

Figure 1B:
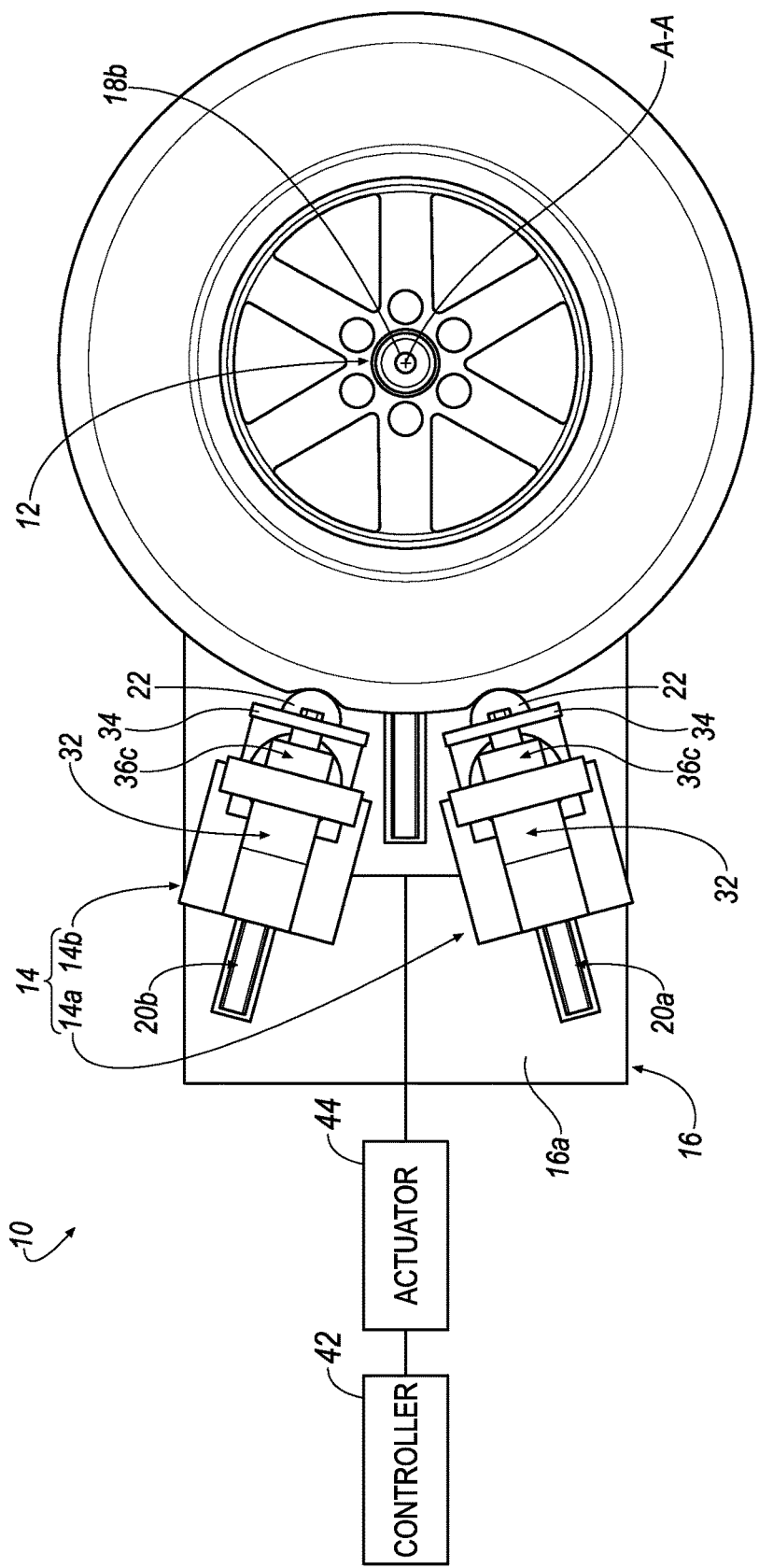
FIG. 1B is a top view of the apparatus of FIG. 1A.
Figure 1C:
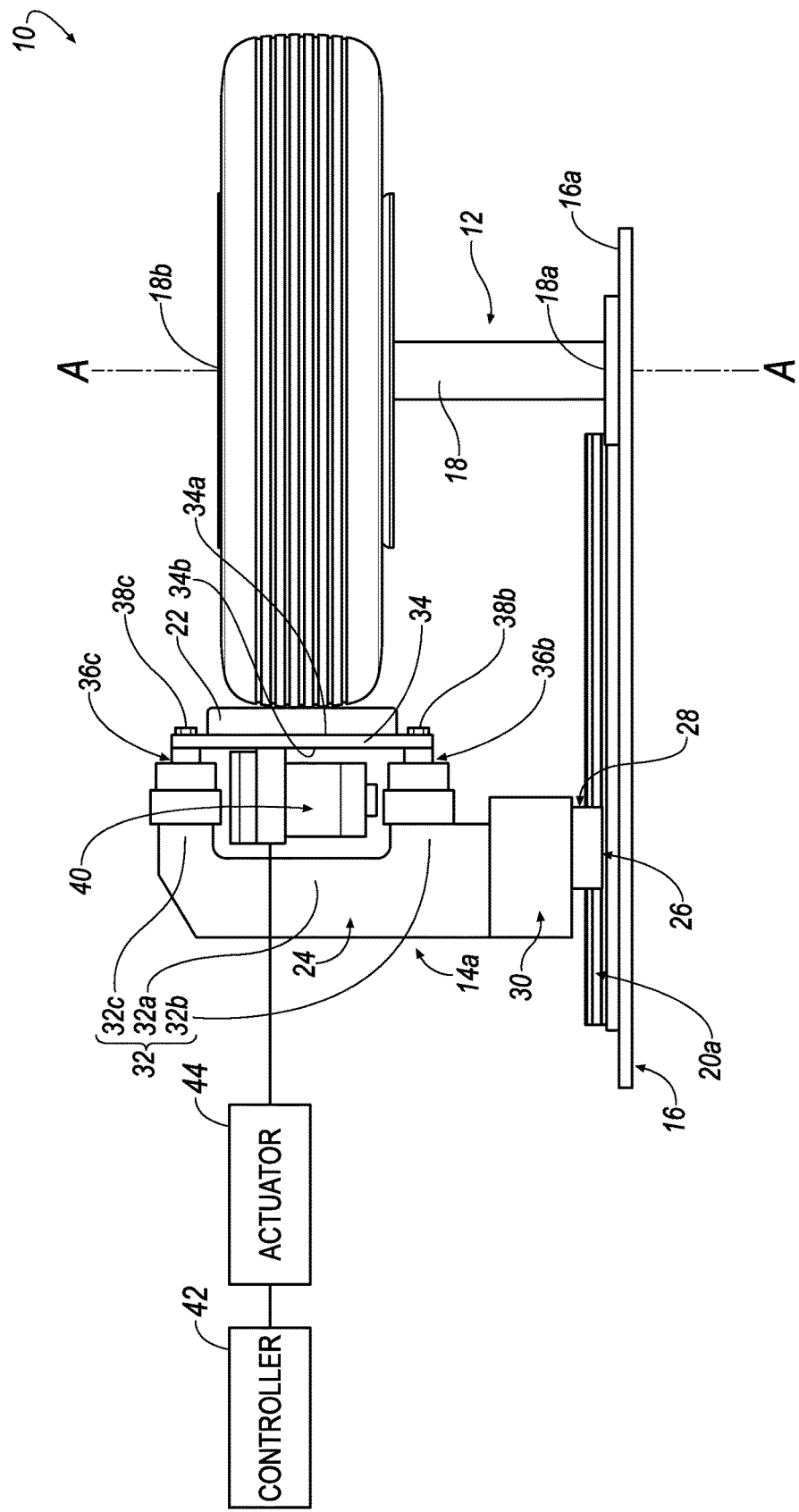
FIG. 1C is a side view of the apparatus of FIG. 1A.

Referring to FIGS. 1A-1C, some implementations of the tire-wheel assembly exerciser 10 may include at least, for example, a wheel-engaging portion 12 and a tire-engaging portion 14. Both of the wheel-engaging portion 12 and the tire-engaging portion 14 are connected to a base portion 16.

In other examples, the wheel-engaging portion 12 may not be connected to the base portion 16, and, as such, an alternative embodiment of the tire-wheel assembly exerciser 10 may not include a wheel-engaging portion 12. In some instances, when the wheel-engaging portion 12 is not connected to the base portion 16, the wheel may be directly engaged or indirectly engaged (by way of contact with the tire, T) by an alternative wheel-engaging portion, such as, for example, a transporting device (such as a conveyor) or distal end of a robotic arm (see, e.g., 104, 204 in FIGS. 6A-6E and 7A-7E, respectively). As will be explained in the following disclosure, the transporting device or robotic arm may hand-off or transport one or more of a tire, T, and a wheel, W, to sub-stations of a plurality of processing sub-stations arranged around/about the transporting device/robotic arm for contributing to acts that assemble/process the tire-wheel assembly, TW.

In an implementation as seen in FIGS. 1A-1C, the wheel-engaging portion 12 includes a stem member 18 (see, e.g., FIG. 1C) having a proximal end 18a and a distal end 18b. The proximal end 18a of the stem member 18 is connected to an upper surface 16a of the base portion 16. An axis, A-A, extends through the stem member 18; the axis, A-A, is orthogonal to the upper surface 16a of the base portion 16. Axis A-A is the axis of rotation of the tire-wheel assembly TW when it is in normal use when mounted to a vehicle.

As seen in FIGS. 1A and 1B, the tire-engaging portion 14 includes a pair of tire-engaging devices defined by a first tire-tread-engaging device 14a and a second tire-tread-engaging device 14b. The first tire-tread-engaging device 14a is slidably-arranged upon a first guide track 20a, and, the second tire-tread-engaging device 14b is slidably-arranged upon a second guide track 20b. Each of the first and second guide tracks 20a, 20b are connected to the upper surface 16a of the base portion 16. Each guide track 20a, 20b is aligned with a unique radius (see, e.g., radial reference lines $R_K$ and $R_L$ of radial reference lines $R_A$-$R_L$ in FIG. 2) that projects away from the axis, A-A, such that the first guide track 20a and second guide track 20b are radially offset at an angle, θ (as seen in, e.g., FIG. 2); in an implementation, the angle, θ, is equal to approximately about 30°. By permitting each of the first and second tire-tread-engaging devices 14a, 14b to be slidably-arranged upon the first and second guide tracks 20a, 20b, the first and second tire-tread-engaging devices 14a, 14b may be radially adjusted (e.g., along the radial reference lines $R_K$ and $R_L$) radially toward or radially away from the axis, A-A, that extends through the stem member 18.

Each of the first and second tire-tread-engaging devices 14a, 14b include a tire-tread-engaging member 22 that is utilized for directly engaging a tread surface, $T_T$, of the tire, T. The tire-tread-engaging member 22 is connected to a support member 24. A proximal end 26 of the support member 24 includes a female portion 28 that slidably-mates with the guide track 20a/20b.

The support member 24 includes a neck portion 30 connected to a head portion 32. The neck portion 30 forms the proximal end 26 of the support member 24 that includes the female portion 28. The head portion 32 includes a substantially C-shape having an elongated base portion 32a that terminates with a proximal flange portion 32b and a distal flange portion 32c.

The support member 24 also includes an elongated support plate 34 that is connected to each of the proximal flange portion 32b and the distal flange portion 32c by a resilient coupling 36b, 36c. In reference to the axis, A-A, the elongated support plate 34 is defined by a radially-inwardly-facing surface 34a (see, e.g., FIG. 1C) and a radially-outwardly-facing surface 34b (see, e.g., FIG. 1C). The tire-tread-engaging member 22 is directly attached to the radially-inwardly-facing surface 34a of the elongated support plate 34. The radially-outwardly-facing surface 34b of the elongated support plate 34 is disposed adjacent the resilient coupling 36b, 36c.

The resilient coupling 36b/36c may comprise an elastomeric material that is secured to the flange portion 32b/32c by a fastener (e.g., a bolt) that is not shown. In an alternative embodiment, the resilient coupling 36b, 36c may be a spring member. The elongated support plate 34 may be secured to each of the resilient couplings 36b/36c by a fastener (e.g., a bolt) 38b, 38c.

Referring to FIG. 1C, a vibration source 40 is attached directly to the radially-outwardly-facing surface 34b of the elongated support plate 34. A controller 42 is communicatively-coupled to the vibration source 40 by way of an actuator 44 for actuating the vibration source 40. Upon actuating the vibration source 40, a vibrational force may be imparted from the vibration source 40 to the elongated support plate 34; because the elongated support plate 34 is connected to the head portion 32 by the resilient couplings 36b, 36c, the support plate 34 is permitted to vibrate relative a fixed, non-vibrating orientation of the head portion 32 as a result of the head portion 32 being connected to the guide track 20a/20b by way of the neck portion 30.

The vibration source 40 may include a motor (not shown) connected to an eccentric cam (not shown). In some implementations, the motor may be rated at approximately about ⅕ HP. In some examples, the motor may be rated to produce 700 lbs. of shake amplitude at 8,000 RPM (133 Hz). In other examples, the shake amplitude may be rated at, for example, 3,600 RPM (60 Hz) or 4,500 RPM (75 Hz). In other implementations, the weight of the eccentric cam may be selectively-modified in order to adjust the shake amplitude; accordingly, the speed of the motor may be dependent upon an increased or decreased load imparted by the eccentric cam, which may result in the motor spinning slower or faster.

The controller 42 may be manually operated (e.g., with an on/off switch) or automatically operated (e.g., by way of program stored on a processor). In use, the controller 42 repeatedly cycles the motor of the vibration source 40 such that the motor is cycled to be in an 'on state' and an 'off state.' By repeatedly cycling the motor 40 to be in an 'on state' and an 'off state,' periodic vibrational forces are imparted to the elongated support plate 34 and tire-tread-engaging member 22, which, in turn, results in a resonant vibrational response imparted to the tire-wheel assembly, TW. The application of the resonant forces upon the tire-wheel assembly, TW, is described in greater detail in the following disclosure at FIGS. 2-5.

In an implementation, the motor 40 may be cycled in the 'on state' for approximately about one second and may be cycled in the 'off state' for approximately about one second. When the motor 40 is cycled to the 'off state,' it should be noted that the eccentric cam will still spin as a result of momentum carried over from when the motor 40 was arranged in the 'on state;' as a result, when the on/off state is cycled every one second, the resonant response is achieved (as opposed to arranging the motor 40 in a constant 'on state' that would otherwise not result in a resonant response imparted to the tire-wheel assembly, TW, but, rather, a constant vibrational force imparted to the tire-wheel assembly, TW).

The tire-wheel assembly exerciser 10 may be operated according to the following exemplary embodiment. Firstly, the first and second tire-tread-engaging devices 14a, 14b of the tire-engaging portion 14 may be arranged in retracted, default orientation (as shown in, for example, FIGS. 6A and 7A) by slidably-arranging the first and second tire-tread-engaging devices 14a, 14b (along, for example, the radial reference lines $R_K$ and $R_L$) upon the first and second guide tracks 20a, 20b in a radially-retracted orientation away from the axis, A-A. Then, the tire-wheel assembly, TW, may be fixedly-secured to the tire-wheel assembly exerciser 10 by extending the stem member 18 through an axial passage formed by the wheel, W, such that the distal end 18b of the stem member 18 is secured to/disposed at least proximate or within the axial passage formed by the wheel, W (as shown in, for example, FIG. 1).

When the tire-wheel assembly, TW, is fixedly-secured to the tire-wheel assembly exerciser 10, the tire-wheel assembly, TW, may be said to be in an inflated state such that pressurized air at least partially fills the circumferential air cavity, $T_{AC}$, of the tire, T, which causes the upper bead, $T_{BU}$, to be disposed adjacent and "seated" against the upper bead seat, $W_{SU}$, of the wheel, W, as the lower bead, $T_{BL}$, is also disposed adjacent and "seated" against the lower bead seat, $W_{SL}$, of the wheel, W. As described above, entrapments, E (see, e.g., FIG. 11A), such as, for example, contaminants, lubricant or the like, may be trapped between the bead, $T_{BU}/T_{BL}$, of the tire, T, and the bead seat $W_{SU}/W_{SL}$ of the wheel, W. As explained below, the entrapments, E, may be removed by the tire-wheel assembly exerciser 10 such that the upper and lower beads, $T_{BU}$, $T_{BL}$, of the tire, T, are seated directly adjacent the upper and lower bead seats, $W_{SU}$, $W_{SL}$, of the wheel, W, without any entrapments, E, being disposed there between as seen in, for example, FIG. 11B.

Once the inflated tire-wheel assembly, TW, is fixedly-secured to the tire-wheel assembly exerciser 10 such that stem member 18 (and axis, A-A) extends through the axial passage formed by the wheel, W, the first and second tire-tread-engaging devices 14a, 14b of the tire-engaging portion 14 may be slidably-deployed in a radial direction (along, for example, the radial reference lines $R_K$ and $R_L$) from the retracted, default orientation to an engaged orientation (as seen in, e.g., FIGS. 2, 6B, 7B) by slidably-moving the first and second tire-tread-engaging devices 14a, 14b upon the first and second guide tracks 20a, 20b toward the tire-wheel assembly, TW, such that the first and second tire-tread-engaging devices 14a, 14b are advanced toward the axis, A-A. The first and second tire-tread-engaging devices 14a, 14b may be said to be arranged in the engaged orientation when the tire-tread-engaging member 22 of the first and second tire-tread-engaging devices 14a, 14b directly engage the tread surface, $T_T$, of the tire, T. Slidable movement of the first and second tire-tread-engaging devices 14a, 14b may be automatically conducted as a result of the controller 42 sending an actuating signal to the actuator 44 that is connected to the first and second tire-tread-engaging devices 14a, 14b. In an example, the actuating signal may occur in response to a sensor (not shown) detecting that the inflated tire-wheel assembly, TW, is fixedly-secured to the tire-wheel assembly exerciser 10.

Figure 2:
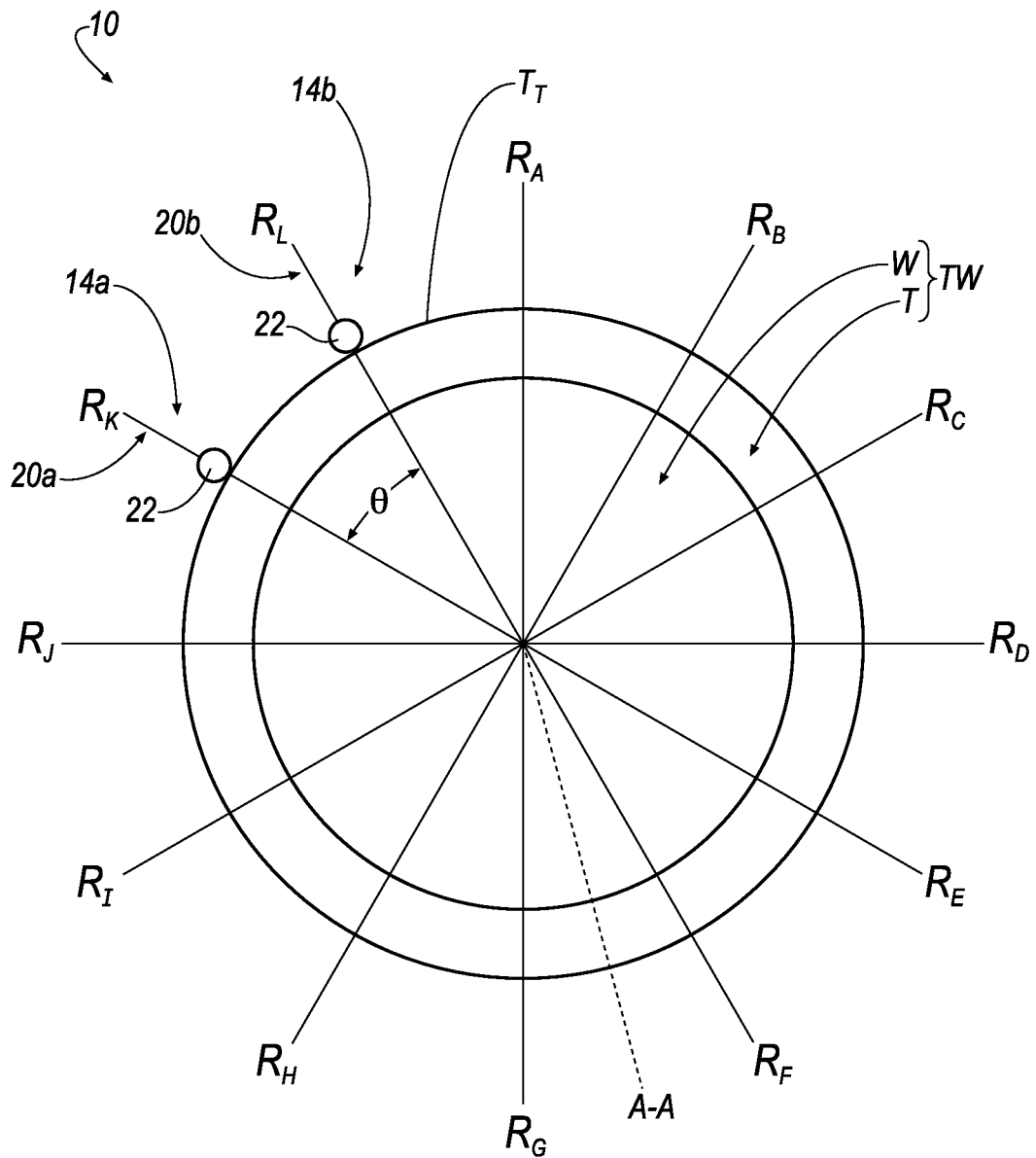
FIG. 2 is a simplified top view of the apparatus of FIG. 1B arranged in a deactivated state.

Referring to FIG. 2, a simplified top view of the tire-wheel assembly exerciser 10 of FIG. 1B is shown arranged in the engaged orientation with an inflated tire-wheel assembly, TW. FIG. 2 also includes radial reference lines, $R_A$-$R_L$, projecting from the axis, A-A. As described above, each guide track 20a, 20b is aligned with a unique radius (i.e., the guide track 20a is aligned with the radial reference line $R_K$ and the guide track 20b is aligned with the radial reference line $R_L$) that projects away from the axis, A-A, such that the first guide track 20a and second guide track 20b are radially offset at an angle, θ; accordingly, each radial reference line, $R_K$ and $R_L$, is spaced apart by the angle, θ (e.g., approximately about 30°). With continued reference to FIG. 2, the tire-tread-engaging member 22 of each of the tire-tread-engaging devices 14a, 14b are generally represented by a circle that is disposed in an engaged orientation adjacent the tread surface, $T_T$, of the tire, T, and along the unique radial reference lines $R_K$ and $R_L$ as described above that occupy each guide track 20a, 20b; accordingly, although only the tire-tread-engaging members 22 of each of the tire-tread-engaging devices 14a, 14b are shown at FIG. 2, it should be noted that the simplified top view of FIG. 2 is a partial, representative view of the tire-wheel assembly exerciser 10 and is not meant to be directed to an embodiment that only includes the tire-tread-engaging members 22 alone.

Figure 3A:
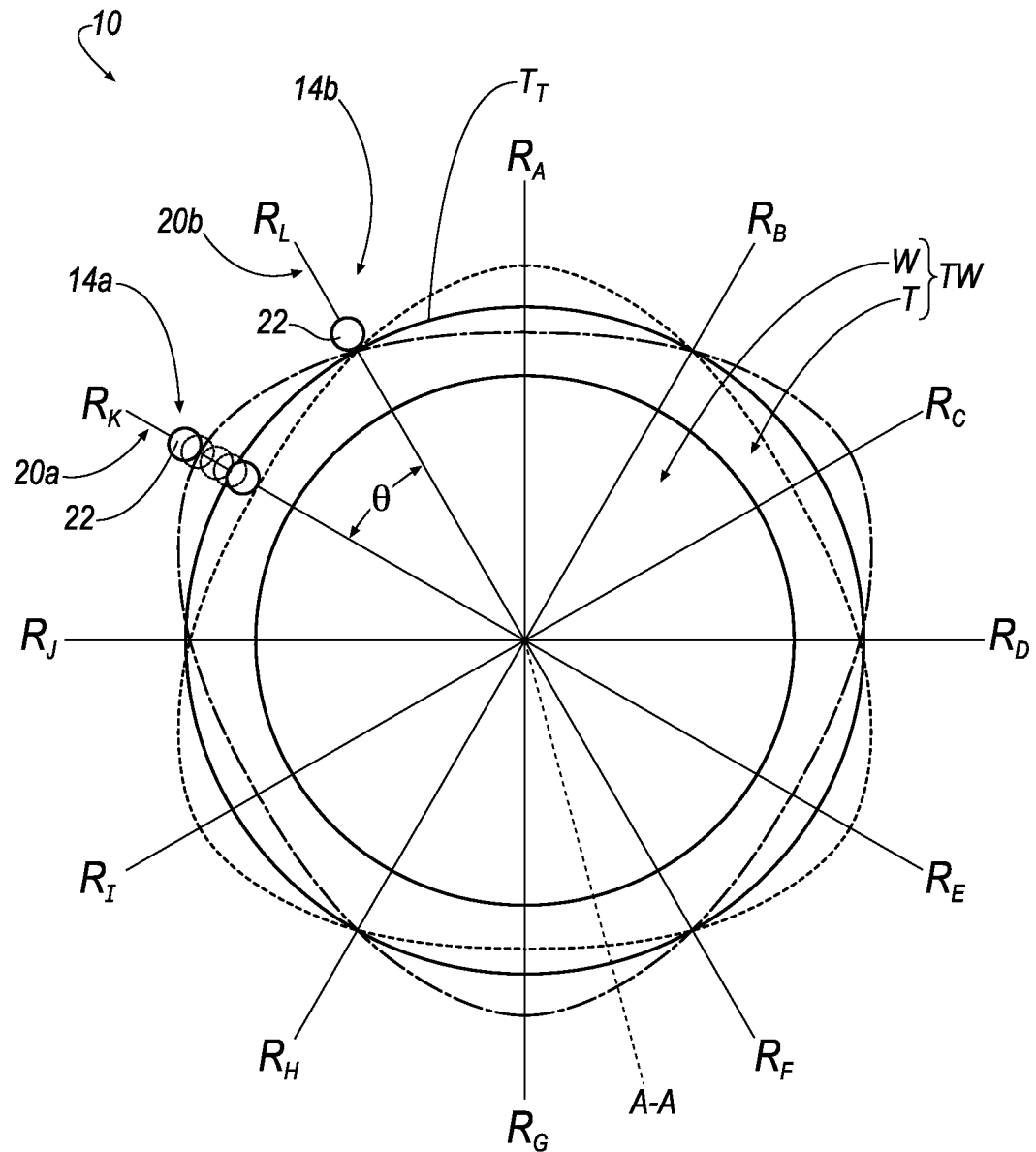
FIG. 3A is another view of the apparatus of FIG. 2 arranged in a first activated state.
Figure 3B:
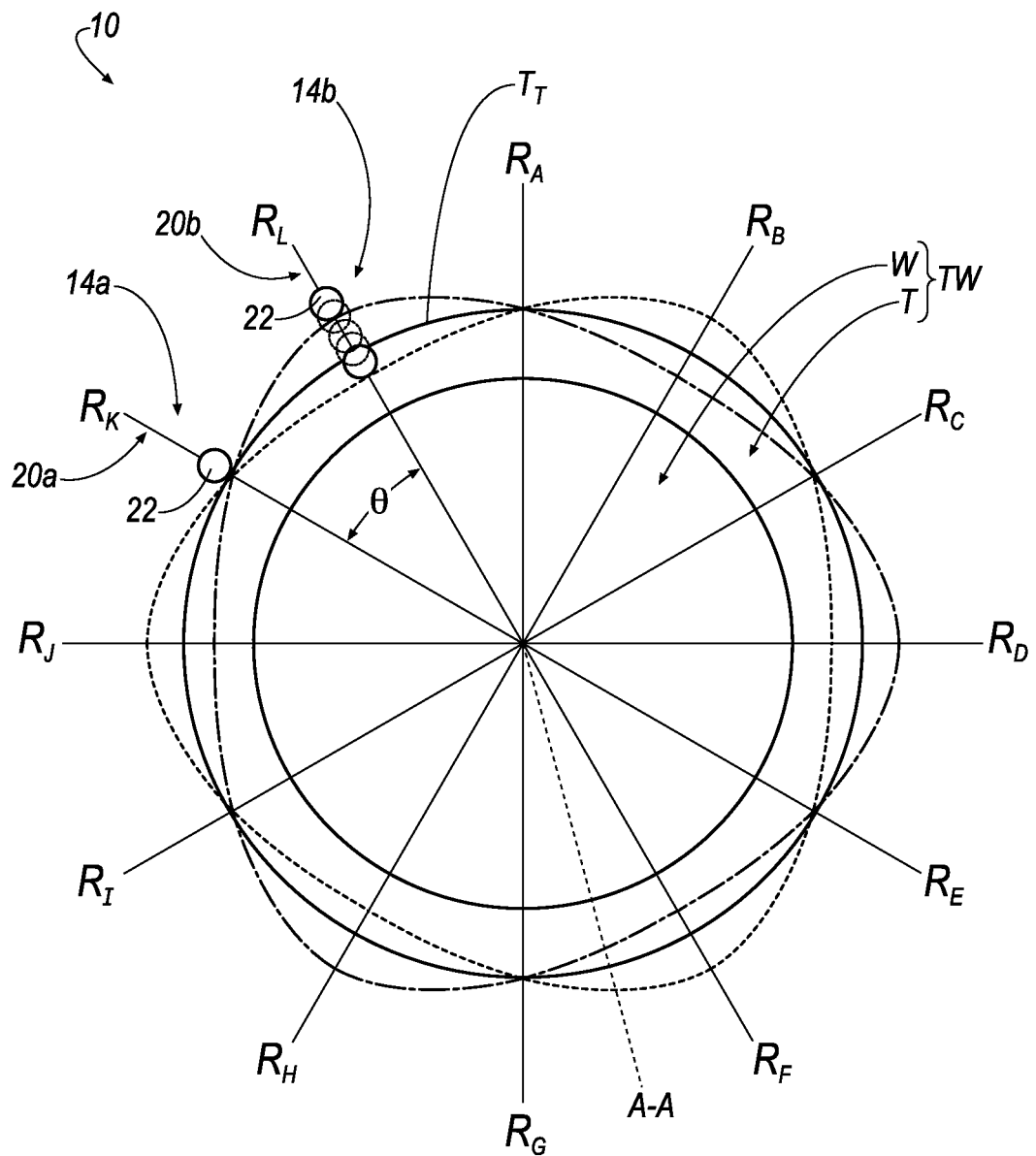
FIG. 3B is another view of the apparatus of FIG. 2 arranged in a second activated state.

As seen in FIG. 3A, the first tire-tread-engaging device 14a is shown in an 'activated state' whereas the second tire-tread-engaging device 14b is shown in a 'deactivated state.' Conversely, as seen in FIG. 3B, the first tire-tread-engaging device 14a is shown in a 'deactivated state' whereas the second tire-tread-engaging device 14b is shown in an 'activated state.'

When either of the first and second tire-tread engaging devices 14a, 14b are said to be in the 'activated state,' the 'activated state' may mean that the controller 42 repeatedly cycles the motor of the vibration source 40 such that the motor is cycled to be in the 'on state' and the 'off state' as described above. Therefore, as a result of being arranged in the 'activated state,' periodic vibrational forces are imparted to the elongated support plate 34 and tire-tread-engaging member 22, which, in turn, results in a resonant vibrational response imparted to the tire-wheel assembly, TW.

Figure 4:
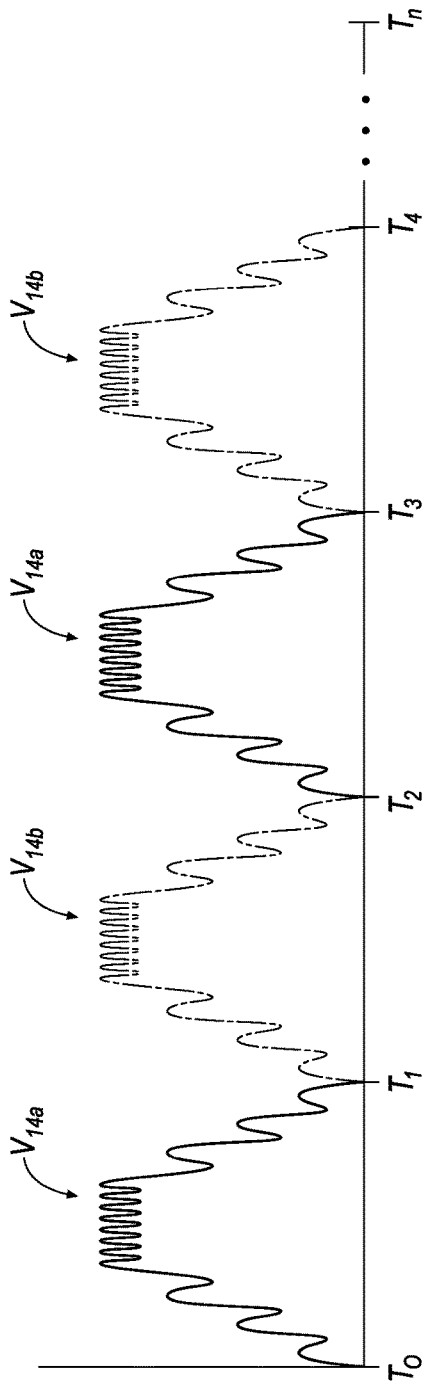
FIG. 4 is an exemplary graph representing curves related to vibrations imparted to a tire-wheel assembly by the apparatus of FIG. 1.

Referring to FIG. 4, in some instances, an exemplary embodiment of the invention does not include both of the first and second tire-tread engaging devices 14a, 14b that are synchronized in the 'activated state' during a period of time (i.e., while one of the first and second tire-tread engaging devices 14a, 14b is arranged in the 'activated state' the other of the first and second tire-tread engaging devices 14a, 14b is arranged in the 'deactivated state'). If, for example, both of the first and second tire-tread engaging devices 14a, 14b were to be synchronized in the 'activated state' during a period of time, the resonant vibrational response arising from each of the first and second tire-tread engaging devices 14a, 14b would undesirably cancel each other out.

According to the exemplary implementation shown in FIG. 4, the 'activated state' of the first tire-tread engaging device 14a is shown generally by the curves $V_{14a}$, which generally represents the vibrations imparted to the tire-wheel assembly, TW, by the vibration source 40 of the first tire-tread engaging device 14a, and, the 'activated state' of the second tire-tread engaging device 14b is shown generally by the curves $V_{14b}$, which generally represents the vibrations imparted to the tire-wheel assembly, TW, by the vibration source 40 of the second tire-tread engaging device 14b. As seen in FIG. 4, the vibrations $V_{14a}$ arising from the first tire-tread engaging device 14a occur exclusively for the time periods $T_0$-to-$T_1$, $T_2$-to-$T_3$, etc., whereas the vibrations $V_{14b}$ arising from the second tire-tread engaging device 14b occur exclusively for the time periods $T_1$-to-$T_2$, $T_3$-to-$T_4$, etc.

Figure 5:
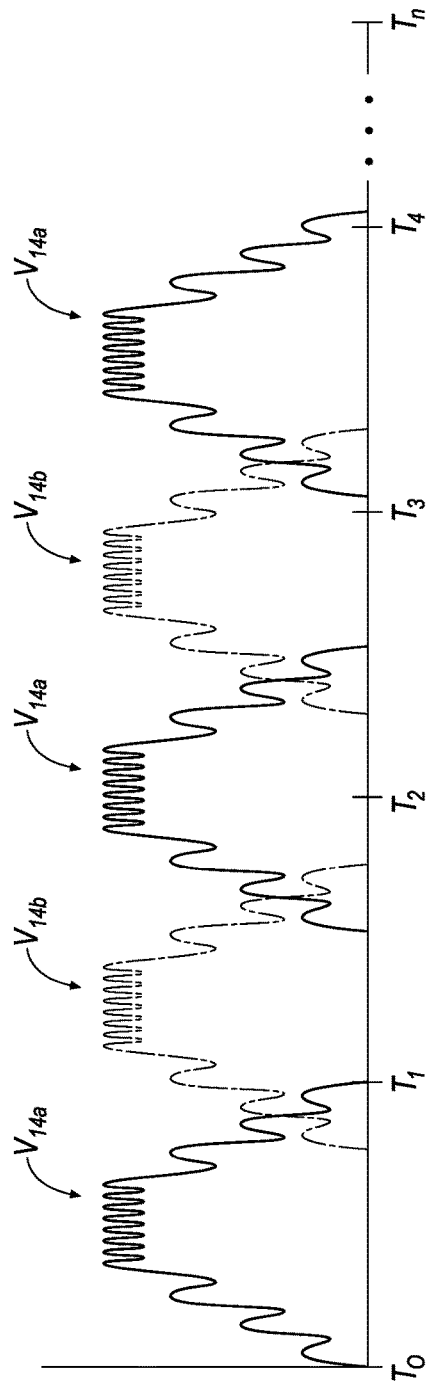
FIG. 5 is another exemplary graph representing curves related to vibrations imparted to a tire-wheel assembly by the apparatus of FIG. 1.

Referring to FIG. 5, an implementation of the invention does not include both of the first and second tire-tread engaging devices 14a, 14b that are synchronized in the 'activated state' during a period of time, but, however, both of the first and second tire-tread engaging devices 14a, 14b may arranged in the 'activated state' during a period of time such that the curves represented by the vibrations $V_{14a}$, $V_{14b}$ at least partially overlap during a period of time. Although the first and second tire-tread engaging devices 14a, 14b are arranged in the 'activated state' at the same time in FIG. 5, the first and second tire-tread engaging devices 14a, 14b are not synchronized in the 'activated state' during a period of time, and, therefore, the resonant vibrational forces arising from each of the first and second tire-tread engaging devices 14a, 14b do not undesirably cancel each other out.

In a substantially similar manner as described above at FIG. 4, according to the exemplary implementation shown in FIG. 5, the 'activated state' of the first tire-tread engaging device 14a is shown generally by the curves $V_{14a}$, which generally represents the vibrations imparted to the tire-wheel assembly, TW, by the vibration source 40 of the first tire-tread engaging device 14a, and, the 'activated state' of the second tire-tread engaging device 14b is shown generally by the curves $V_{14b}$, which generally represents the vibrations imparted to the tire-wheel assembly, TW, by the vibration source 40 of the second tire-tread engaging device 14b. As seen in FIG. 5, at least a portion of both of the curves represented by the vibrations $V_{14a}$, $V_{14b}$ arising from the first and second tire-tread engaging devices 14a, 14b at least partially overlap during the time periods $T_0$-to-$T_1$, $T_1$-to-$T_2$, $T_2$-to-$T_3$, $T_3$-to-$T_4$, etc., and, therefore, unlike the embodiment shown at FIG. 4, the curves represented by the vibrations $V_{14a}$, $V_{14b}$ are not exclusive to each of the periods $T_0$-to-$T_1$, $T_1$-to-$T_2$, $T_2$-to-$T_3$, $T_3$-to-$T_4$, etc.

Referring back to FIGS. 3A-3B, as a result of the radially offset angle, θ, of the first and second tire-tread engaging devices 14a, 14b, the resonant vibrational response results in oscillations imparted to 'anti-nodes' of the tire-wheel assembly, TW, whereas, concurrently, no oscillations are imparted to 'nodes' of the tire-wheel assembly, TW. As seen in FIG. 3A, 'anti-nodes' are shown generally at the intersection of the radial reference lines $R_A$, $R_C$, $R_E$, $R_G$, $R_I$, and $R_K$ with the tread surface, $T_T$, of the tire, T, whereas, concurrently, 'nodes' are shown generally at the intersection of the radial reference lines $R_B$, $R_D$, $R_F$, $R_H$, $R_J$, and $R_L$ with the tread surface, $T_T$, of the tire, T. As seen in FIG. 3B, 'anti-nodes' are shown generally at the intersection of the radial reference lines $R_B$, $R_D$, $R_F$, $R_H$, $R_J$, and $R_L$ with the tread surface, $T_T$, of the tire, T, whereas, concurrently, 'nodes' are shown generally at the intersection of the radial reference lines $R_A$, $R_C$, $R_E$, $R_G$, $R_I$, and $R_K$ with the tread surface, $T_T$, of the tire, T. Therefore, depending on the 'activated state' of the first tire-tread engaging device 14a or the second tire-tread engaging device 14b, anti-nodes are included at the 'activated state' first/second tire-tread engaging device 14a/14b are periodically spaced apart about the tire-wheel assembly, TW, therefrom according to approximately two times (i.e., 2θ) the radially offset angle, θ, and, similarly, nodes are included at the 'deactivated state' first/second tire-tread engaging device 14a/14b (i.e., the nodes are phase-shafted from the 'activated state' first/second tire-tread engaging device 14a/14b by the radially offset angle, θ) and periodically located about the tire-wheel assembly, TW, according to approximately two times (i.e., 2θ) the radially offset angle, θ.

Referring to FIGS. 6A-6E and 7A-7E, embodiment of a station 100, 200 for processing a tire-wheel assembly, TW, is shown according to an implementation. The "processing" act conducted by the station 100/200 may include the acts of inflating a non-inflated tire-wheel assembly, $TW_{NI}$, and exercising the non-inflated/inflated tire-wheel assembly, $TW_{NI}/TW_I$; accordingly, in an implementation, the station 100, 200 may be referred to as an 'inflating and exercising station' that includes an inflator device 102, 202 and the tire-wheel assembly exerciser 10 described above.

In some implementations, the inflating and exercising station 100, 200 may be a 'sub-station' of a 'single-cell workstation' that includes a plurality of sub-stations. A single cell workstation may include a transporting device or robotic arm (see, e.g., 104, 204) that hands-off or transports one or more of a tire, T, and a wheel, W, to each sub-station of a plurality of processing sub-stations arranged around/about the transporting device or robotic arm 104, 204 for contributing to acts that assemble/process the tire-wheel assembly, TW.

Figure 6A:
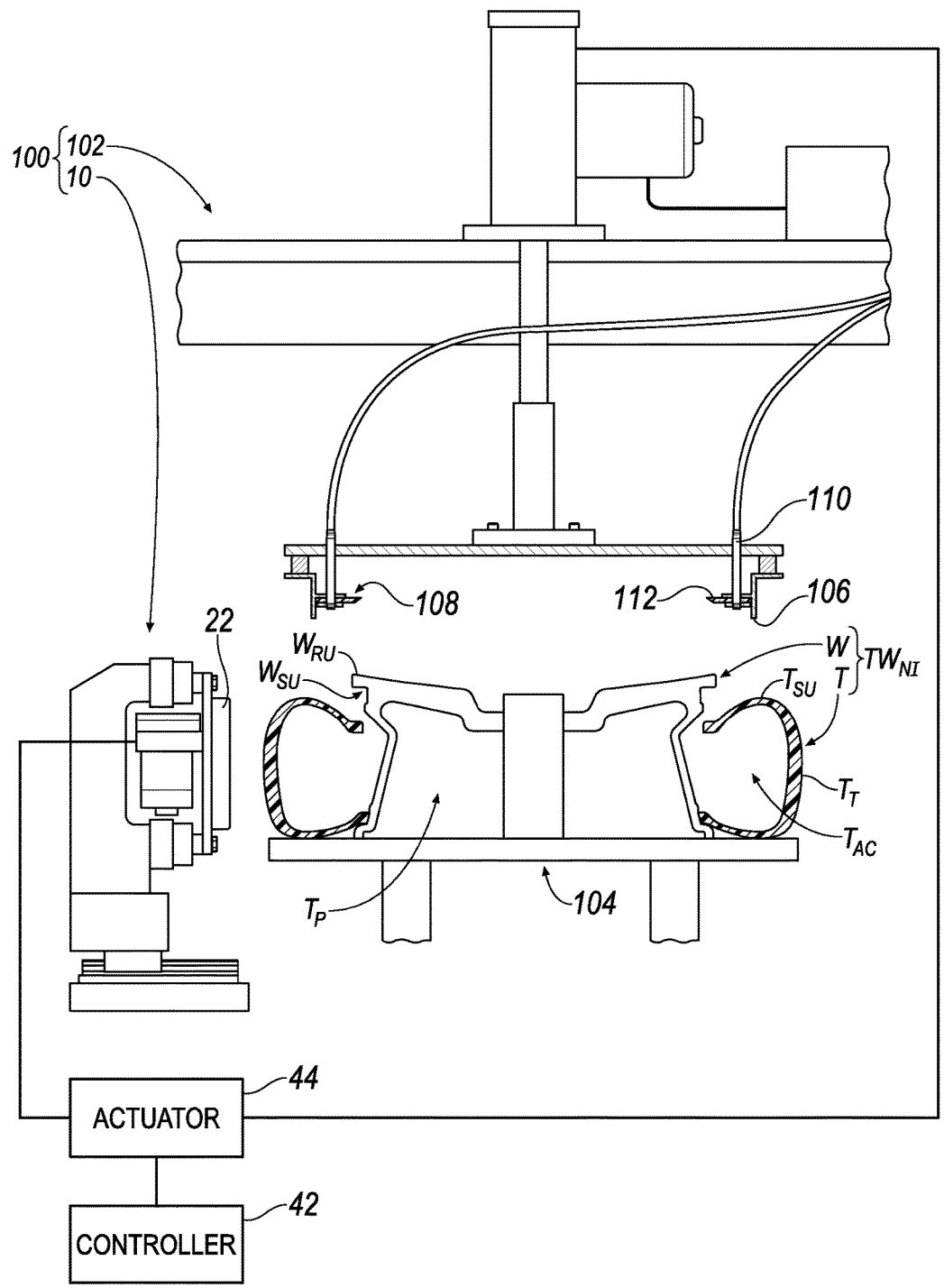
FIGS. 6A-6E are partial cross-sectional side views of station for processing a tire-wheel assembly including an inflation device and the apparatus of FIG. 1.
Figure 7A:
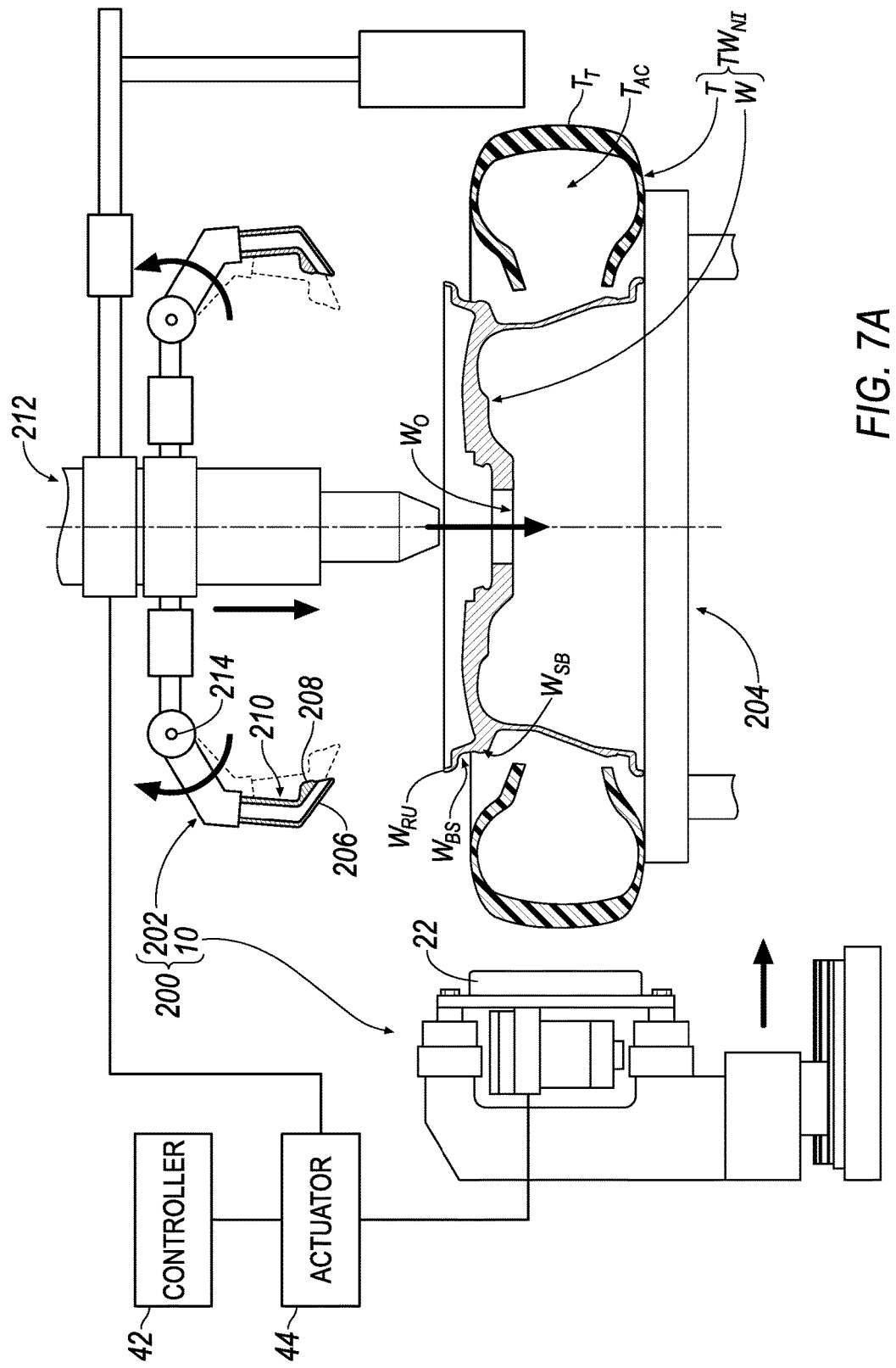
FIGS. 7A-7E are partial cross-sectional side views of station for processing a tire-wheel assembly including an inflation device and the apparatus of FIG. 1.

As seen in FIGS. 6A and 7A, prior to actuating the inflating and exercising station 100, 200, both of the inflator device 102, 202 and the tire-wheel assembly exerciser 10 are shown in a in retracted, default orientation. Further, prior to actuating the inflating and exercising station 100, 200, the tire, T, is "joined" or "mounted" to a wheel, W, for forming an non-inflated tire-wheel assembly, $TW_{NI}$; the act of "joining" or "mounting" may mean to physically couple, connect or many the tire, T, and wheel, W, such that the wheel, W, may be referred to as a male portion that is inserted into a passage, $T_P$, of the tire, T, being a female portion. Prior to being arranged at the inflating and exercising station 100, 200, the act of "joining" or "mounting" the tire, T, to the wheel, W, occurred at, for example, a joining/mounting sub-station of a single-cell workstation (not shown).

Figure 7B:
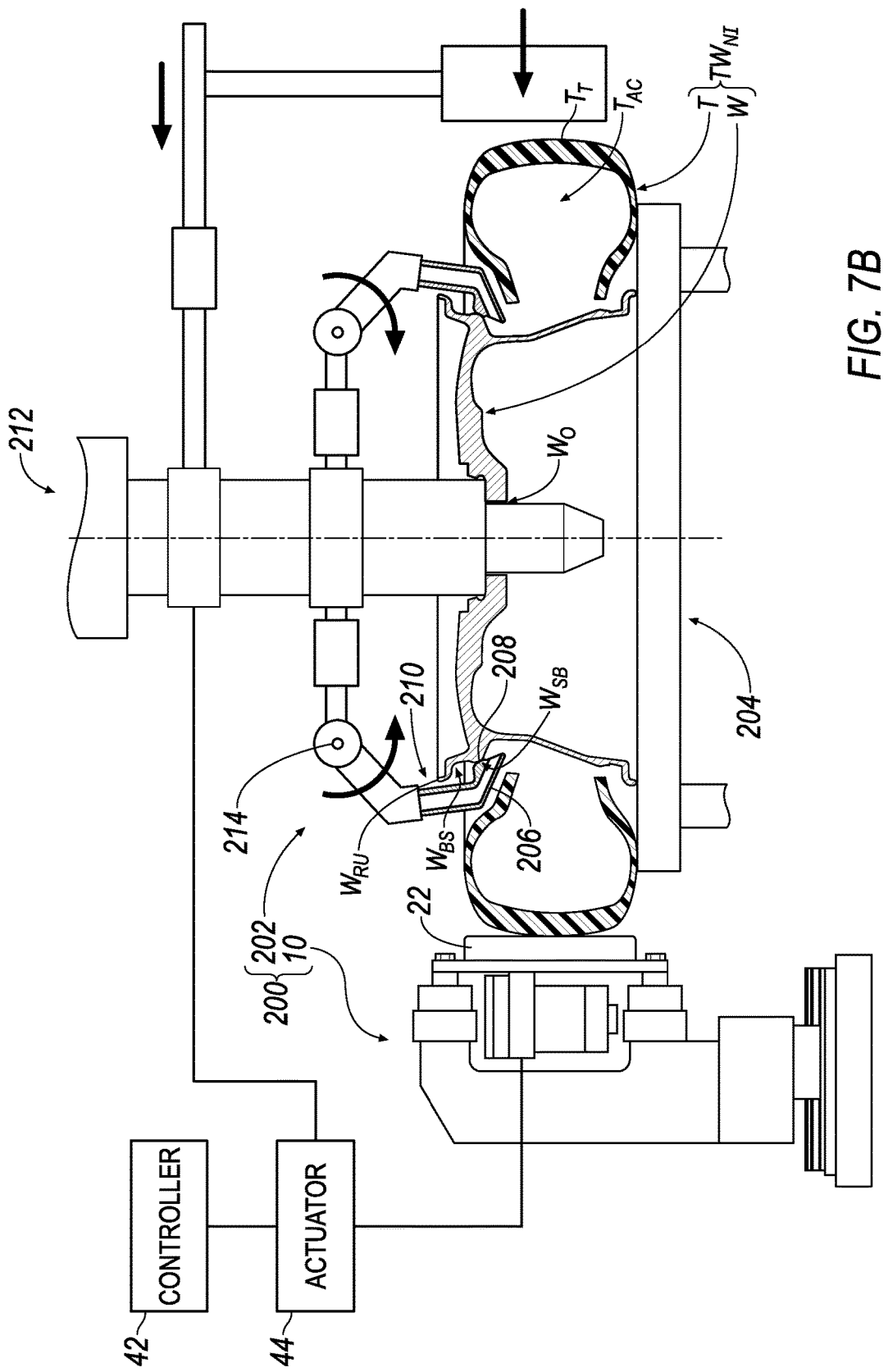

Referring to FIGS. 6A and 7A, the non-inflated tire-wheel assembly, $TW_{NI}$, may be arranged relative the inflating and exercising station 100, 200 such that the tread surface, $T_T$, of the tire, T, is radially-aligned in a spaced-apart, opposing relationship with the tire-tread-engaging members 22 of the first and second tire-tread engaging devices 14a, 14b of the tire-wheel assembly exerciser 10, as the wheel, W, of the non-inflated tire-wheel assembly, $TW_{NI}$, is axially aligned in a spaced-apart, opposing relationship with the inflator device 102, 202. Then, as seen in FIGS. 7B and 8B, the controller 42 may send a signal to the actuator 44 for causing the actuator 44 to slidably-deploy the first and second tire-tread-engaging devices 14a, 14b of the tire-engaging portion 14 in a radial direction (along, for example, the radial reference lines $R_K$ and $R_L$) from the retracted, default orientation to an engaged orientation (as seen in, e.g., FIG. 2) such that the tire-tread-engaging members 22 directly engage the tread surface, $T_T$, of the tire, T. Further, the controller 42 may also send a signal to the actuator 44 for causing the inflator device 102, 202 to move in an axial direction toward the non-inflated tire-wheel assembly, $TW_{NI}$, such that the inflator device 102, 202 directly engages one or more of the tire, T, and the wheel, W.

Figure 7C:
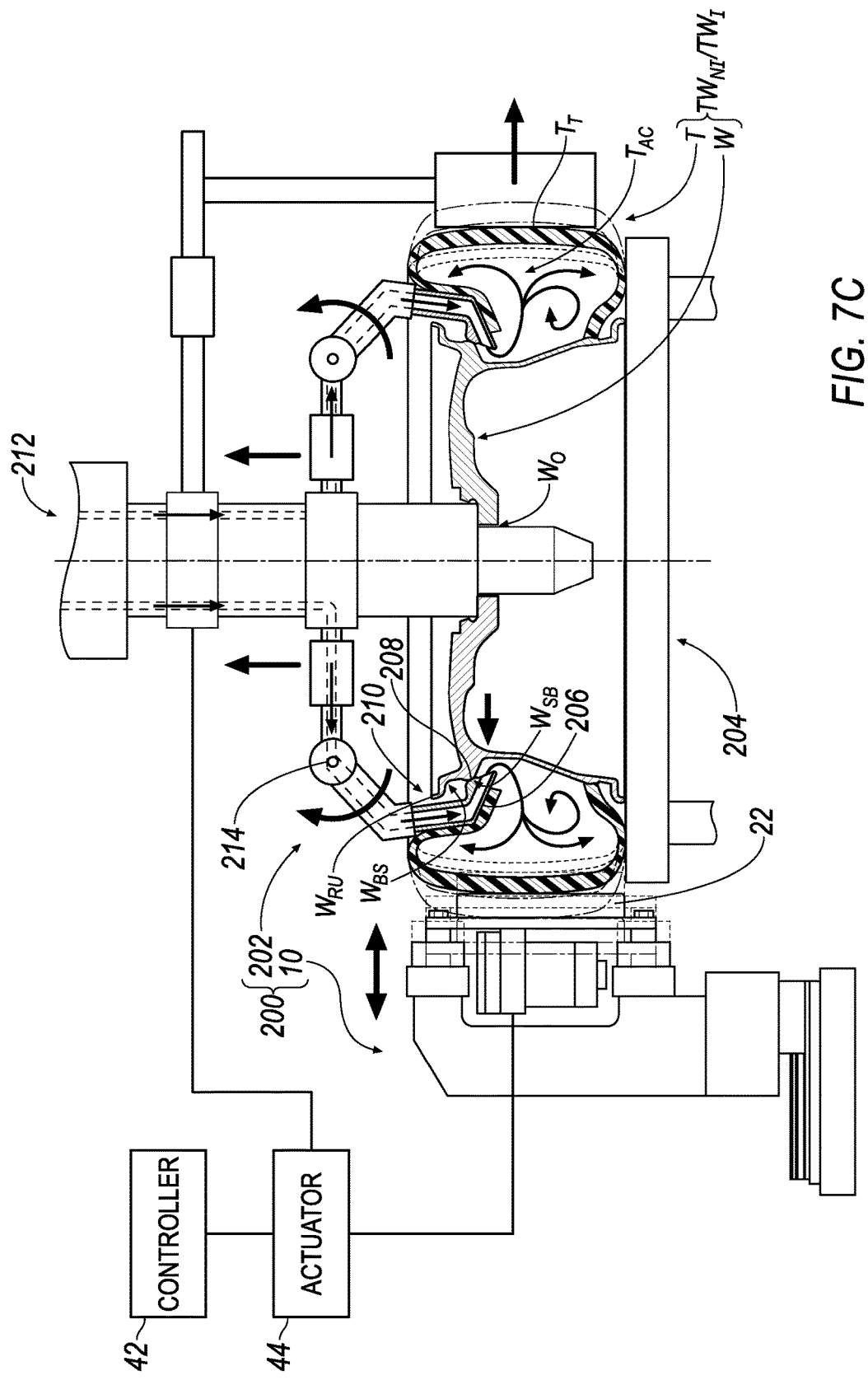
Figure 7D:
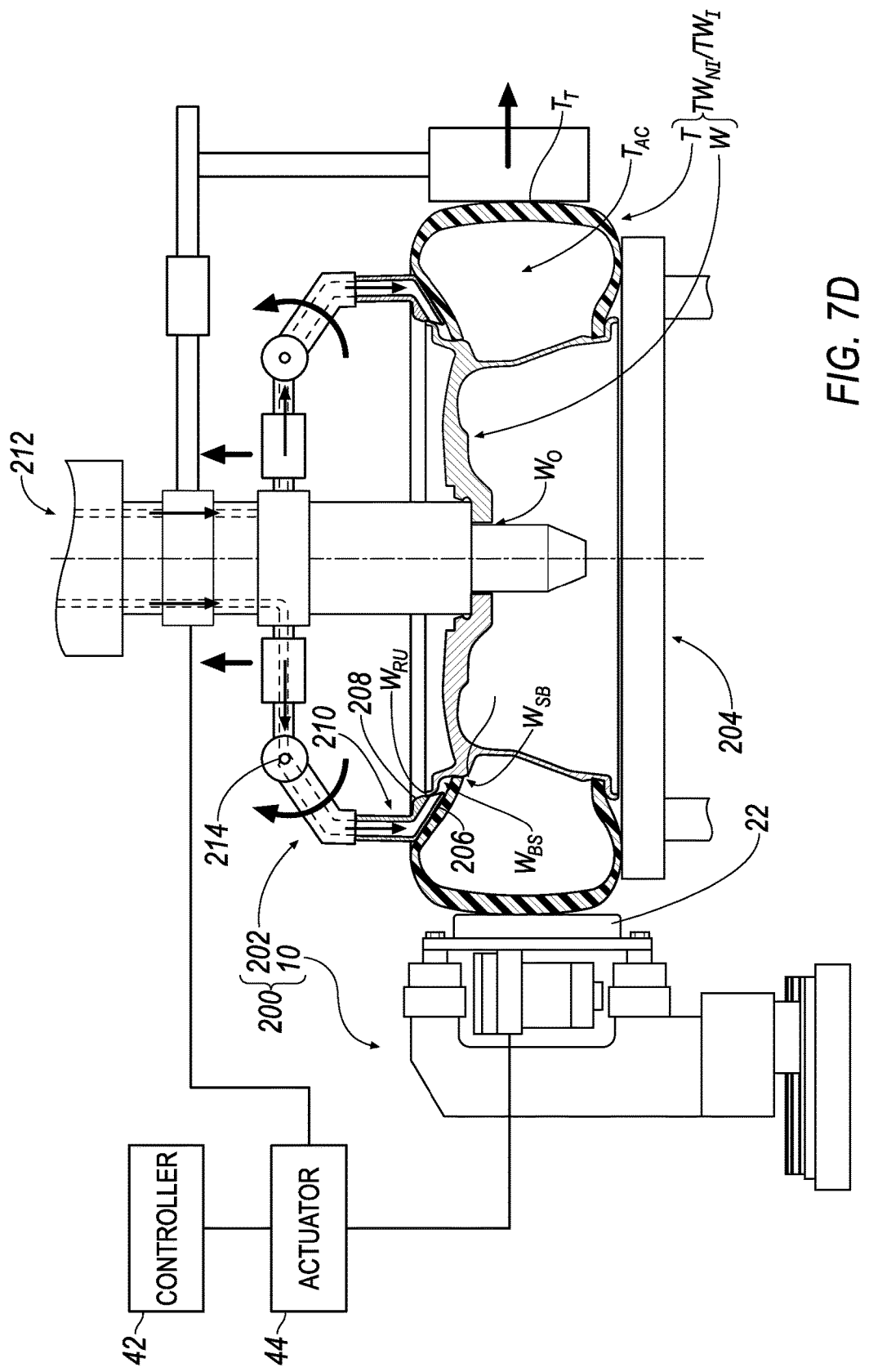
Figure 7E:
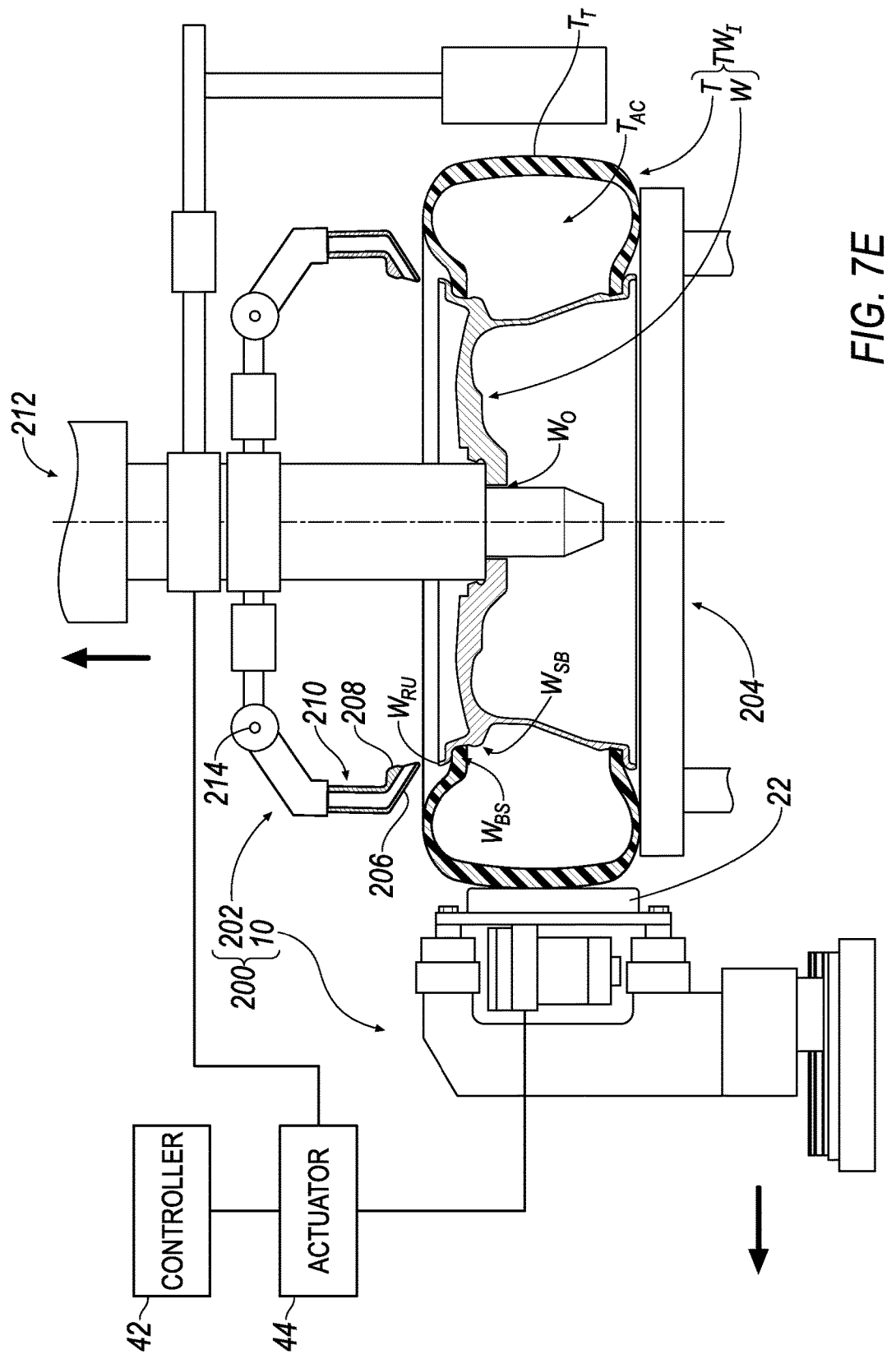

Referring to FIGS. 7C and 8C, once the tire-tread-engaging members 22 directly engage the tread surface, $T_T$, of the tire, T, and, once the inflator device 102/202 directly engages one or more of the tire, T, and the wheel, W, the controller 42 may send one or more signals to the actuator 44 for actuating one or both of the tire-wheel assembly exerciser 10 and the inflator device 102, 202. In some circumstances, the tire-wheel assembly exerciser 10 may be actuated (for imparting vibrations, $V_{14a}$, $V_{14b}$, to the tire-wheel assembly, TW) prior to and during actuation of the inflator device 102, 202 (for inflating the tire-wheel assembly, TW). In other circumstances, the tire-wheel assembly exerciser 10 may be actuated (for imparting vibrations, $V_{14a}$, $V_{14b}$, to the tire-wheel assembly, TW) not prior to actuation of the inflator device 102, 202 (for inflating the tire-wheel assembly, TW) but only simultaneously with the actuation of the inflator device 102, 202 (for inflating the tire-wheel assembly, TW). In another circumstance, the tire-wheel assembly exerciser 10 may be actuated (for imparting vibrations, $V_{14a}$, $V_{14b}$, to the tire-wheel assembly, TW) prior to and simultaneously with the actuation of the inflator device 102, 202 (for inflating the tire-wheel assembly, TW), and, further, once the controller 42 sends a subsequent signal to the actuator 44 for deactivating the inflator device 102, 202 (for ceasing inflation of the tire-wheel assembly, TW), the tire-wheel assembly exerciser 10 may remain actuated (for imparting vibrations, $V_{14a}$, $V_{14b}$, to the tire-wheel assembly, TW) in the active state after the inflator device 102, 202 has at least partially inflated the tire-wheel assembly, TW. In implementations, the inflator device 102, 202 may be firstly actuated (for inflating the tire-wheel assembly, TW) while the tire-wheel assembly exerciser 10 remains in a deactivated state, then, once the tire-wheel assembly, TW, has been at least partially inflated to a partially-inflated state, the inflator device 102, 202 may be deactivated (for ceasing inflation of the tire-wheel assembly, TW); once the inflator device 102, 202 has been deactivated, the tire-wheel assembly exerciser 10 may be switched from the deactivated state to the activated state for the purpose of imparting vibrations, $V_{14a}$, $V_{14b}$, to the tire-wheel assembly, TW, for exercising the at least partially inflated tire-wheel assembly, TW.

Referring to FIGS. 6A-6E, the inflator device 102 may include a tire sidewall engaging portion 106 that engages the upper sidewall, $T_{SU}$, of the tire, T, and a wheel engaging portion 108 that engages one or more of the upper rim, $W_{RU}$, and upper bead seat, $W_{SU}$, of the wheel, W. The inflator device 102 may further comprise an inflation conduit 110 that extends through one or more of the tire sidewall engaging portion 106 and the wheel engaging portion 108 for passing a fluid from a fluid source (not shown) and into the circumferential air cavity, $T_{AC}$, of the tire, T, for inflating the tire, T.

In some implementations, the tire sidewall engaging portion 106 may comprise a circumferential body that, once disposed adjacent the upper sidewall, $T_{SU}$, of the tire, T, substantially seals the circumferential air cavity, $T_{AC}$, of the tire, T, from atmosphere. Further, the wheel engaging portion 108 may include a flexible circumferential member 112 having a smaller diameter than the upper rim, $W_{RU}$, of the wheel, W; accordingly, the flexible circumferential member 112 may "flip" (as seen in FIG. 6B) or "flop" (as seen in FIG. 6D) from a static, neutral orientation (as seen in FIGS. 6A and 6C).

Figure 6B:
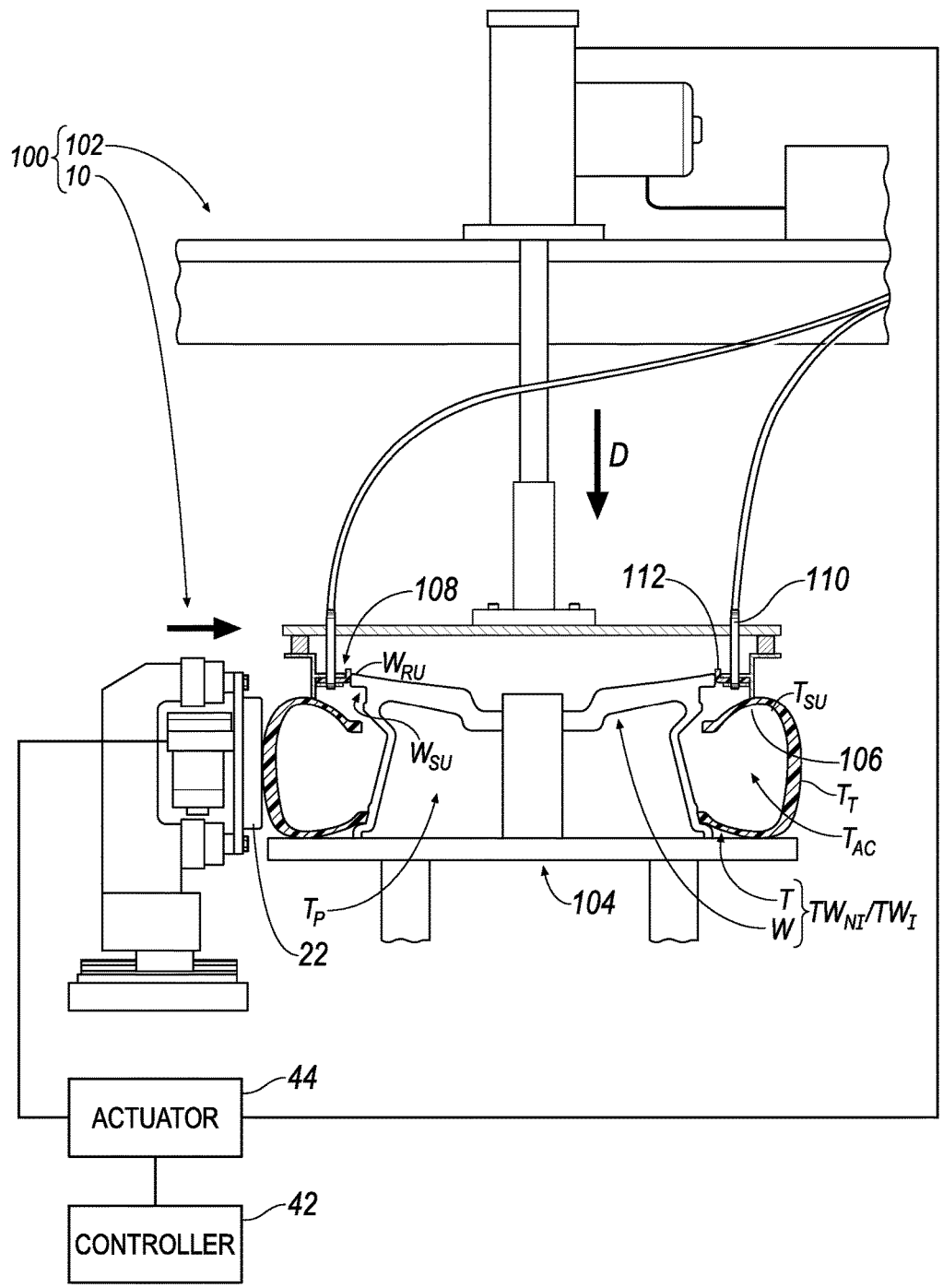
Figure 6C:
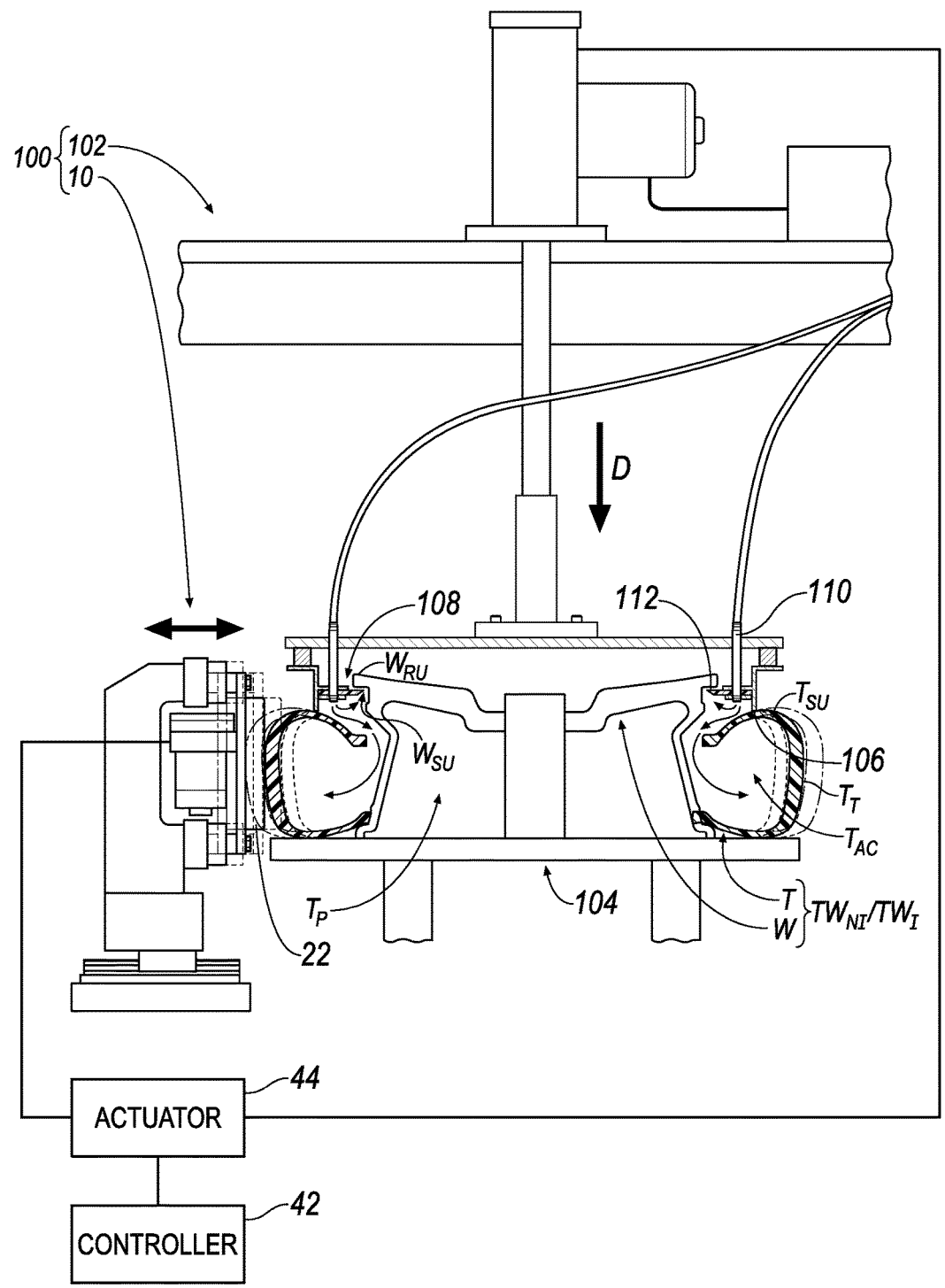

In some implementations, the inflation conduit 110 may pass inflating fluid into the circumferential air cavity, $T_{AC}$, of the tire, T, once the flexible circumferential member 112 has transitioned from the "flipped" orientation of FIG. 6B back to the neutral orientation as seen in FIG. 6C. Once the flexible circumferential member 112 has transitioned back to the neutral orientation as seen in FIG. 6C, the fluid passed into the circumferential air cavity, $T_{AC}$, of the tire, T, results in the upper sidewall, $T_{SU}$, of the tire, T, urging the inflator device 102 axially away from the tire-wheel assembly, TW, such that the flexible circumferential member 112 may be moved from a first, spaced-apart orientation with respect to the upper bead seat, $W_{SU}$, of the wheel, W, as seen in FIG. 6B to a second, adjacent orientation with respect to the upper bead seat, $W_{SU}$, of the wheel, W, as seen in FIG. 6D. As the fluid further fills the circumferential air cavity, $T_{AC}$, of the tire, T, the inflator device 102 is further urged axially away from the tire-wheel assembly, TW, such that the flexible circumferential member 112 is transitioned from the "neutral" orientation of FIG. 6C to the flopped orientation as seen in FIG. 6D.

Figure 6D:
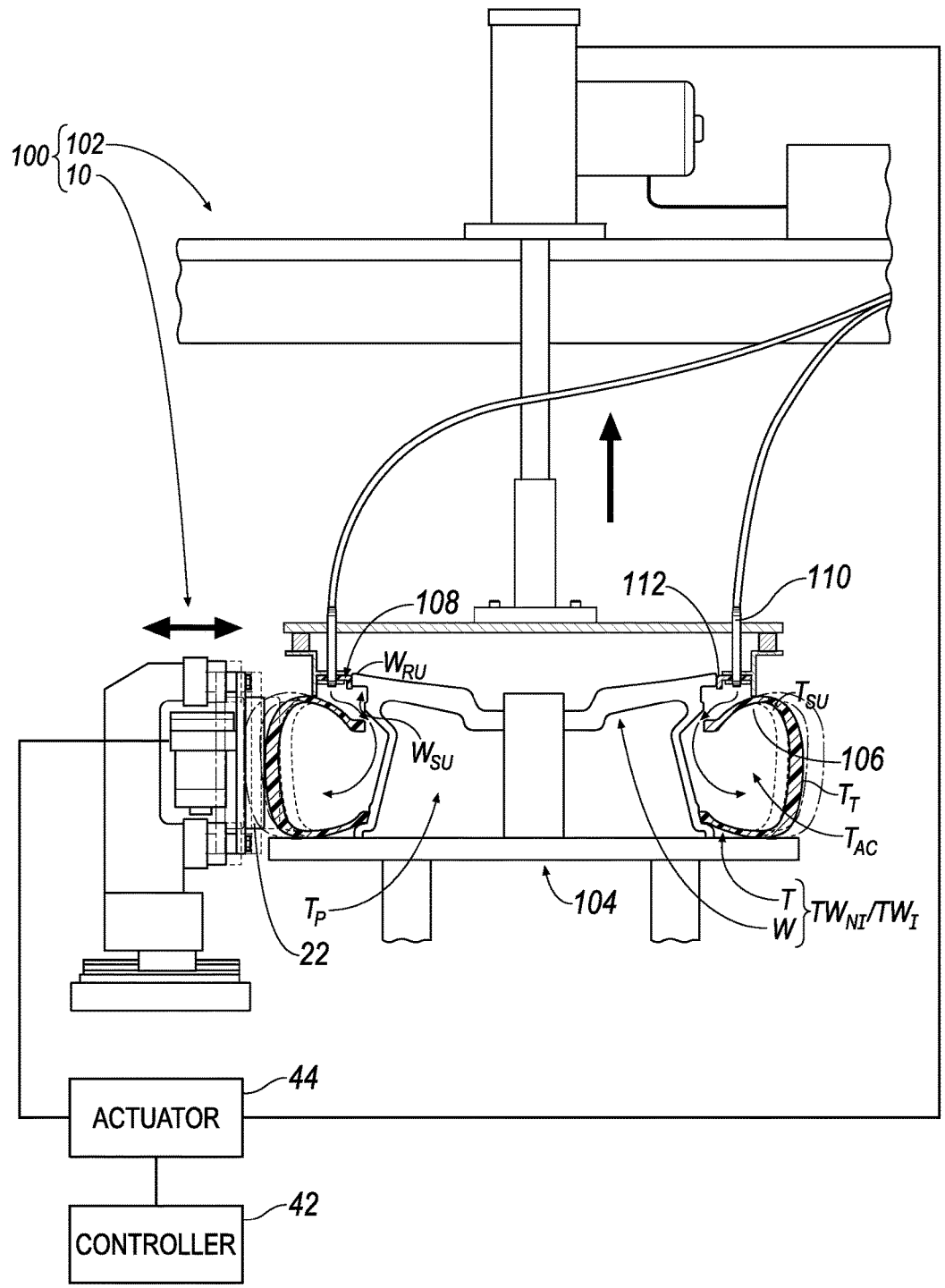
Figure 6E:
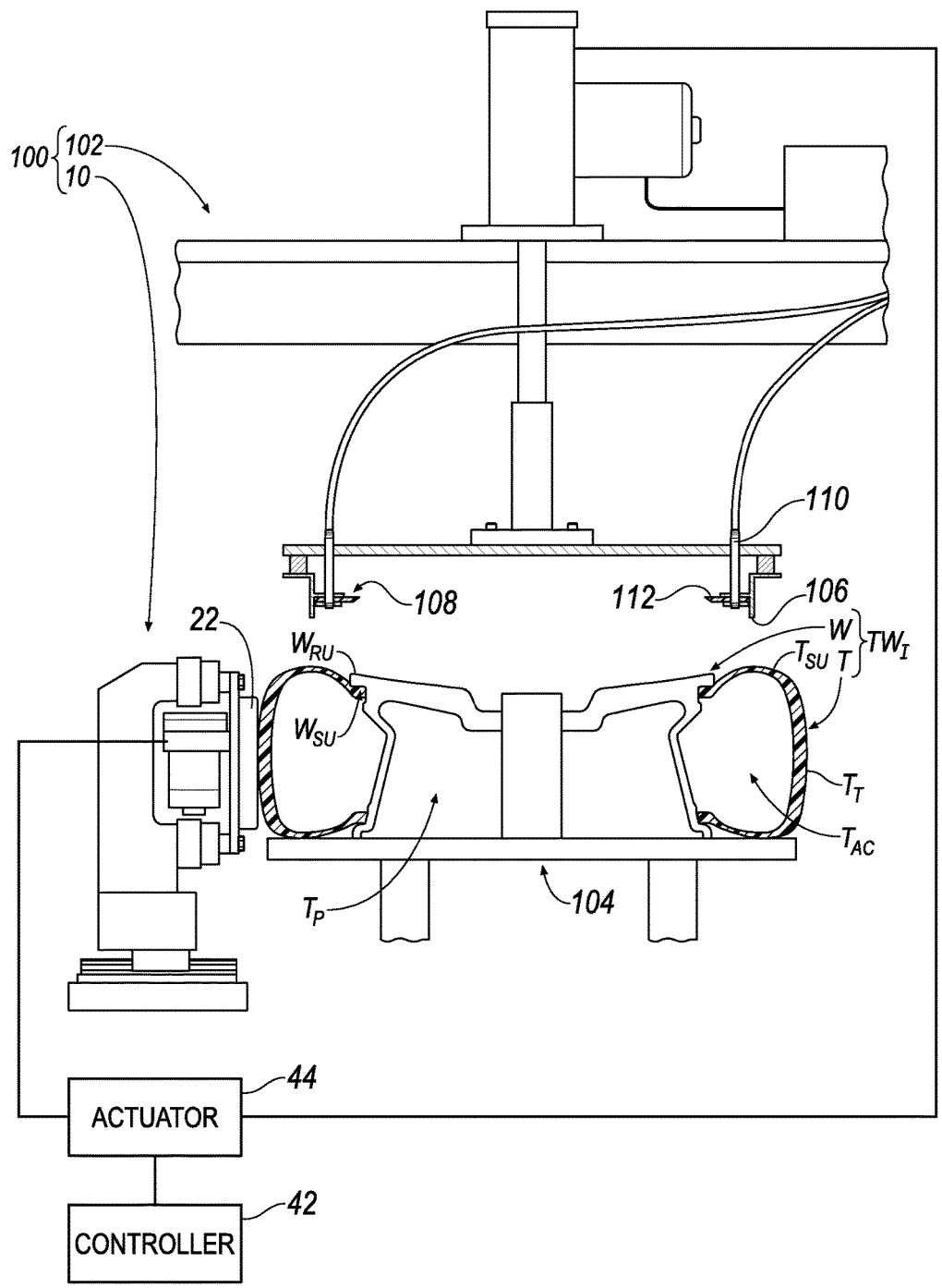

As the fluid further fills the circumferential air cavity, $T_{AC}$, of the tire, T, the inflator device 102 is further urged axially away from the tire-wheel assembly, TW, such that the flexible circumferential member 112 is transitioned from the "flopped" orientation of FIG. 6D back to the neutral orientation as seen in FIG. 6E. Once arranged in the neutral orientation as seen in FIG. 6E, the inflator device may no longer be in contact with the tire-wheel assembly, TW, and, as such, the tire-wheel assembly, $TW_I$, may be said to be arranged in an at least partially inflated state.

Referring to FIGS. 7A-7E, the inflator device 202 may include a tire sidewall engaging portion 206 that engages the upper sidewall, $T_{SU}$, of the tire, T, and a wheel engaging portion 208 that engages one or more of the upper rim, $W_{RU}$, the safety bead, $W_{SB}$, and upper bead seat, $W_{SU}$, of the wheel, W. The tire sidewall engaging portion 206 and the wheel engaging portion 208 may define an inflation conduit 210 for passing a fluid from a fluid source and into the circumferential air cavity, $T_{AC}$, of the tire, T, for inflating the tire, T. In some implementations, the inflator device 202 may include at least one (e.g., two) inflation conduits 210 that are arranged in a diametrically-opposing relationship and supported by an axial head member 212. In some implementations, the inflation conduit 210 may be connected to the axial head member 212 by a pivot joint 214 in order to permit the inflation conduit 210 to pivot toward the axial head member 212 or pivot away from the axial head member 212.

Referring to FIG. 7A, the inflator device 202 is shown in an at-rest, spaced-apart orientation with respect to the non-inflated tire-wheel assembly, $TW_{NI}$. The controller 42 may send a signal to the actuator 44 for causing the axial head member 212 to axially plunge toward the non-inflated tire-wheel assembly, $TW_{NI}$. As the axial head member 212 axially plunges toward the non-inflated tire-wheel assembly, $TW_{NI}$, the controller 42 may send a signal to the actuator 44 for causing the at least one inflation conduit 210 to pivot about the pivot joint 214 such that the at least one inflation conduit 210 pivots away from the axial head member 212.

Referring to FIG. 7B, as the axial head member 212 is interfaced with an opening, $W_O$, formed by the wheel, W, the controller 42 may send a signal to the actuator 44 for causing the at least one inflation conduit 210 to pivot about the pivot joint 214 such that the at least one inflation conduit 210 pivots toward the axial head member 212. By pivoting the at least one inflation conduit 210 about the pivot joint 214 such that the at least one inflation conduit 210 pivots toward the axial head member 212, the tire sidewall engaging portion 206 may be arranged in an opposing relationship or in direct engagement with the upper sidewall, $T_{SU}$, of the tire, T, and, the wheel engaging portion 208 may engage one or more of the safety bead, $W_{SB}$, and upper bead seat, $W_{SU}$, of the wheel, W.

Then, as seen in FIG. 7C, the controller 42 may send a signal to the actuator 44 for causing a fluid to be passed through the at least one inflation conduit 210 for filling the circumferential air cavity, $T_{AC}$, of the tire, T, with the fluid.

As the fluid is passed through the at least one inflation conduit 210 for filling the circumferential air cavity, $T_{AC}$, of the tire, T, with the fluid, the controller 42 may send a signal to the actuator 44 may gradually pivoting the at least one inflation conduit 210 about the pivot joint 214 such that the at least one inflation conduit 210 pivots away from the axial head member 212 as the axially head member is axially withdrawn from the opening, $W_O$, formed by the wheel, W, and away from the tire-wheel assembly, TW. Once the at least one inflation conduit 210 pivots about the pivot joint 214 away from the axial head member 212 and when the axial head member 212 is axially withdrawn away from and is no longer in contact with the tire-wheel assembly, TW, the tire-wheel assembly, $TW_I$, may be said to be arranged in an at least partially inflated state.

Figure 8:
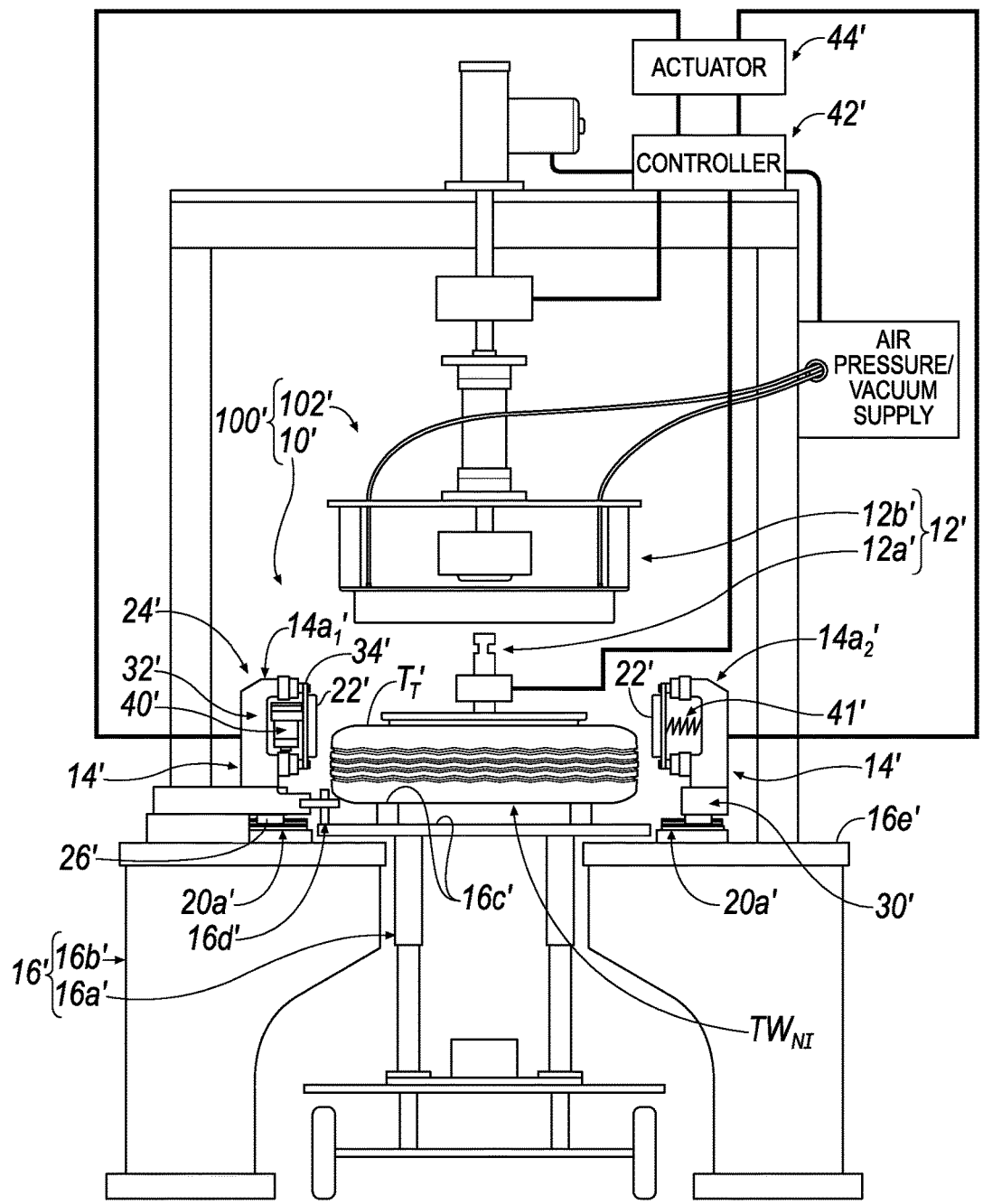
FIG. 8 is a front view of an apparatus for processing a tire and a wheel in accordance with an exemplary embodiment of the invention.
Figure 15A:
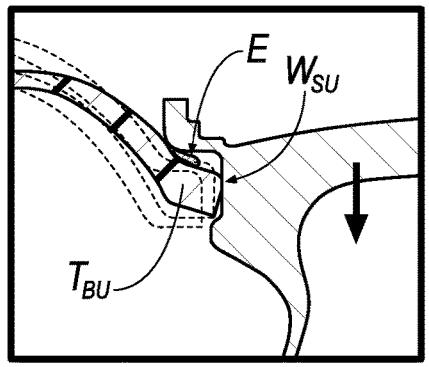
FIG. 15A is an enlarged view of the tire-wheel assembly according to line 15A of FIG. 14K.
Figure 16A:
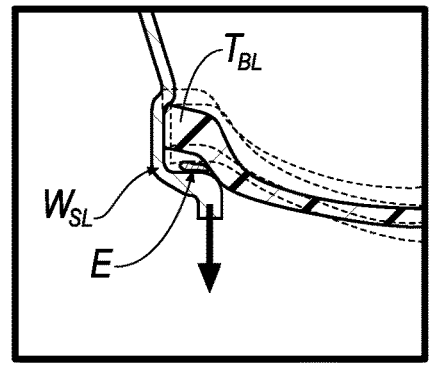
FIG. 16A is an enlarged view of the tire-wheel assembly according to line 16A of FIG. 14K.
Figure 16B:
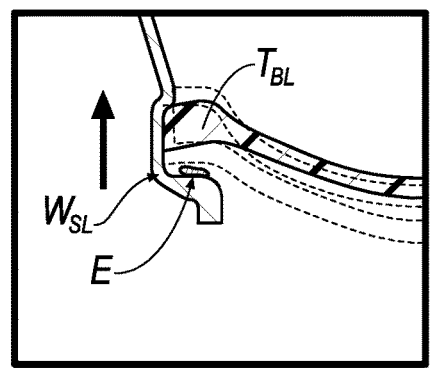
FIG. 16B is an enlarged view of the tire-wheel assembly according to line 16B of FIG. 14L.

Referring to FIG. 8, an apparatus 10' for processing a tire-wheel assembly, TW, is shown according to an embodiment. Upon being interfaced with the apparatus 10', the tire-wheel assembly, $TW_{NI}$, has previously been subjected to one or more processing acts. The one or more earlier processing acts may include, for example, an act of: "joining" or "mounting" a tire, T (see, e.g., FIGS. 17A-17D), to a wheel, W (see, e.g., FIGS. 18A-18C), for forming a non-inflated tire-wheel assembly, $TW_{NI}$; the act of "joining" or "mounting" may mean to physically couple, connect or marry the tire, T, and wheel, W, such that the wheel, W, may be referred to as a male portion that is inserted into a passage, $T_P$, of the tire, T, being a female portion. As will be describing in the following disclosure at FIGS. 14A-14N, the apparatus 10' may be utilized before, during, and/or after another processing act, which may include, for example, the act of "inflating" the tire-wheel assembly, TW; the act of "inflating" may include directing air into the circumferential air cavity, $T_{AC}$ (see, e.g., FIG. 17B), of the tire, T, of the tire-wheel assembly, TW. As a result of the act of "inflating," the upper bead, $T_{BU}$, and the lower bead, $T_{BL}$, of the tire, T, may be disposed (or "seated") adjacent the upper bead seat, $W_{SU}$, and the lower bead seat, $W_{SL}$, of the wheel, W, as seen in, for example, FIGS. 15A, 16A and 20A. Therefore, upon being interfaced with the apparatus 10', in some implementations, the tire-wheel assembly, TW, may be said to be initially arranged in a non-inflated state (as seen in, e.g., FIGS. 8 and 14A).

As seen in, for example, FIGS. 14F-14L, another processing act conducted by the apparatus 10' may include the act of "exercising" the tire, T, relative the wheel, W (as seen in, e.g., FIGS. 14F-14H), and/or, alternatively, "exercising" the wheel, W, relative the tire, T (as seen in, e.g., FIGS. 14K-14L), in order to fully seat the upper bead, $T_{BU}$, and the lower bead, $T_{BL}$, of the tire, T, adjacent the upper bead seat, $W_{SU}$, and the lower bead seat, $W_{SL}$, of the wheel, W, respectively. In some circumstances, entrapments, E (see, e.g., FIGS. 15A-16B and 20A), such as, for example: air bubbles, lubricant/soap, impurities or the like may be undesirably located between a bead, $T_{BU}/T_{BL}$, of the tire, T, and the seat, $W_{SU}/W_{SL}$, of the wheel, W; by "exercising" the tire, T, relative the wheel, W, and/or, alternatively, the wheel, W, relative the tire, T, the entrapments, E, may be removed/withdrawn from the tire-wheel assembly, TW, such that one or more of the upper bead, $T_{BU}$, and the lower bead, $T_{BL}$, of the tire, T, may be fully seated adjacent one or more of the upper bead seat, $W_{SU}$, and the lower bead seat, $W_{SL}$, of the wheel, W. Accordingly, in the following disclosure, the apparatus 10' may hereinafter be referred to as a "tire-wheel assembly inflator and exerciser."

Referring to FIG. 8, some implementations of the tire-wheel assembly exerciser 10' may include at least, for example, a wheel-engaging portion 12' and a tire-engaging portion 14'. Both of the wheel-engaging portion 12' and the tire-engaging portion 14' are connected to a base portion 16'.

The base portion 16' may include a plurality of structural members $16a'$-$16b'$ that directly or indirectly engage one or more of the tire, T, and the wheel, W, during the processing acts conducted by the apparatus 10'. In an example, the base portion 16' may include a cart $16a'$ and a cart docking station $16b'$. An upper surface $16c'$ of the cart $16a'$ directly engages and supports the wheel, W, and, because the tire, T, is arranged about and supported by the wheel, W, the cart $16a'$ may indirectly support the tire, T. The cart $16a'$ presents the tire, T, arranged upon the wheel, W, in a non-inflated state (i.e., the tire-wheel assembly is a non-inflated tire-wheel assembly, $TW_{NI}$) to the cart docking station $16b'$. When the cart $16a'$ is interfaced with the cart docking station $16b'$, the cart $16a'$ may be selectively-joined to the cart docking station $16b'$ by mating structure $16d'$.

In some implementations, the wheel-engaging portion 12' may include a wheel baton $12a'$ and an inflator head $12b'$. The wheel baton $12a'$ may be inserted through a central opening, $W_O$ (see, e.g., FIGS. 14A-14N) formed by the wheel, W, for removably-joining the wheel baton $12a'$ to the wheel, W. As a result of the upper surface $16c'$ of the cart $16a'$ directly engaging and supporting the wheel, W, the wheel baton $12a'$ of the wheel-engaging portion 12' may be said to be indirectly connected to the cart $16a'$ of the base portion 16' by way of the wheel, W. In some implementations, the tire-engaging portion 14' is directly connected to an upper surface $16e'$ of the cart docking station $16b'$ of the base portion 16'.

Figure 14A:
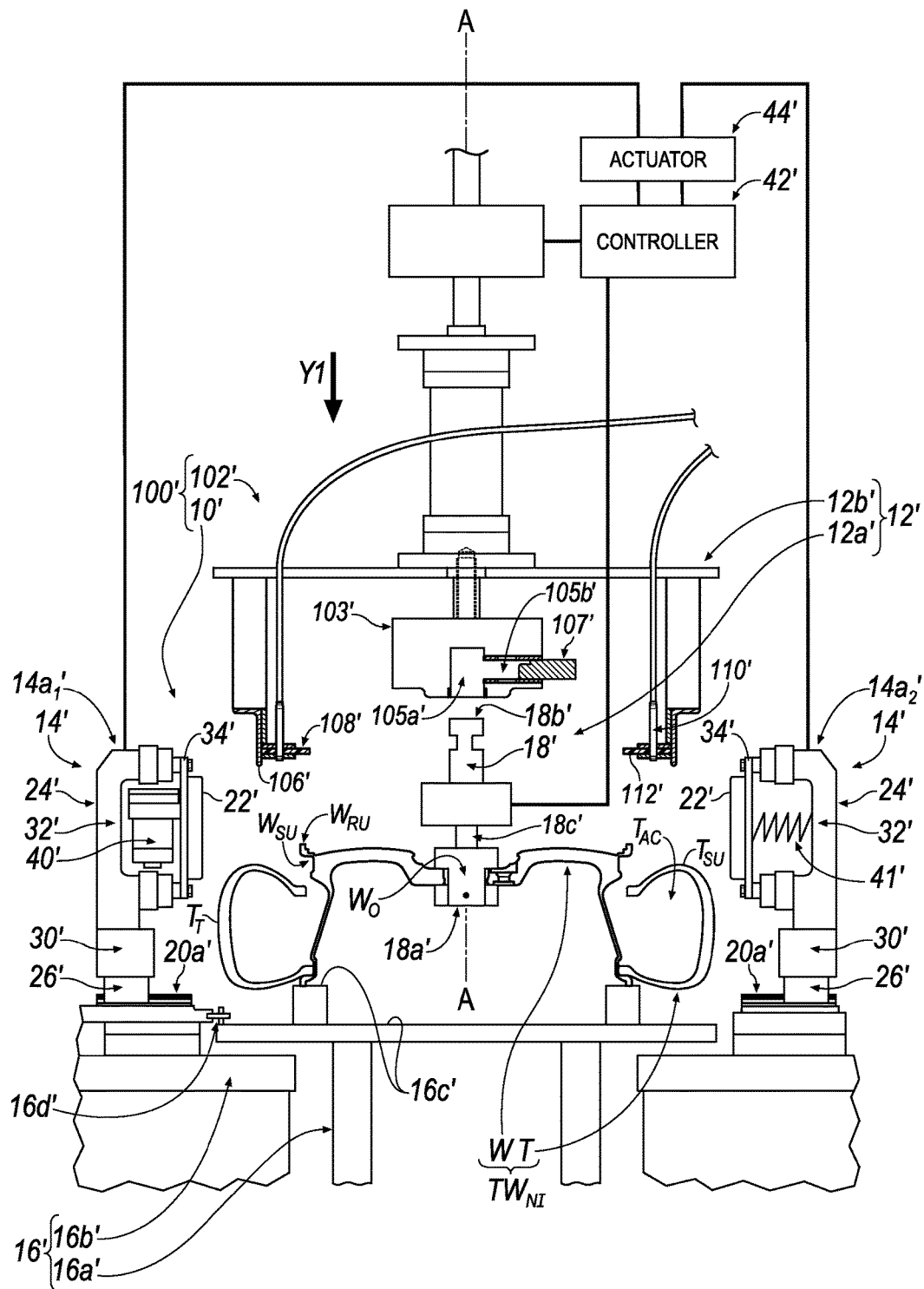
FIGS. 14A-14N are partial cross-sectional side views of station for processing a tire-wheel assembly including an inflation device and the apparatus of FIG. 8.
Figure 14B:
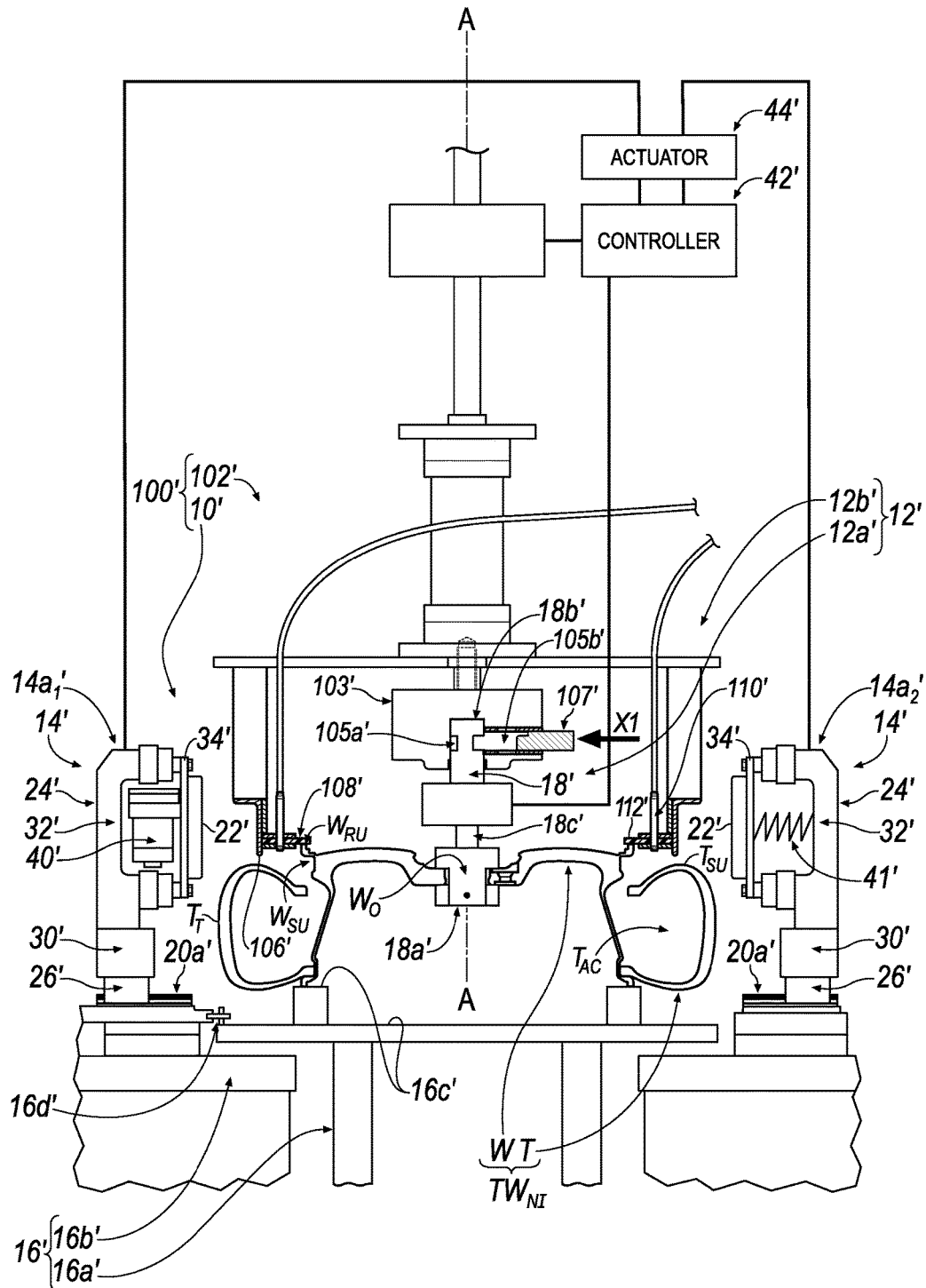
Figure 14C:
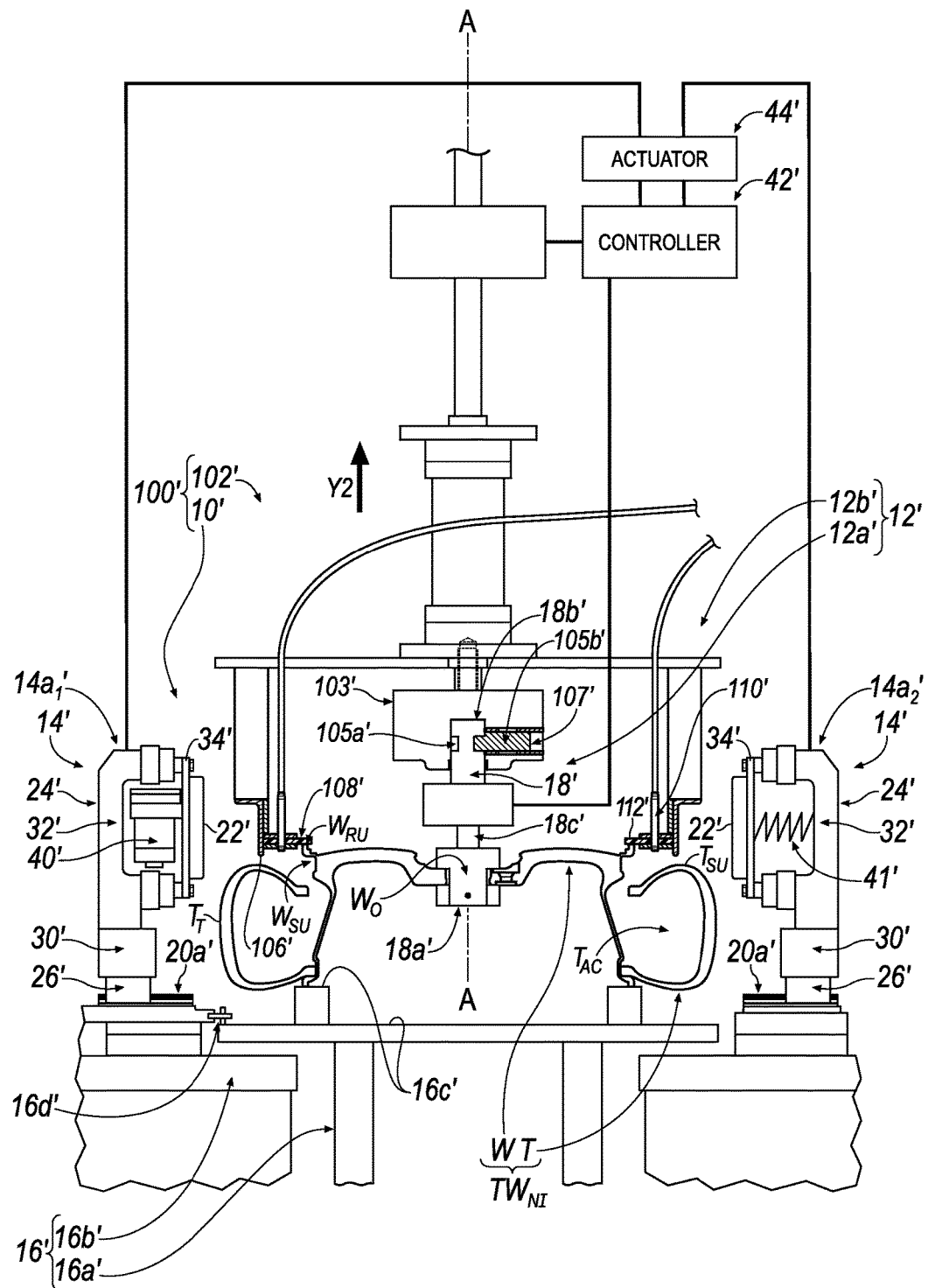
Figure 14D:
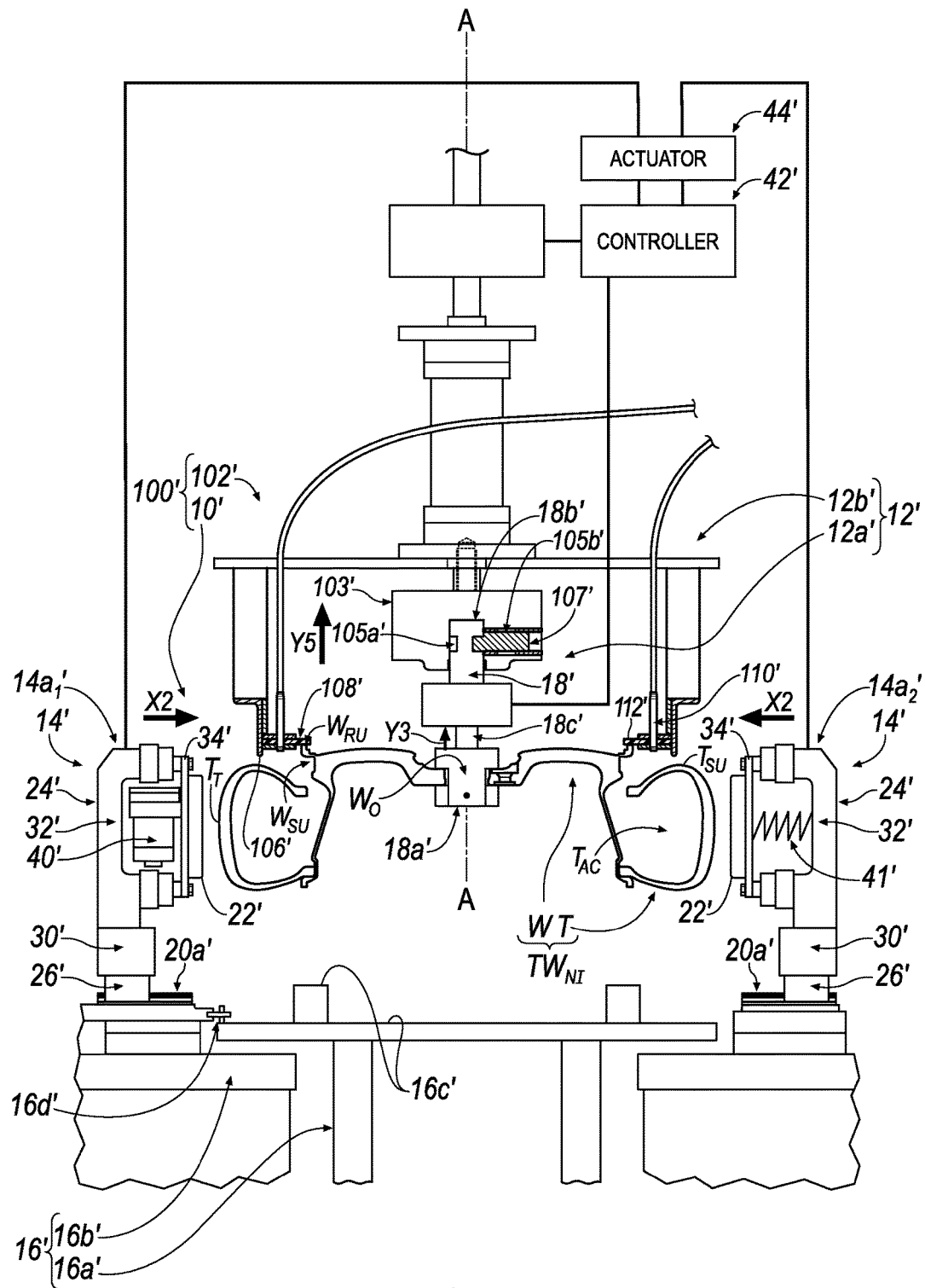
Figure 14E:
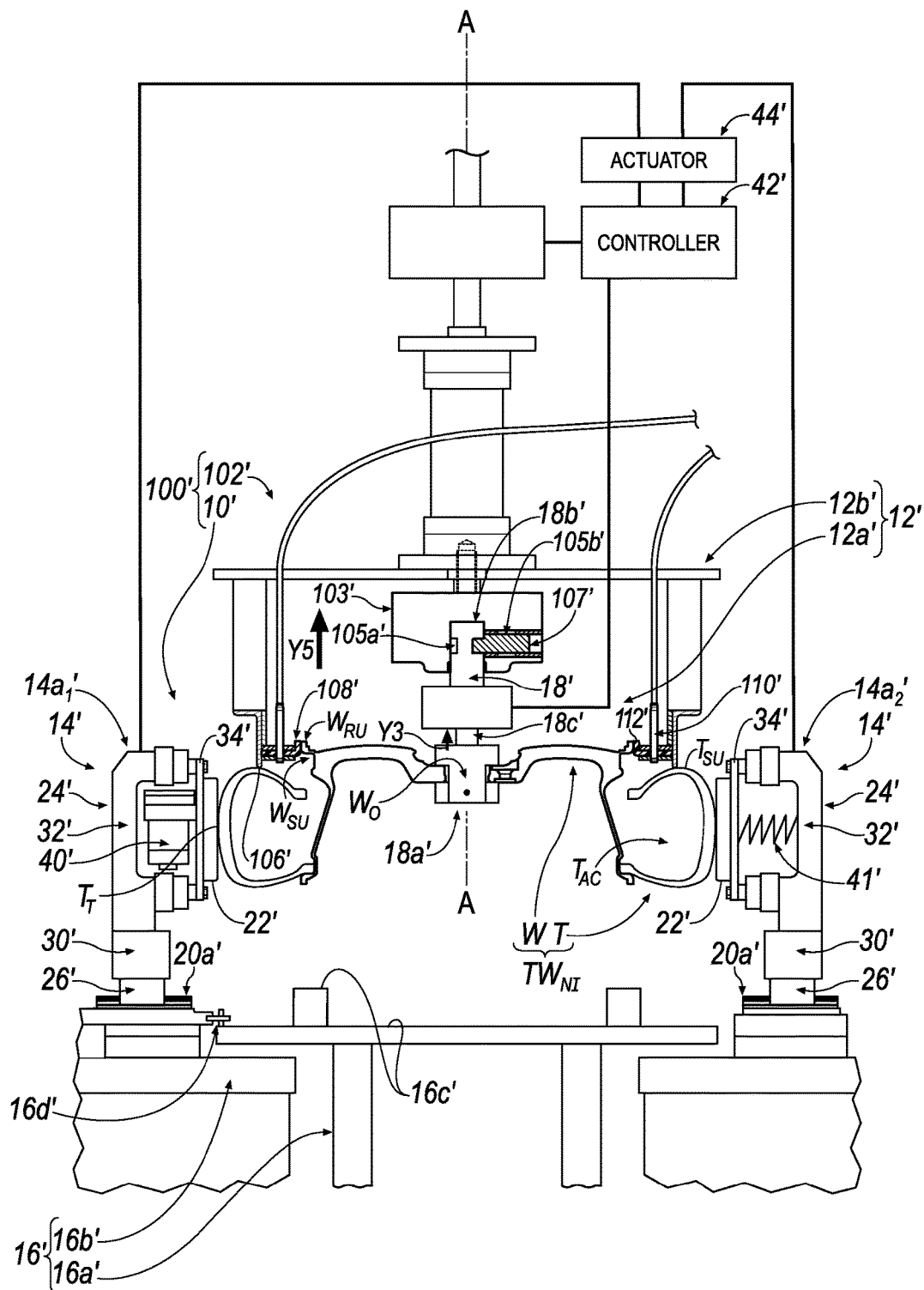
Figure 14F:
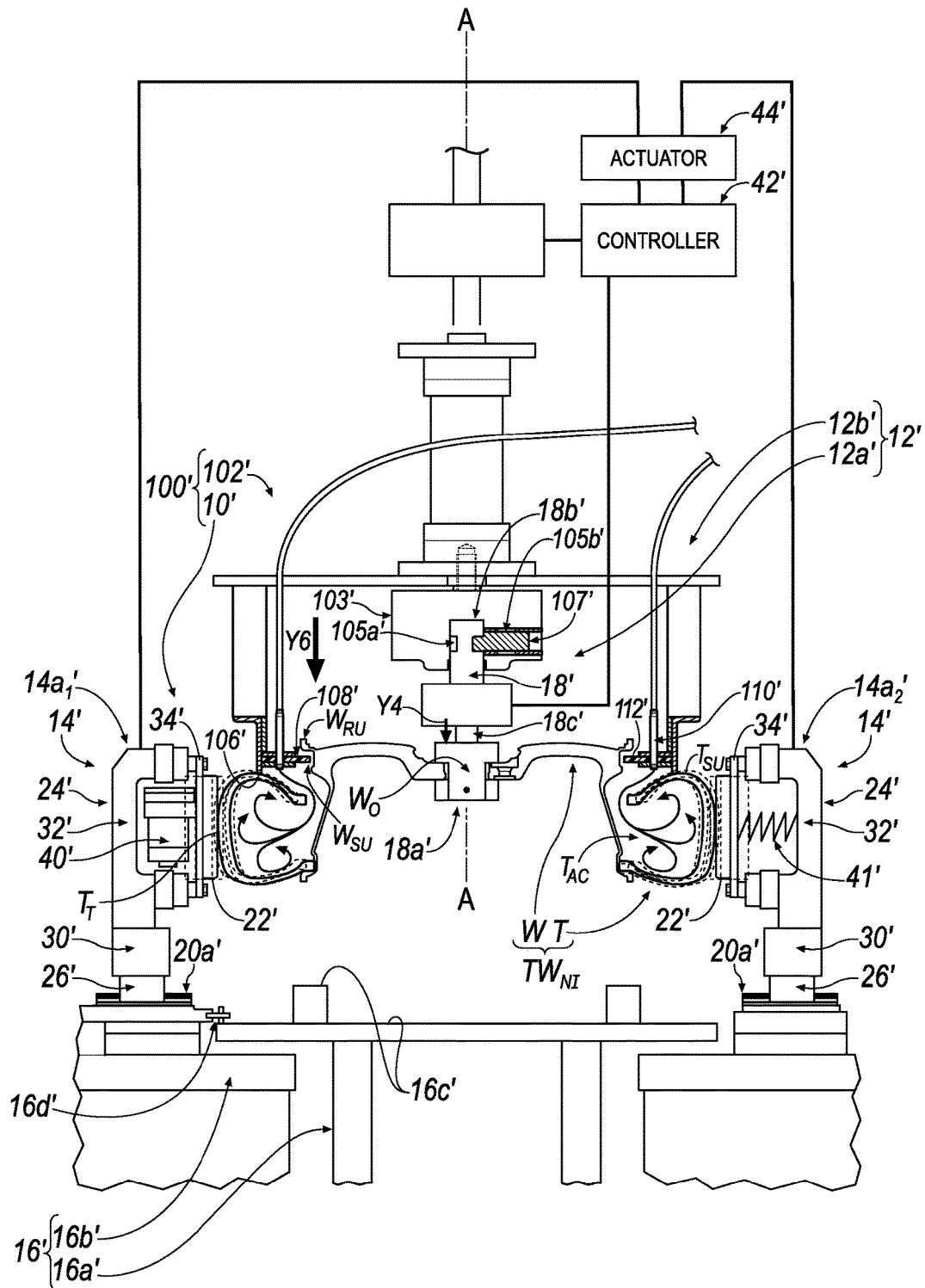
Figure 14G:
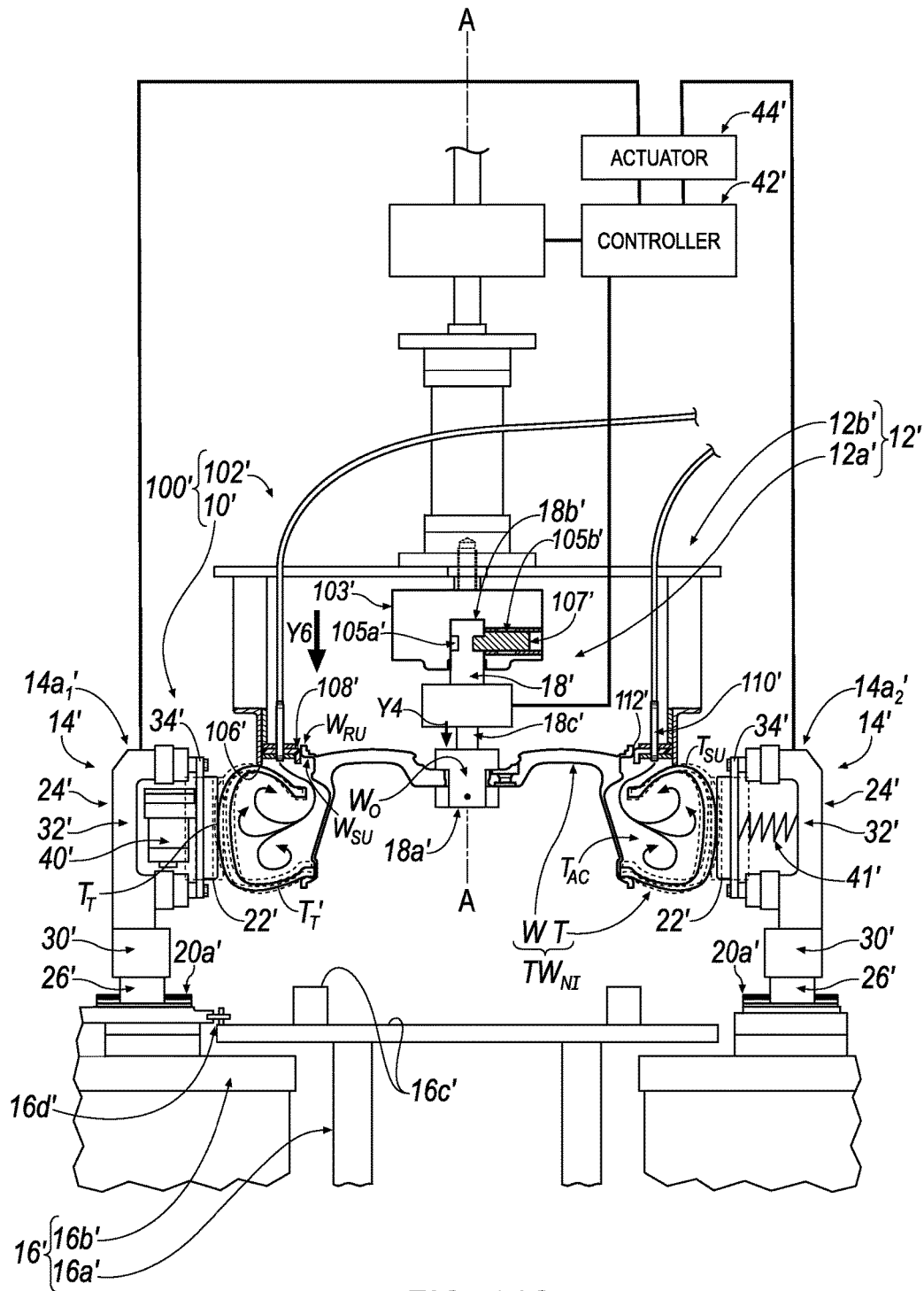
Figure 14H:
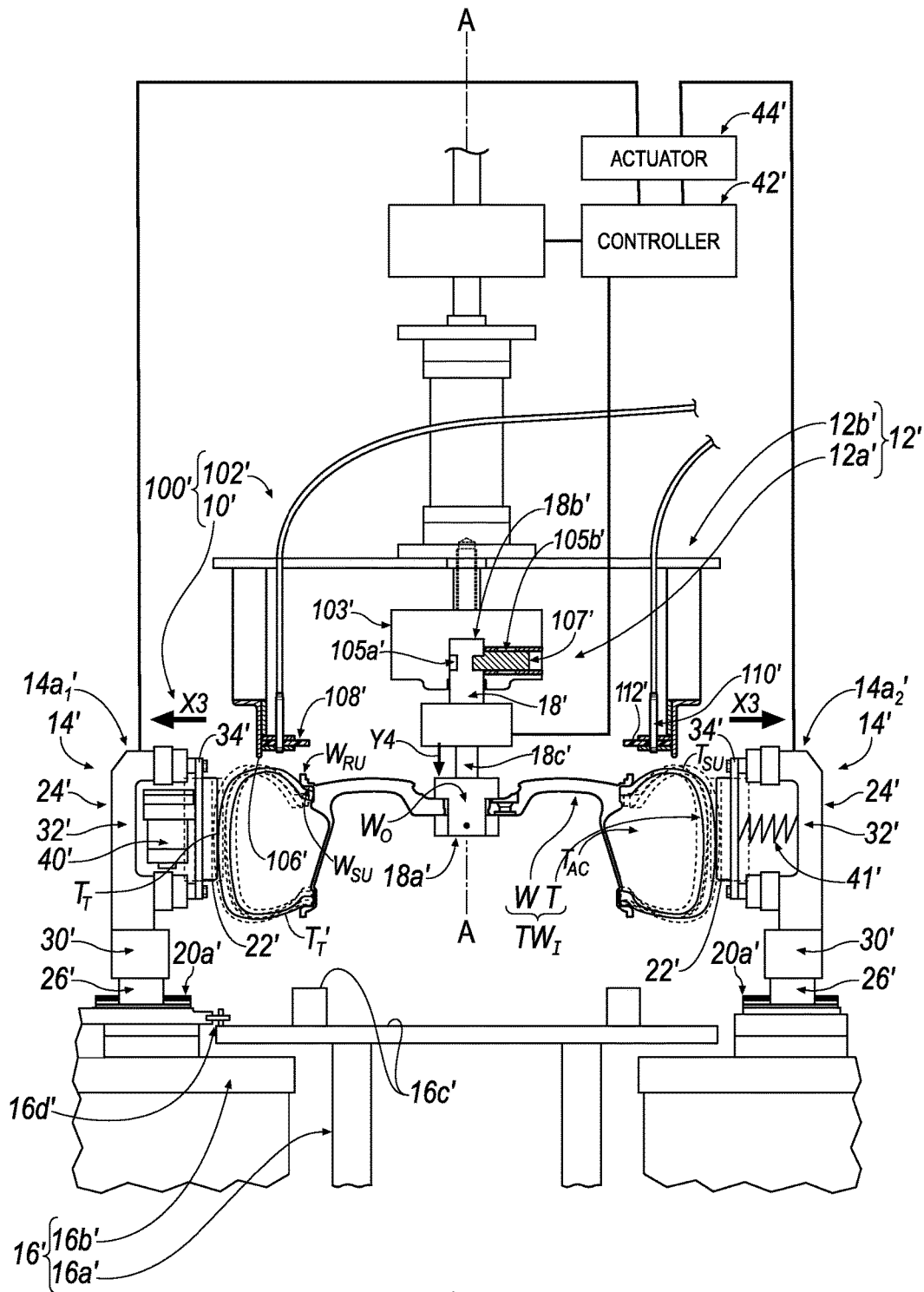
Figure 14I:
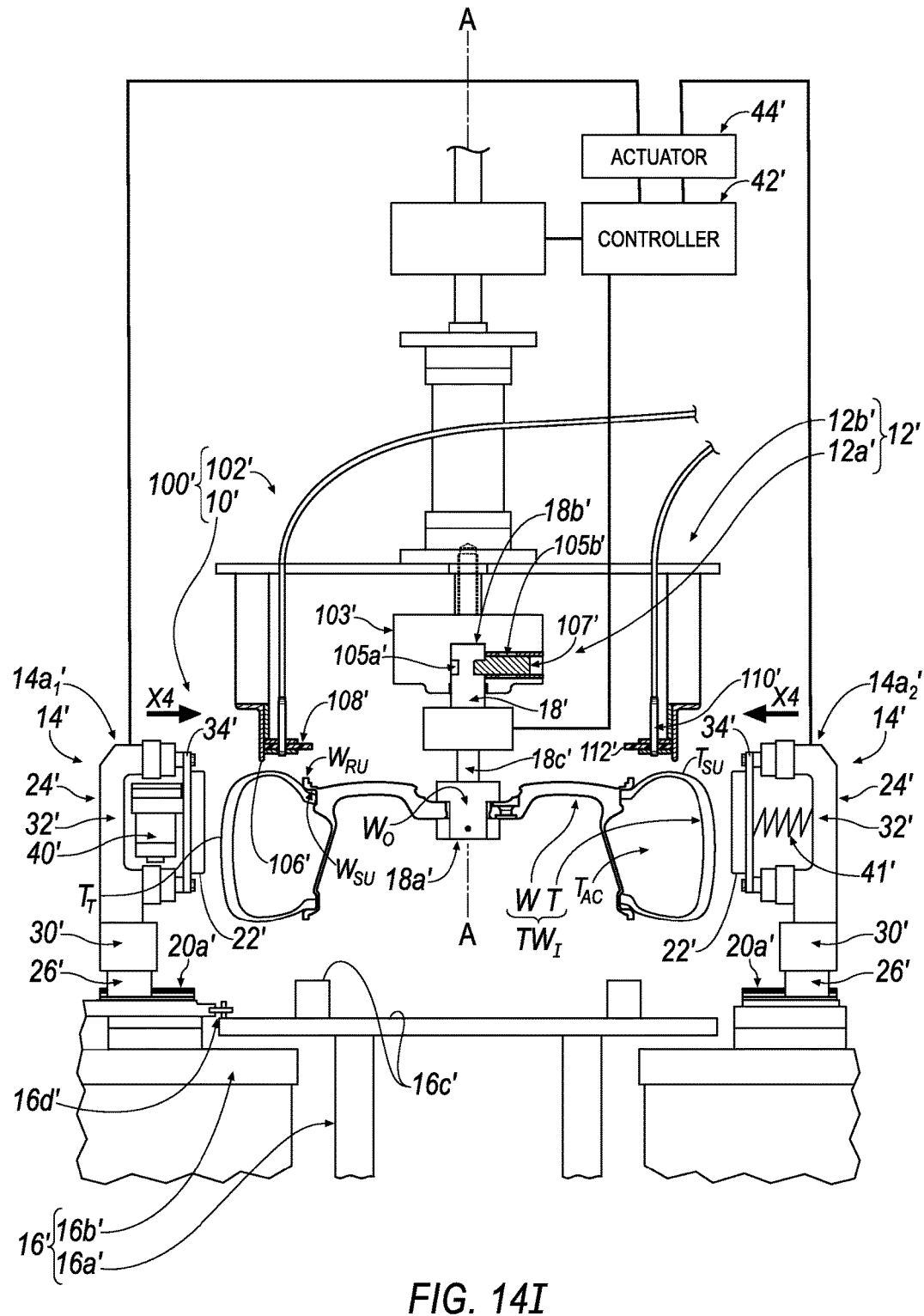
Figure 14J:
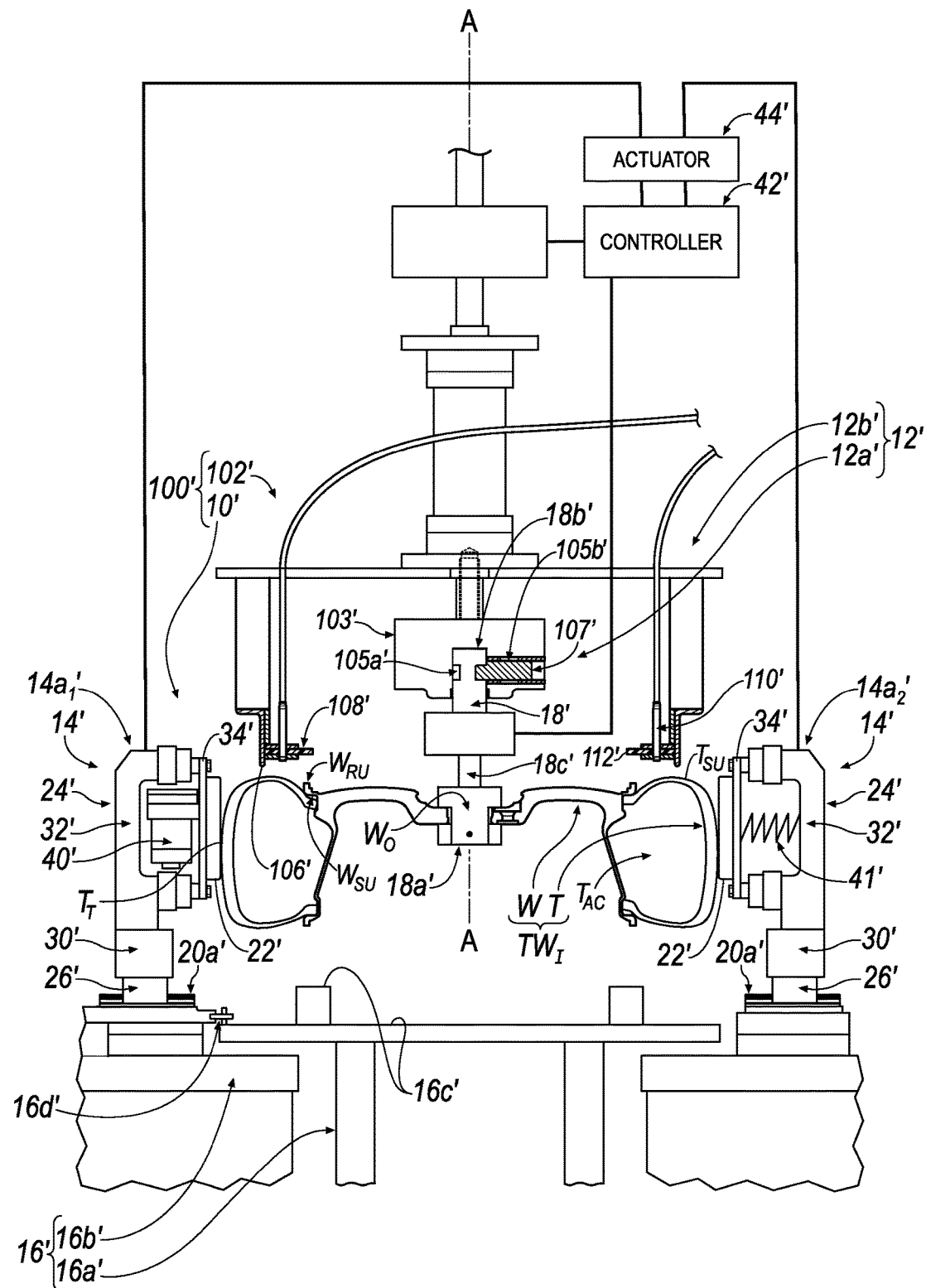
Figure 14K:
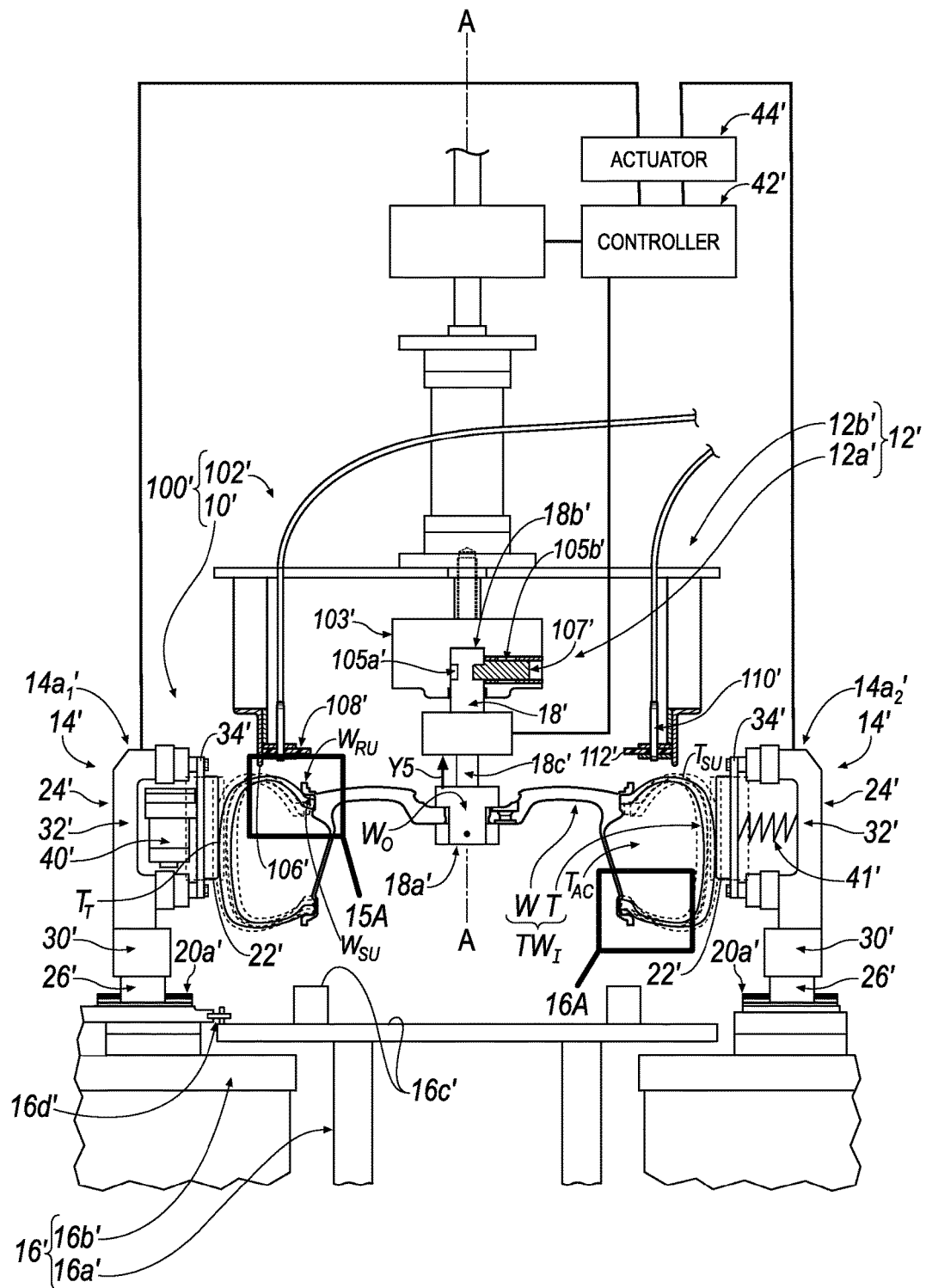
Figure 14L:
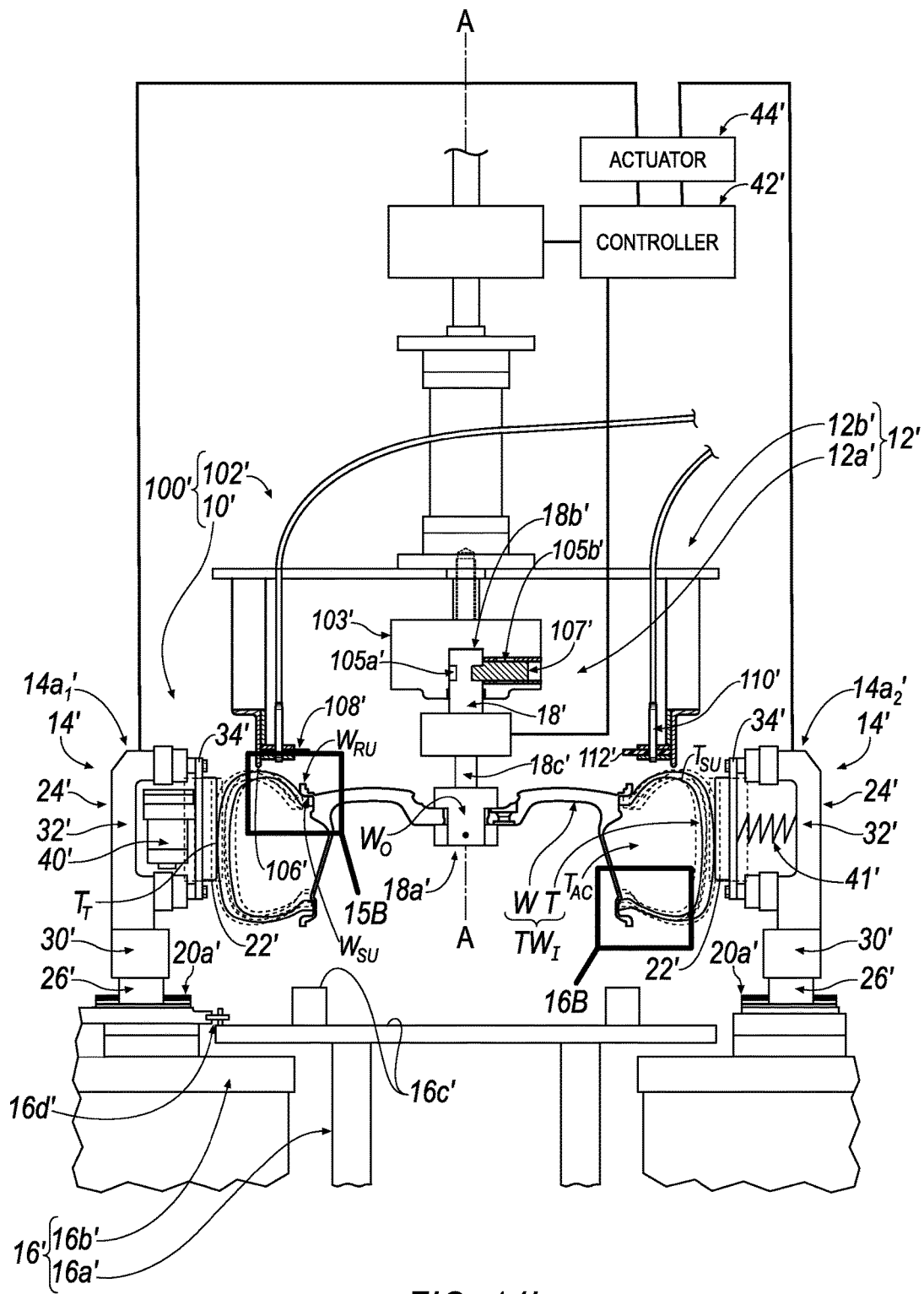
Figure 14M:
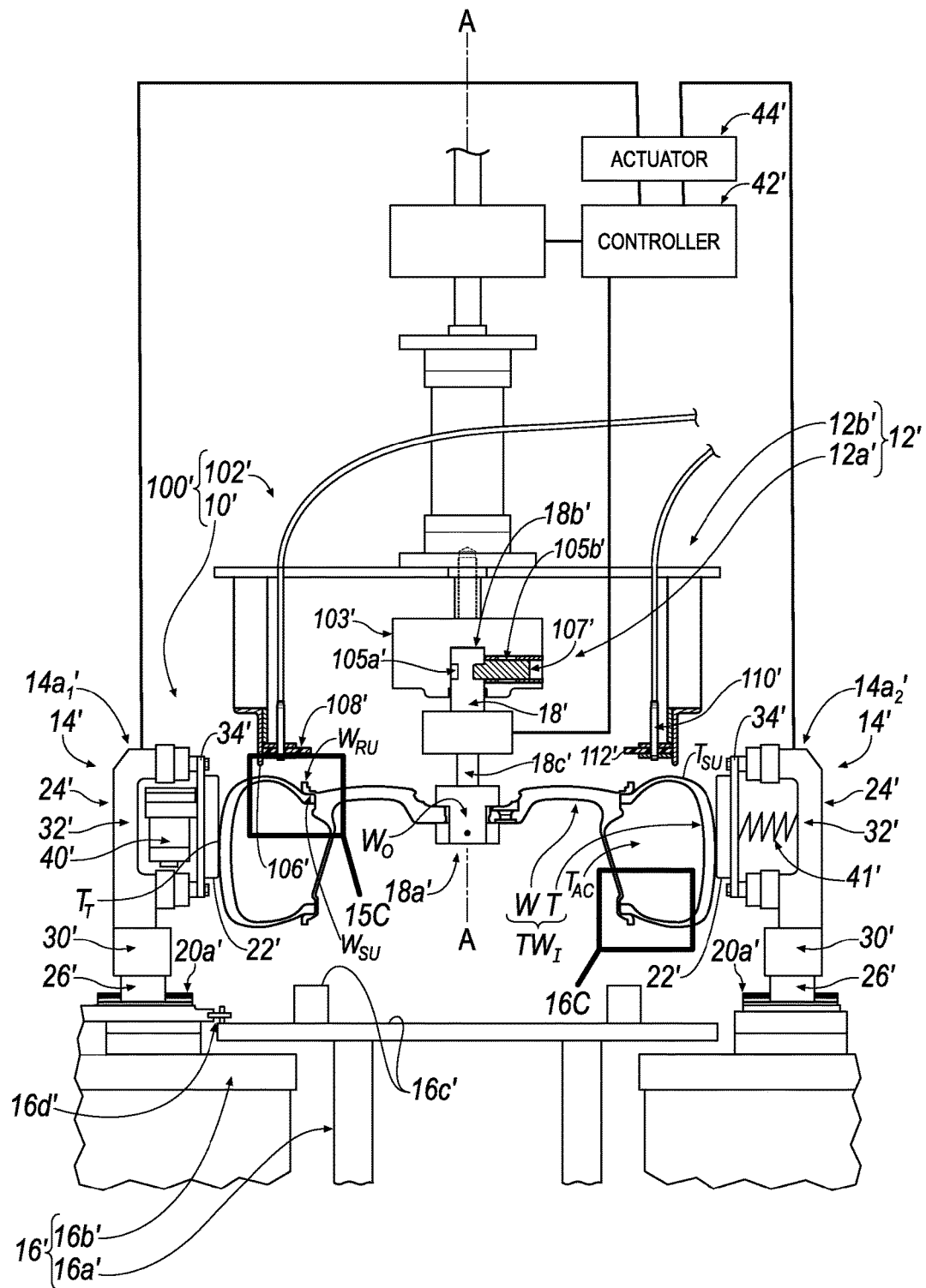
Figure 14N:
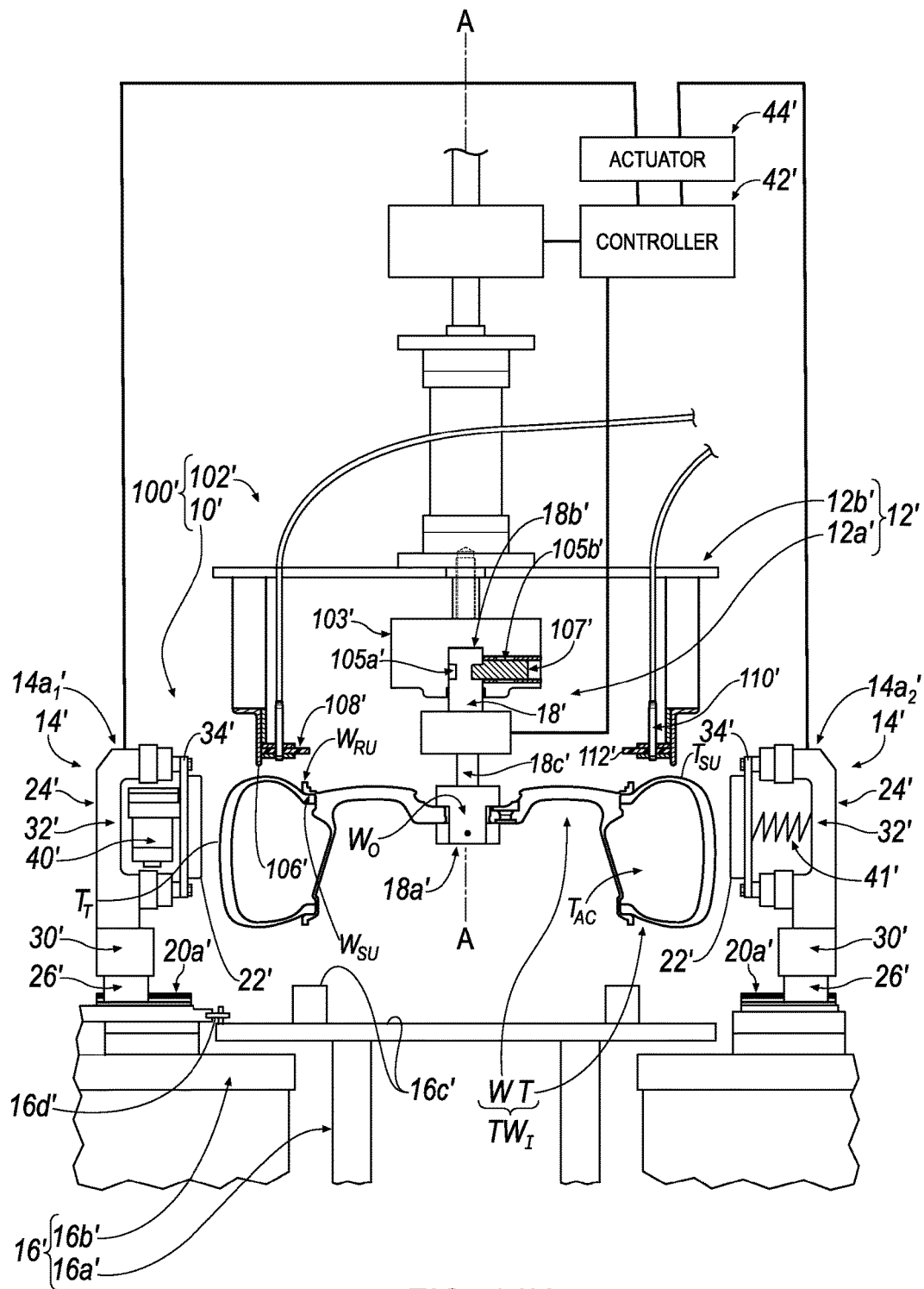

With reference to FIGS. 14A-14N, some implementations of the wheel baton $12a'$ include a stem member 18' having a proximal end $18a'$ and a distal end $18b'$. The proximal end $18a'$ of the stem member 18' is removably-connected to the central opening, $W_O$, formed by the wheel, W. An axis, A-A, extends through the stem member 18'; the axis, A-A, is orthogonal to the upper surface $16c'$ of the cart $16a'$.

Figure 9A:
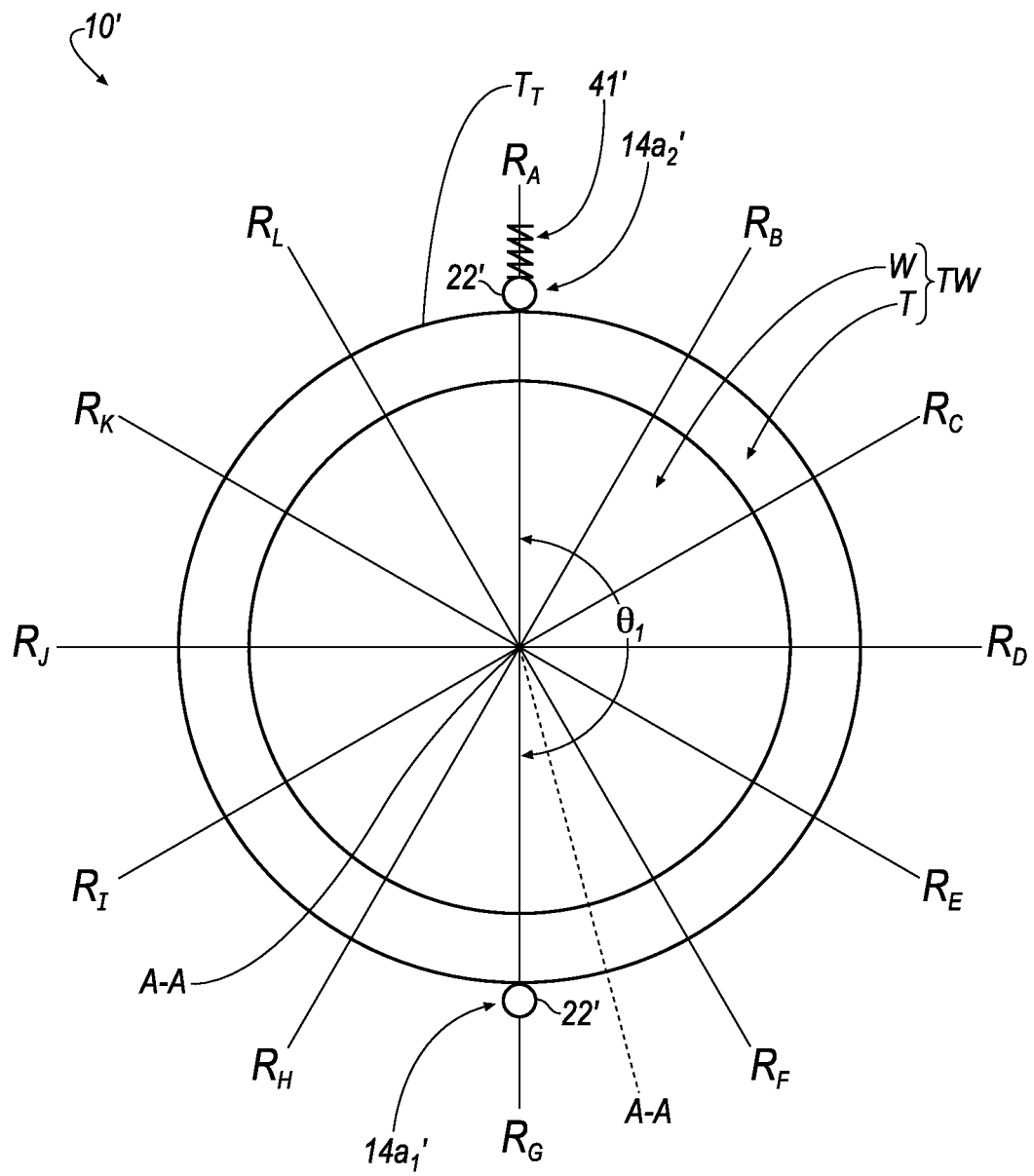
FIG. 9A is a simplified top view of the apparatus of FIG. 8 arranged in a deactivated state.
Figure 9B:
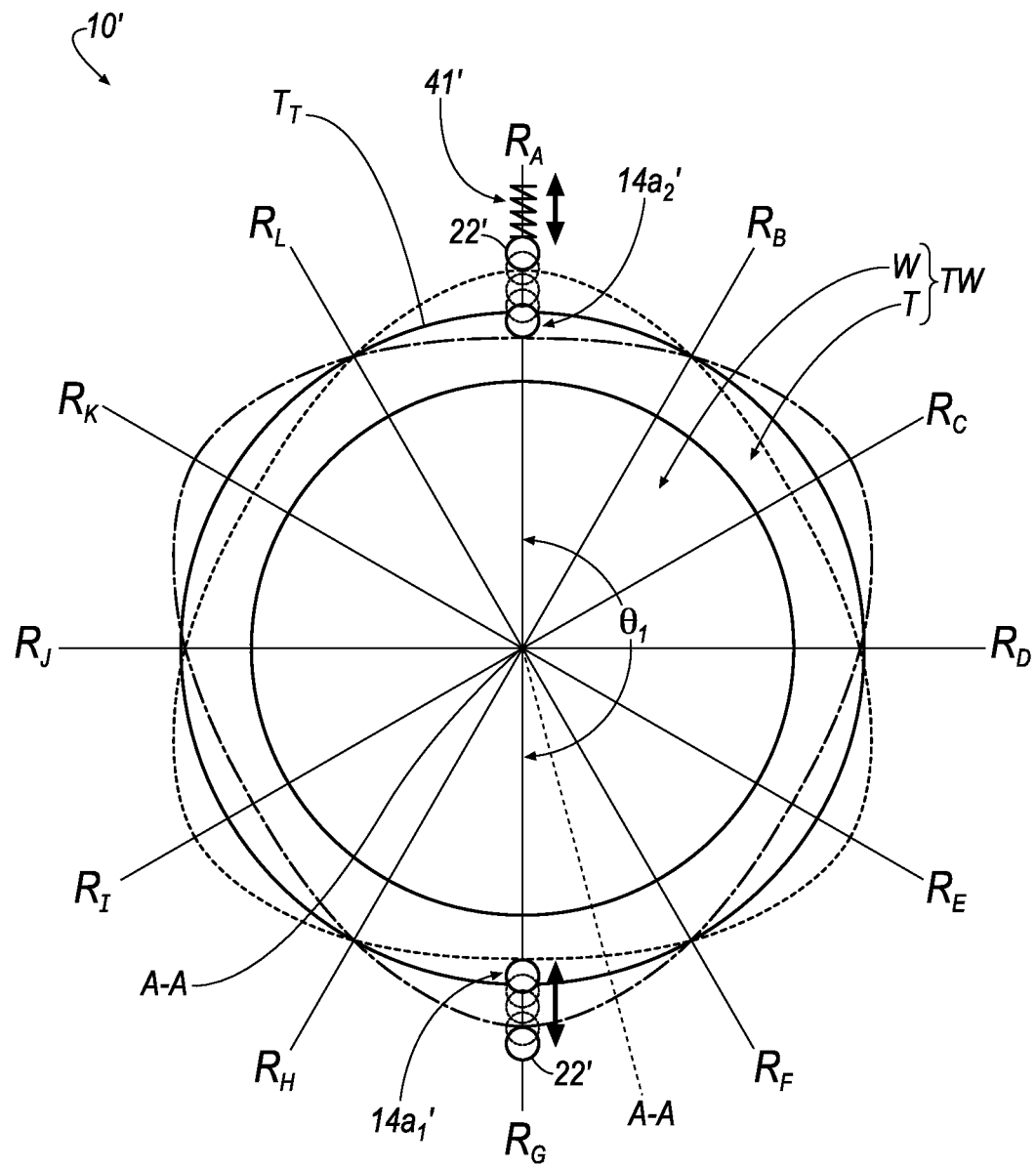
FIG. 9B is another view of the apparatus of FIG. 9A arranged in an activated state.
Figure 10A:
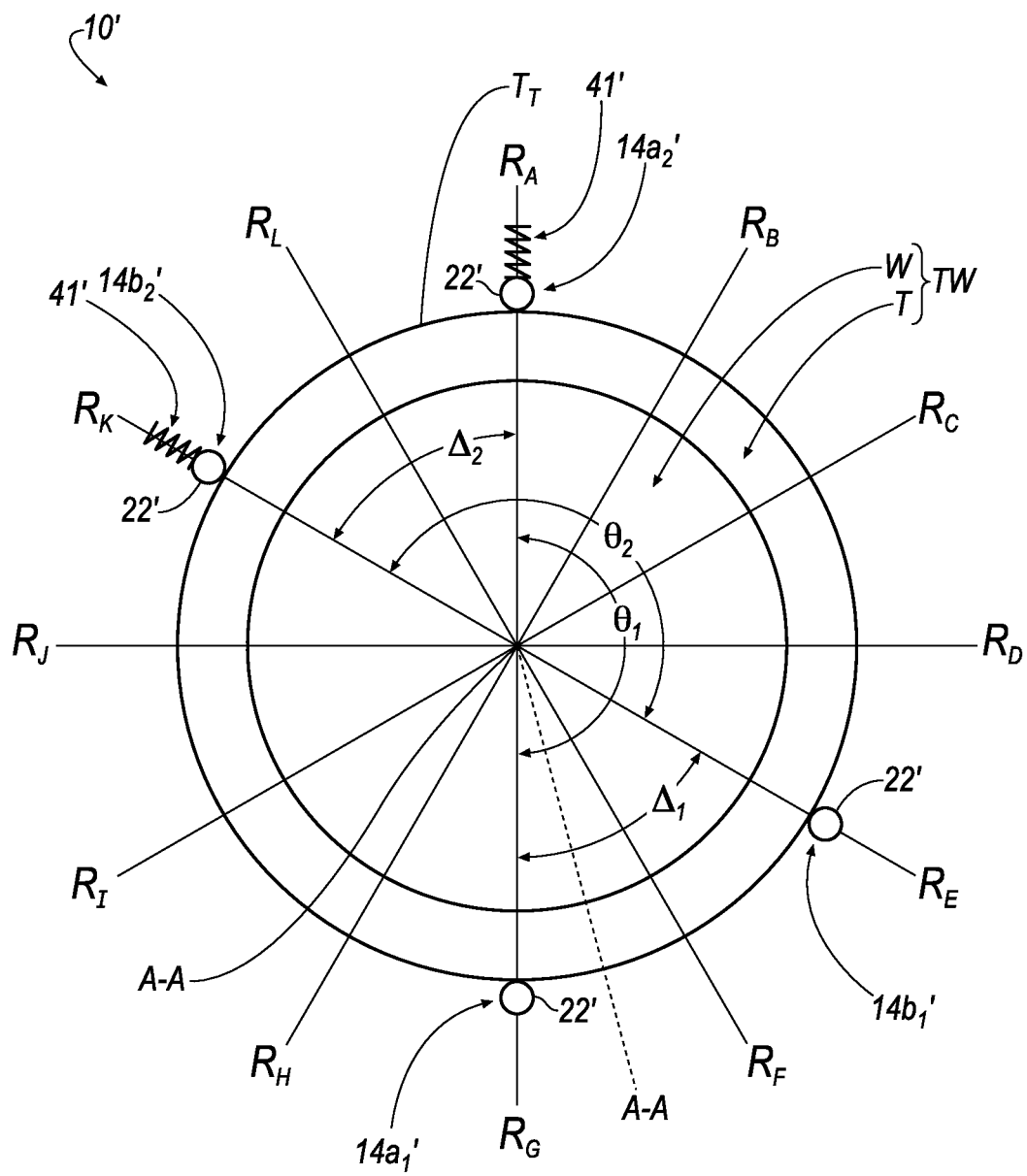
FIG. 10A is a simplified top view of the apparatus of FIG. 8 arranged in a deactivated state.
Figure 10B:
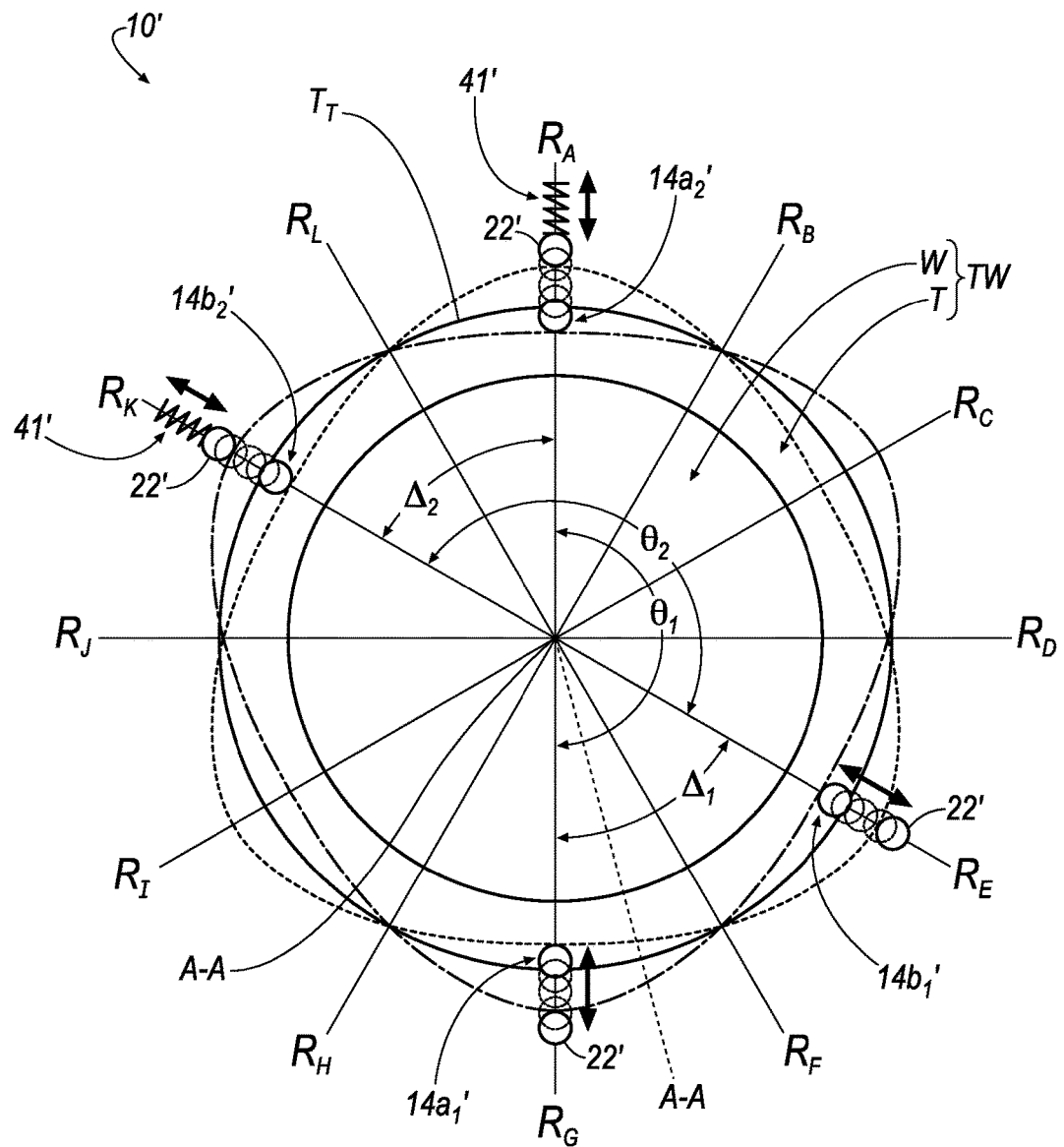
FIG. 10B is another view of the apparatus of FIG. 9A arranged in an activated state.

Referring to FIGS. 8 and 9A-9B, in some implementations, the tire-engaging portion 14' includes at least one pair of diametrically-opposing members including a first tire-tread-engaging device $14a_1'$ and a second tire-tread-engaging device $14a_2'$. Referring to FIGS. 8 and 10A-10B, in other implementations, the tire-engaging portion 14' includes a first pair of diametrically-opposing members including a first tire-tread-engaging device $14a_1'$, a second tire-tread-engaging device $14a_2'$ and a second pair of diametrically-opposing members including a third tire-tread-engaging device $14b_1'$ and a fourth tire-tread-engaging device $14b_2'$.

With reference to FIG. 8, each of the first, second, third and fourth tire-tread-engaging devices $14a_1'$, $14a_2'$, $14b_1'$, $14b_2'$ may be slidably-arranged upon the upper surface $16e'$ of the cart docking station $16b'$. In some implementations, the first, second, third and fourth tire-tread-engaging devices $14a_1'$, $14a_2'$, $14b_1'$, $14b_2'$ may be slidably-arranged upon guide tracks $20a'$ (see also, e.g., guide tracks $20a$, $20b$ of FIGS. 1A-1C) that may be connected to the upper surface $16e'$ of the cart docking station $16b'$.

With reference to FIGS. 9A-9B and 10A-10B, each guide track $20a'$ associated with each tire-tread-engaging device $14a_1'$, $14a_2'$, $14b_1'$, $14b_2'$ is aligned with a unique radius (see, e.g., radial reference lines $R_A$, $R_G$ of radial reference lines $R_A$-$R_L$ of FIGS. 9A-9B and radial reference lines $R_A$, $R_E$, $R_G$, $R_K$ of radial reference lines $R_A$-$R_L$ in FIGS. 10A-10B) that project away from the axis, A-A. By permitting each tire-tread-engaging device $14a_1'$, $14a_2'$, $14b_1'$, $14b_2'$ to be slidably-arranged upon the guide tracks, the tire-tread-engaging device $14a_1'$, $14a_2'$, $14b_1'$, $14b_2'$ may be radially adjusted (e.g., along the radial reference lines $R_A$, $R_G$ and $R_A$, $R_E$, $R_G$, $R_K$) radially toward or radially away from the axis, A-A, that extends through the stem member 18.

Referring to FIGS. 9A-9B and 10A-10B, the first pair of diametrically-opposing tire-tread-engaging devices $14a_1'$, $14a_2'$, are radially offset at an angle, $\theta_1$; in an implementation, the angle, $\theta_1$, is equal to approximately about 180°. Referring to FIG. 10A-10B, the second pair of diametrically-opposing tire-tread-engaging devices $14b_1'$, $14b_2'$, are radially offset at an angle, $\theta_2$; in an implementation, the angle, $\theta_2$, is equal to approximately about 180°. As a result of the exemplary arrangement of the diametrically-opposing tire-tread-engaging devices $14a_1'$, $14a_2'$; $14b_1'$, $14b_2'$ described above at FIGS. 9A-9B and 10A-10B, the diametrically-opposing tire-tread-engaging devices $14a_1'$, $14a_2'$ result in a high amplitude vibrational response imparted to the tire, T.

Referring to FIG. 10A-10B, a first pair of neighboring tire-tread-engaging devices $14a_1'$ and $14b_1'$ of the first and second pair of diametrically-opposing tire-tread-engaging devices $14a_1'$, $14a_2'$; $14b_1'$, $14b_2'$ are radially offset at an angle, $\Delta_1$. In some implementations, the angle, $\Delta_1$, is equal to approximately about 60°. Referring to FIG. 10A-10B, a second pair of neighboring tire-tread-engaging devices $14a_2'$ and $14b_2'$ of the first and second pair of diametrically-opposing tire-tread-engaging devices $14a_1'$, $14a_2'$; $14b_1'$, $14b_2'$ are radially offset at an angle, $\Delta_2$. In some implementations, the angle, $\Delta_2$, is equal to approximately about 60°. As a result of the exemplary arrangement of the first and second pair of diametrically-opposing tire-tread-engaging devices $14a_1'$, $14a_2'$; $14b_1'$, $14b_2'$ described above at FIGS. 10A-10B, the first and second pair of diametrically-opposing tire-tread-engaging devices $14a_1'$, $14a_2'$; $14b_1'$, $14b_2'$ are said to be arranged non-collinearly such that each offset angle, $\Delta_1$, $\Delta_2$, is an acute angle (i.e., less than 90°), which results in a high amplitude vibrational response imparted to the tire, T.

Figure 13:
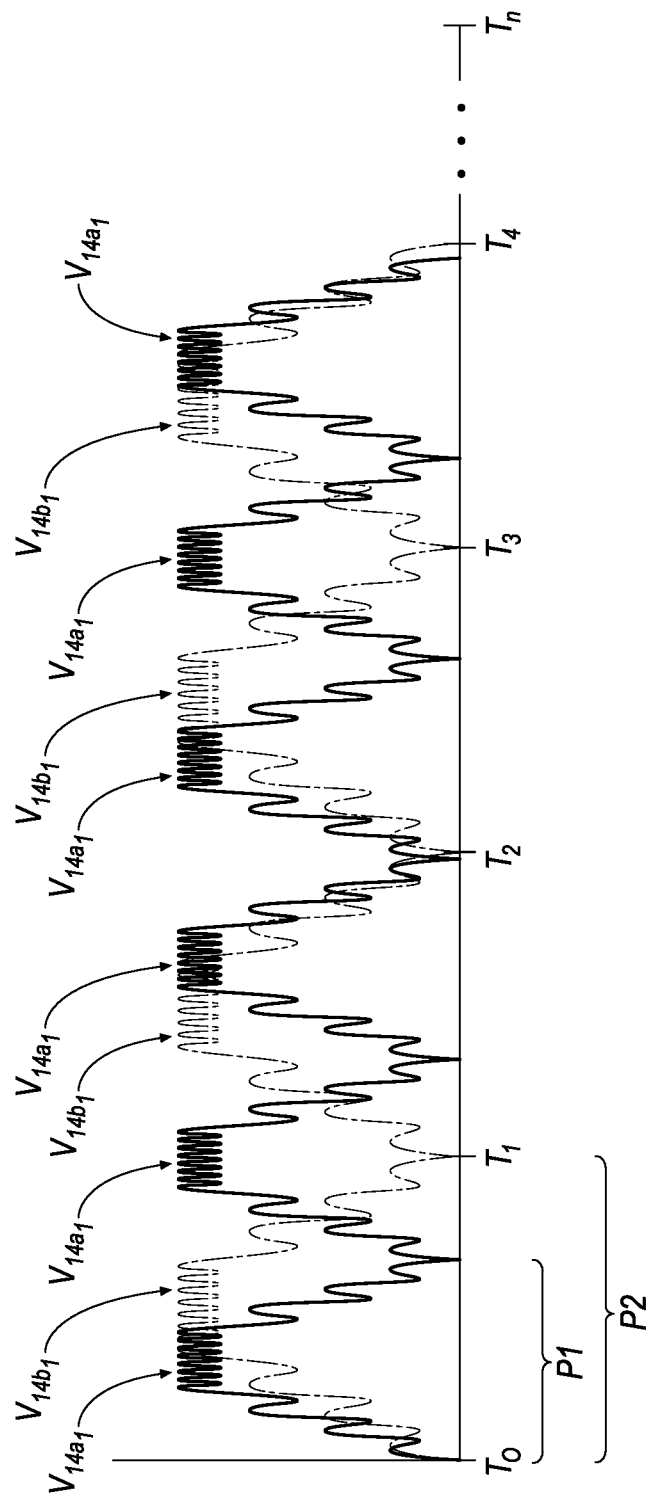
FIG. 13 is another exemplary graph representing curves related to vibrations imparted to a tire-wheel assembly by the apparatus of FIG. 8.

Further, regarding an embodiment described at FIGS. 10A-10B, in some implementations, a vibration source (see, e.g., 40' at FIGS. 8 and 14A-14N) of one of the first and third tire-tread-engaging devices $14a_1'$, $14b_1'$ may be provided with a heavier eccentric weight (or other modification) that reduces its frequency (i.e., rotational speed) relative to the other of the first and third tire-tread-engaging device $14a_1'$, $14b_1'$, which may include a lighter eccentric weight, as seen in, for example, FIG. 13. Yet even further, in some implementations, the eccentric weight of each of the first and third tire-tread-engaging devices $14a_1'$, $14b_1'$ are mounted in a manner such that the eccentric weights rotate in opposite directions in order to prevent vibrational coupling and unintended synchronization of the tire-tread-engaging devices $14a_1'$, $14b_1'$. In some implementations, as will be described in the following disclosure, upon the first and third tire-tread-engaging devices $14a_1'$, $14b_1'$ contacting the tread surface, $T_T$, of the tire, T, the first and third tire-tread-engaging devices $14a_1'$, $14b_1'$ operate at a steady state during an act of inflating the tire-wheel assembly, TW; then, upon ceasing the act of inflating the tire-wheel assembly, TW, the first and third tire-tread-engaging devices $14a_1'$, $14b_1'$ may continue contacting the tread surface, $T_T$, of the tire, T, but with an increased force while: a) the heavier eccentric weight of the vibration source 40' of one of the first and third tire-tread-engaging devices $14a_1'$, $14b_1'$ is cycled on and off as the lighter eccentric weight of the vibration source 40' of the other of the first and third tire-tread-engaging devices $14a_1'$, $14b_1'$ is left on and rotated at a steady state, or b) the heavier eccentric weight of the vibration source 40' of one of the first and third tire-tread-engaging devices $14a_1'$, $14b_1'$ is cycled on and off as the lighter eccentric weight of the vibration source 40' of the other of the first and third tire-tread-engaging devices $14a_1'$, $14b_1'$ is also cycled on and off.

Each shaker may be mounted such that the plane of rotation of the eccentric rotor passes through the $C_L$ of the wheel hub. Thus, the excitation forces are radial. Alternatively, each shaker may be mounted such that the plane of rotation of the eccentric rotor is parallel to the axis of rotation A-A thus imparting excitation forces to the tire T which are parallel to A-A. Alternatively, each shaker may be mounted at a different orientation from another shaker thereby imparting different excitation force vectors to the tire T.

Referring to FIGS. 8 and 14A-14N, each tire-tread-engaging device $14a_1'$, $14a_2'$, $14b_1'$, $14b_2'$ include a tire-tread-engaging member 22' that is utilized for directly engaging a tread surface, $T_T$, of the tire, T. The tire-tread-engaging member 22' is connected to a support member 24'. In some implementations, a proximal end 26' of the support member 24' includes a female portion (not shown but similar to female portion 28 of FIG. 1A) that slidably-mates with the guide track 20a'.

The support member 24' is substantially similar to the support member 24 of FIG. 1A. The support 24' may include a neck portion 30' connected to a head portion 32'. The neck portion 30' forms the proximal end 26' of the support member 24' that includes the female portion that slidably-mates with the guide track 20a' as described above. The head portion 32' includes a substantially C-shape having an elongated base portion (substantially similar to the elongated base portion 32a of FIG. 1A) that terminates with a proximal flange portion (substantially similar to the proximal flange portion 32b of FIG. 1A) and a distal flange portion (substantially similar to the distal flange portion 32c of FIG. 1A).

The support member 24' also includes an elongated support plate 34' that is connected to each of the proximal flange portion and the distal flange portion by a resilient coupling (substantially similar to the resilient couplings 36b, 36c of FIG. 1A). In reference to the axis, A-A, the elongated support plate 34' is defined by a radially-inwardly-facing surface (substantially similar to the radially-inwardly-facing surface 34a of FIG. 1C) and a radially-outwardly-facing surface (substantially similar to the radially-outwardly-facing surface 34b of FIG. 1C). The tire-tread-engaging member 22' is directly attached to the radially-inwardly-facing surface of the elongated support plate. The radially-outwardly-facing surface of the elongated support plate 34' is disposed adjacent the resilient coupling.

The resilient coupling may comprise an elastomeric material that is secured to the proximal/distal flange portion by a fastener (e.g., a bolt) that is not shown. In an alternative embodiment, the resilient coupling may be a spring member. The elongated support plate 34' may be secured to each of the resilient couplings by a fastener (substantially similar to the fasteners 38b, 38c), such as, for example, a bolt).

The vibration source 40' is attached directly to the radially-outwardly-facing surface of the elongated support plate 34' of one tire-tread-engaging device (e.g., the first and third tire-tread-engaging devices $14a_1'$, $14b_1'$) of each of the first and second pairs of diametrically-opposing members $14a_1'$, $14a_2'$ (see, e.g., FIGS. 9A-9B and 10A-10B); $14b_1'$, $14b_2'$ (see, e.g., FIGS. 10A-10B). A first end of a biasing member 41' (e.g., a spring) may be attached directly to the radially-outwardly-facing surface of the elongated support plate 34' of the other tire-tread-engaging device (e.g., the second and fourth tire-tread-engaging devices $14a_2'$, $14b_2'$) of each of the first and second pairs of diametrically-opposing members $14a_1'$, $14a_2'$ (see, e.g., FIGS. 9A-9B and 10A-10B); $14b_1'$, $14b_2'$ (see, e.g., FIGS. 10A-10B), and, a second end of the biasing member 41' may be attached to the elongated base portion of the head portion 32'. As will be explained in the following disclosure, the first and third tire-tread-engaging devices $14a_1'$, $14b_1'$ including the vibration source 40' may be referred to as an 'active' tire-tread-engaging device whereas the second and fourth tire-tread-engaging devices $14a_2'$, $14b_2'$ including the biasing member 41' may be referred to as a 'passive' tire-tread-engaging device.

With reference to FIGS. 8 and 14A-14N, a controller 42' is communicatively-coupled to the vibration source 40' by way of an actuator 44'. The controller 42' may send a signal to the actuator 44' for selectively actuating the vibration source 40'. Upon actuating the vibration source 40', a vibrational force may be imparted from the vibration source 40' to the elongated support plate 34'; because the elongated support plate 34' is connected to the head portion 32' by the resilient couplings, the support plate 34' is permitted to vibrate relative a fixed, non-vibrating orientation of the head portion 32' as a result of the head portion 32' being connected to the guide track 20a' by way of the neck portion 30'.

The vibration source 40' may include a motor (not shown) connected to an eccentric cam (not shown). In some implementations, the motor may be rated at approximately about ⅕ HP. In some examples, the motor may be rated to produce 700 lbs. of shake amplitude at 8,000 RPM (133 Hz). In other examples, the shake amplitude may be rated at, for example, 3,600 RPM (60 Hz) or 4,500 RPM (75 Hz). In other implementations, the weight of the eccentric cam may be selectively-modified in order to adjust the shake amplitude; accordingly, the speed of the motor may be dependent upon an increased or decreased load imparted by the eccentric cam, which may result in the motor spinning slower or faster.

The controller 42' may be manually operated (e.g., with an on/off switch) or automatically operated (e.g., by way of program stored on a processor). In use, the controller 42' repeatedly cycles the motor of the vibration source 40' such that the motor is cycled to be in an 'on state' and an 'off state.' By repeatedly cycling the motor 40' to be in an 'on state' and an 'off state,' periodic vibrational forces are imparted to the elongated support plate 34' and tire-tread-engaging member 22', which, in turn, results in a resonant vibrational response imparted to the tire-wheel assembly, TW. The application of the resonant forces upon the tire-wheel assembly, TW, is described in greater detail in the following disclosure at FIGS. 9A-9B and 10A-10B.

In an implementation, the motor 40' may be cycled in the 'on state' for approximately about one second and may be cycled in the 'off state' for approximately about one second. When the motor 40' is cycled to the 'off state,' it should be noted that the eccentric cam will still spin as a result of momentum carried over from when the motor 40' was arranged in the 'on state;' as a result, when the on/off state is cycled every one second, the resonant response is achieved (as opposed to arranging the motor 40' in a constant 'on state' that would otherwise not result in a resonant response imparted to the tire-wheel assembly, TW, but, rather, a constant vibrational force imparted to the tire-wheel assembly, TW).

Referring to FIG. 9A, a simplified top view of the tire-wheel assembly exerciser 10' including one pair of diametrically-opposing tire-tread-engaging members including the first tire-tread-engaging device $14a_1'$ and the second tire-tread-engaging device $14a_2'$ is shown arranged in the engaged orientation with an inflated tire-wheel assembly, TW. FIG. 9A also includes the radial reference lines, $R_A$-$R_L$, projecting from the axis, A-A. As described above, each guide track 20a' is aligned with a unique radius (i.e., guide tracks 20a' are respectively aligned with the radial reference line $R_A$ and $R_G$) that projects away from the axis, A-A, such that the guide tracks 20a' are radially offset at an angle, $\theta_1$; accordingly, each radial reference line, $R_A$ and $R_G$, is spaced apart by the angle, $\theta_1$ (e.g., approximately about 180°). With continued reference to FIG. 9A, the tire-tread-engaging member 22' of each of the first and second tire-tread-engaging devices $14a_1'$, $14a_2'$ are generally represented by a circle that is disposed in an engaged orientation adjacent the tread surface, $T_T$, of the tire, T, and along the unique radial reference lines $R_A$ and $R_G$ as described above that occupy each guide track 20a'; accordingly, although only the tire-tread-engaging members 22' of each of the first and second tire-tread-engaging devices $14a_1'$, $14a_2'$ are shown at FIG. 9A, it should be noted that the simplified top view of FIG. 9A is a partial, representative view of the tire-wheel assembly exerciser 10' and is not meant to be directed to an embodiment that only includes the tire-tread-engaging members 22' alone.

Referring to FIG. 10A, a simplified top view of the tire-wheel assembly exerciser 10' including the first pair of diametrically-opposing tire-tread-engaging members including the first tire-tread-engaging device $14a_1'$ and the second tire-tread-engaging device $14a_2'$ and the second pair of diametrically-opposing tire-tread-engaging members including the third tire-tread-engaging device $14b_1'$ and the fourth tire-tread-engaging device $14b_2'$ are shown arranged in the engaged orientation with an inflated tire-wheel assembly, TW. FIG. 10A also includes radial reference lines, $R_A$-$R_L$, projecting from the axis, A-A. As described above, each guide track 20a' is aligned with a unique radius (i.e., the guide tracks 20a' are aligned with the radial reference line $R_A$, $R_E$, $R_G$, $R_K$) that projects away from the axis, A-A, such that the guide tracks 20a' associated with the first pair of diametrically-opposing members $14a_1'$, $14a_2'$ are radially offset at an angle, $\theta_1$, and, the second pair of diametrically-opposing members $14b_1'$, $14b_2'$ are radially offset at an angle, $\theta_2$; accordingly, each radial reference line, $R_A$ and $R_G$, is spaced apart by the angle, $\theta_1$ (e.g., approximately about 180°), and, each radial reference line, $R_E$ and $R_K$, is spaced apart by the angle, $\theta_2$ (e.g., approximately about 180°). With continued reference to FIG. 10A, the tire-tread-engaging member 22' of each of the tire-tread-engaging devices $14a_1'$, $14a_2'$, $14b_1'$, $14b_2'$ are generally represented by a circle that is disposed in an engaged orientation adjacent the tread surface, $T_T$, of the tire, T, and along the unique radial reference lines $R_A$, $R_E$, $R_G$, $R_K$ as described above that occupy each guide track 20a'; accordingly, although only the tire-tread-engaging members 22' of each of the tire-tread-engaging devices $14a_1'$, $14a_2'$, $14b_1'$, $14b_2'$ are shown at FIG. 10A, it should be noted that the simplified top view of FIG. 10A is a partial, representative view of the tire-wheel assembly exerciser 10' and is not meant to be directed to an embodiment that only includes the tire-tread-engaging members 22' alone.

As described above, the first and third tire-tread-engaging devices $14a_1'$, $14b_1'$ each include the vibration source 40', and, as such, each of the first and third tire-tread-engaging devices $14a_1'$, $14b_1'$ may be referred to as 'active' tire-tread-engaging devices whereas the second and fourth tire-tread-engaging devices $14a_2'$, $14b_2'$ each include the biasing member 41', and, as such, each of the second and fourth tire-tread-engaging devices $14a_2'$, $14b_2'$ may be referred to as a 'passive' tire-tread-engaging device. Referring to FIGS. 9B and 10B, the first tire-tread-engaging device $14a_1'$ (of the one/first pair of diametrically-opposing members $14a_1'$, $14a_2'$) is shown in an 'activated state' whereas the second tire-tread-engaging device $14a_2'$ (of the one/first pair of diametrically-opposing members $14a_1'$, $14a_2'$) is shown in a 'response state' (i.e., because the second tire-tread-engaging device $14a_2'$ includes the biasing member 41' and not the vibration source 40', vibrations imparted by the first tire-tread-engaging device $14a_1'$ are translated to the second tire-tread-engaging device $14a_2'$ by way of the tire, T, and, as a result, the second tire-tread-engaging device $14a_2'$ will respond by oscillating back-and-forth adjacent the tread surface, $T_T$, of the tire, T, as a result of the biasing member 41' imparting a radial force toward the axis, A-A, that maintains the second tire-tread-engaging device $14a_2'$ adjacent the tread surface, $T_T$, of the tire, T). Referring to FIG. 10B, similarly, the third tire-tread-engaging device $14b_1'$ (of the second pair of diametrically-opposing members $14b_1'$, $14b_2'$) is shown in an 'activated state' whereas the fourth tire-tread-engaging device $14b_2'$ (of the second pair of diametrically-opposing members $14b_1'$, $14b_2'$) is shown in a 'response state' (i.e., because the fourth tire-tread-engaging device $14b_2'$ includes the biasing member 41' and not the vibration source 40', vibrations imparted by the third tire-tread-engaging device $14b_1'$ are translated to the fourth tire-tread-engaging device $14b_2'$ by way of the tire, T, and, as a result, the fourth tire-tread-engaging device $14b_2'$ will respond by oscillating back-and-forth adjacent the tread surface, $T_T$, of the tire, T, as a result of the biasing member 41' imparting a radial force toward the axis, A-A, that maintains the fourth tire-tread-engaging device $14b_2'$ adjacent the tread surface, $T_T$, of the tire, T).

When either of the first and third tire-tread engaging devices $14a_1'$, $14b_1'$ are said to be in the 'activated state,' the 'activated state' may mean that the controller 42' repeatedly cycles the motor of the vibration source 40' as described above such that the motor is cycled to be in the 'on state' and the 'off state.' Therefore, as a result of being arranged in the 'activated state,' periodic vibrational forces are imparted to the elongated support plate 34' and tire-tread-engaging member 22', which, in turn, results in a resonant vibrational response imparted to the tire-wheel assembly, TW.

Referring to FIG. 11, in some instances, an exemplary embodiment of the invention does not include both of the first and third tire-tread engaging devices $14a_1'$, $14b_1'$ synchronized in the 'activated state' during a period of time (i.e., while one of the first and third tire-tread engaging devices $14a_1'$, $14b_1'$ is arranged in the 'activated state' the other of the first and third tire-tread engaging devices $14a_1'$, $14b_1'$ is arranged in the 'deactivated state'). If, for example, both of the first and third tire-tread engaging devices $14a_1'$, $14b_1'$ were to be synchronized in the 'activated state' during a period of time, the resonant vibrational response arising from each of the first and third tire-tread engaging devices $14a_1'$, $14b_1'$ would undesirably cancel each other out.

According to the exemplary implementation shown in FIG. 11, the 'activated state' of the first tire-tread engaging device $14a_1'$ is shown generally by the curves $V_{14a1}$, which generally represents the vibrations imparted to the tire-wheel assembly, TW, by the vibration source 40' of the first tire-tread engaging device $14a_1'$, and, the 'activated state' of the third tire-tread engaging device $14b_1'$ is shown generally by the curves $V_{14b1}$, which generally represents the vibrations imparted to the tire-wheel assembly, TW, by the vibration source 40' of the third tire-tread engaging device $14b_1'$. As seen in FIG. 11, the vibrations $V_{14a1}$ arising from the first tire-tread engaging device $14b_1'$ occur exclusively for the time periods $T_0$-to-$T_1$, $T_2$-to-$T_3$, etc., whereas the vibrations $V_{14b1}$ arising from the third tire-tread engaging device $14b_1'$ occur exclusively for the time periods $T_1$-to-$T_2$, $T_3$-to-$T_4$, etc. Further, some implementations of the exemplary embodiment described at FIG. 13 may include the eccentric weight of the vibration source 40' of each of the tire-tread-engaging devices $14a_1'$, $14b_1'$ rotating in opposite directions in order to prevent coupling and unintended synchronization of the tire-tread-engaging devices $14a_1'$, $14b_1'$.

Referring to FIG. 12, an implementation of the invention does not include both of the first and third tire-tread engaging devices $14a_1'$, $14b_1'$ synchronized in the 'activated state' during a full period of time, but, however, both of the first and third tire-tread engaging devices $14a_1'$, $14b_1'$ may arranged in the 'activated state' during a period of time such that the curves represented by the vibrations $V_{14a1}$, $V_{14b1}$ at least partially overlap during a period of time. Although the first and third tire-tread engaging devices $14a_1'$, $14b_1'$ are arranged in the 'activated state' for at least a portion of one or more periods of time FIG. 12, the first and third tire-tread engaging devices $14a_1'$, $14b_1'$ are not synchronized in the 'activated state' during a full period of time, and, therefore, the resonant vibrational forces arising from each of the first and third tire-tread engaging devices $14a_1'$, $14b_1'$ do not undesirably cancel each other out.

In a substantially similar manner as described above at FIG. 11, according to the exemplary implementation shown in FIG. 12, the 'activated state' of the first tire-tread engaging device $14a_1'$ is shown generally by the curves $V_{14a1}$, which generally represents the vibrations imparted to the tire-wheel assembly, TW, by the vibration source 40' of the first tire-tread engaging device $14a_1'$, and, the 'activated state' of the third tire-tread engaging device $14b_1'$ is shown generally by the curves $V_{14b1}$, which generally represents the vibrations imparted to the tire-wheel assembly, TW, by the vibration source 40' of the third tire-tread engaging device $14b_1'$. As seen in FIG. 12, at least a portion of both of the curves represented by the vibrations $V_{14a1}$, $V_{14b1}$ arising from the first and third tire-tread engaging devices $14a_1'$, $14b_1'$ at least partially overlap during the time periods $T_0$-to-$T_1$, $T_1$-to-$T_2$, $T_2$-to-$T_3$, $T_3$-to-$T_4$, etc., and, therefore, unlike the embodiment shown at FIG. 11, the curves represented by the vibrations $V_{14a1}$, $V_{14b1}$ are not exclusive to each of the periods $T_0$-to-$T_1$, $T_1$-to-$T_2$, $T_2$-to-$T_3$, $T_3$-to-$T_4$, etc.

Referring to FIG. 13, an implementation of the invention does not include both of the first and third tire-tread engaging devices $14a_1'$, $14b_1'$ that are synchronized in the 'activated state' during a full period of time, but, however, both of the first and third tire-tread engaging devices $14a_1'$, $14b_1'$ may synchronized for arrangement in the 'activated state' at the same start time (e.g., at time $T_0$) during a period of time such that the curves represented by the vibrations $V_{14a1}$, $V_{14b1}$ at least partially overlap during a period of time.

Although FIGS. 12 and 13 are somewhat similar in that the first and third tire-tread engaging devices $14a_1'$, $14b_1'$ may be arranged in the 'activated state' for at least a portion of one or more periods of time, the difference between the exemplary embodiment of FIG. 12 and the exemplary embodiment of FIG. 13 is that the exemplary embodiment of FIG. 13 includes both of the first and third tire-tread engaging devices $14a_1'$, $14b_1'$ being synchronously activated at time $T_0$. Further, another difference between FIGS. 12 and 13 is that the curve $V_{14a1}$ has a greater frequency (and shorter period, P1) than the curve $V_{14b1}$, which, comparatively, has a reduced frequency (and greater period, P2). The shorter period, P1, associated with the curve $V_{14a1}$ may result from the vibration source 40' of the first tire-tread-engaging device $14a_1$' having a lighter eccentric weight than the vibration source 40' of the third tire-tread-engaging device $14b_1$', which, comparatively, has a heavier eccentric weight. Therefore, at least a portion of both of the curves represented by the vibrations $V_{14a1}$, $V_{14b1}$ arising from the first and third tire-tread engaging devices $14a_1$', $14b_1$' at least partially overlap during the time periods $T_0$-to-$T_1$, $T_1$-to-$T_2$, $T_2$-to-$T_3$, $T_3$-to-$T_4$, etc., and, therefore, unlike the embodiment shown at FIG. 11, the curves represented by the vibrations $V_{14a1}$, $V_{14b1}$ are not exclusive to each of the periods $T_0$-to-$T_1$, $T_1$-to-$T_2$, $T_2$-to-$T_3$, $T_3$-to-$T_4$, etc. Further, some implementations of the exemplary embodiment described at FIG. 13 may include the eccentric weight of the vibration source 40' of each of the tire-tread-engaging devices $14a_1$', $14b_1$' rotating in opposite directions in order to prevent coupling and unintended synchronization of the tire-tread-engaging devices $14a_1$', $14b_1$'.

Referring back to FIGS. 9B and 10B, as a result of the radially offset angle(s), $\theta_1$, $\theta_2$ of the tire-tread engaging devices $14a_1$', $14a_2$', $14b_1$', $14b_2$' the resonant vibrational response results in oscillations imparted to 'anti-nodes' of the tire-wheel assembly, TW, whereas, concurrently, no oscillations are imparted to 'nodes' of the tire-wheel assembly, TW. As seen in FIGS. 9B and 10B, 'anti-nodes' are shown generally at the intersection of the radial reference lines $R_A$, $R_C$, $R_E$, $R_G$, $R_1$, and $R_K$ with the tread surface, $T_T$, of the tire, T, whereas, concurrently, 'nodes' are shown generally at the intersection of the radial reference lines $R_B$, $R_D$, $R_F$, $R_H$, $R_J$, and $R_L$ with the tread surface, $T_T$, of the tire, T. Therefore, when one or both of the first tire-tread-engaging device $14a_1$' and third tire-tread-engaging device $14b_1$' are arranged in the 'activated state,' anti-nodes are included at the location of the 'activated state' tire-tread engaging device $14a_1$' and/or $14b_1$' and are periodically spaced apart about the tire-wheel assembly, TW, therefrom according to approximately one-third (i.e., $0.333\theta_1/0.333\theta_2$) the radially offset angle, $\theta_1/\theta_2$, with nodes being periodically included between each anti-node.

Referring to FIGS. 14A-14N, the tire-wheel assembly exerciser 10' may be operated according to the following exemplary embodiment. Firstly, as seen in FIG. 14A, the tire-tread-engaging devices $14a_1$', $14a_2$' (according to the embodiment of FIG. 9A-9B) or $14a_1$', $14a_2$'; $14b_1$', $14b_2$' (according to the embodiment of FIG. 10A-10B) of the tire-engaging portion 14' may be arranged in retracted, default orientation by slidably-arranging the tire-tread-engaging devices $14a_1$', $14a_2$'/$14a_1$', $14a_2$'; $14b_1$', $14b_2$' (along, for example, the radial reference lines $R_A$, $R_G/R_A$, $R_E$, $R_G$, $R_K$) upon the guide tracks 20a' in a radially-retracted orientation away from the axis, A-A. Then, the cart 16a' may be interfaced with the cart docking station 16b'. In some implementations, the mating structure 16d' may be utilized for selectively-coupling the cart 16a' to the cart docking station 16b'. The non-inflated tire-wheel assembly, $TW_{NI}$, may be arranged upon the cart 16a' such that the wheel, W, of the non-inflated tire-wheel assembly, $TW_{NI}$, is disposed adjacent the upper surface 16c' of the cart 16a'. As described above, the proximal end 18a' of the stem member 18' is removably-connected to the central opening, $W_O$, formed by the wheel, W.

When the non-inflated tire-wheel assembly, $TW_{NI}$, is fixedly-secured to the tire-wheel assembly exerciser 10', the non-inflated tire-wheel assembly, $TW_{NI}$, may be said to be in an non-inflated state such that no pressurized air fills the circumferential air cavity, $T_{AC}$, of the tire, T; upon subsequently filling the circumferential air cavity, $T_{AC}$, of the tire, T, with pressurized air, the upper bead, $T_{BU}$, of the tire, T, is disposed adjacent and is "seated" against the upper bead seat, $W_{SU}$, of the wheel, W, and, the lower bead, $T_{BE}$, is disposed adjacent and "seated" against the lower bead seat, $W_{SE}$, of the wheel, W. As described above, after filling the circumferential air cavity, $T_{AC}$, of the tire, T, with pressurized air, entrapments, E (see, e.g., FIGS. 15A-16B and 20A), such as, for example, contaminants, lubricant or the like, may be trapped between the bead, $T_{BU}/T_{BE}$, of the tire, T, and the bead seat $W_{SU}/W_{SL}$ of the wheel, W. As explained below, the entrapments, E, may be removed by the tire-wheel assembly exerciser 10' such that the upper and lower beads, $T_{BU}$, $T_{BE}$, of the tire, T, are seated directly adjacent the upper and lower bead seats, $W_{SU}$, $W_{SL}$, of the wheel, W, without any entrapments, E, being disposed there between as seen in, for example, FIGS. 15A-16B and 20A.

Once the cart 16a' may be interfaced with the cart docking station 16b', an axial center of the non-inflated tire-wheel assembly, $TW_{NI}$, is aligned with the central axis, A-A. The central axis, A-A, extends through the stem member 18' that is removably-connected to the central opening, $W_O$, formed by the wheel, W.

Referring to FIGS. 14A-14B, an inflator device 102' that is connected to the cart docking station 16b' is axially adjusted according to the direction of the arrow, Y1, from a first axial orientation (see, e.g., FIG. 14A) to a second axial orientation (see, e.g., FIG. 14B). Movement of the inflator device 102' to/from the first axial orientation and the second axial orientation may be conducted in response to a signal sent from the controller 42' to the actuator 44' such that the actuator 44' (which is physically and/or communicatively connected to the inflator device 102') causes axial movement of the inflator device 102' relative a fixed orientation of the cart docking station 16b'.

As seen in FIG. 14A, the first axial orientation of the inflator device 102' may be defined as a spaced-apart, non-engaged orientation of the inflator device 102' with respect to the stem member 18' connected to the wheel, W. As seen in FIG. 14B, the second axial orientation of the inflator device 102' may be defined as an at least partially-engaged orientation of the inflator device 102' with respect to the stem member 18' such that the distal end 18b' of the stem member 18' is disposed within an axial passage 105a' formed by a stem member receiving portion 103' of the inflator device 102'. Upon interfacing the cart 16a' with the docking station 16b', the axial passage 105a' may be aligned with the central axis, A-A, that extends through the stem member 18'.

The stem member receiving portion 103' may further include a radial passage 105b' that is in fluid communication with the axial passage 105a' formed by the stem member receiving portion 103'. A stem member engaging key 107' may be slidably-disposed within the radial passage 105b'.

As seen in FIG. 14A, when the inflator device 102' is arranged in the first axial orientation, the stem member engaging key 107' is arranged in a radially retracted orientation. Referring to FIGS. 14B-14C, upon arranging the inflator device 102' in the second axial orientation, the controller 42' may send a signal to the actuator 44' (which is physically and/or communicatively connected to the stem member engaging key 107') for causing the stem member engaging key 107' to shift according to the direction of arrow, X1, from the radially retracted orientation (see, e.g., FIG. 14B) to a radially deployed orientation (see, e.g., FIG. 14C) such that the stem member engaging key 107' is selectively-interfaced with the distal end 18b' of the stem member 18' such that the non-inflated tire-wheel assembly, $TW_{NI}$, is removably-secured to the inflator device 102' by way of the stem member 18'.

Referring to FIG. 14C, once the stem member engaging key 107' is selectively-interfaced with the distal end 18b' of the stem member 18', the controller 42' may send a signal to the actuator 44' for causing the inflator device 102' to be axially adjusted according to the direction of the arrow, Y2 (which opposite the direction of the arrow, Y1), from the second axial orientation (see, e.g., FIG. 14C) to a third axial orientation (see, e.g., FIG. 14D). As seen in FIG. 14D, because the stem member engaging key 107' is selectively-interfaced with the distal end 18b' of the stem member 18', movement of the inflator device 102' according to the direction of the arrow, Y2, results in the inflator device 102' axially lifting the non-inflated tire-wheel assembly, $TW_{NI}$, away from the cart 16a' as a result of the stem member 18' being removably-connected to the central opening, $W_O$, formed by the wheel, W.

As seen in FIG. 14D, the inflator device 102' may axially lift the non-inflated tire-wheel assembly, $TW_{NI}$, away from the cart 16a' until the tread surface, $T_T$, of the tire, T, is radially aligned with the tire-tread-engaging member 22' of each tire-tread-engaging device $14a_1'$, $14a_2'$ (according to the embodiment of FIG. 9A-9B)/$14a_1'$, $14a_2'$; $14b_1'$, $14b_2'$ (according to the embodiment of FIG. 10A-10B). Then, as seen in FIG. 14D, the controller 42' may send a signal to the actuator 44' (which is physically and/or communicatively connected to the each tire-tread-engaging device $14a_1'$, $14a_2'/14a_1'$, $14a_2'$; $14b_1'$, $14b_2'$) for causing the tire-tread-engaging devices $14a_1'$, $14a_2'/14a_1'$, $14a_2'$; $14b_1'$, $14b_2'$ to be radially adjusted according to the direction of the arrow, X2, from a first, radially-retracted orientation (see, e.g., FIG. 14D) to a second, radially-deployed orientation (see, e.g., FIG. 14E). The first, radially-retracted orientation of the tire-tread-engaging devices $14a_1'$, $14a_2'/14a_1'$, $14a_2'$; $14b_1'$, $14b_2'$ may be defined as a spaced-apart, non-engaged orientation of the tire-tread-engaging devices $14a_1'$, $14a_2'/14a_1'$, $14a_2'$; $14b_1'$, $14b_2'$ with respect to the tread surface, $T_T$, of the tire, T. The second, radially-deployed orientation of the tire-tread-engaging devices $14a_1'$, $14a_2'/14a_1'$, $14a_2'$; $14b_1'$, $14b_2'$ may be defined as an engaged orientation of the tire-tread-engaging devices $14a_1'$, $14a_2'/14a_1'$, $14a_2'$; $14b_1'$, $14b_2'$ with respect to the tread surface, $T_T$, of the tire, T such that the tread-engaging member 22' of each tire-tread-engaging device $14a_1'$, $14a_2'/14a_1'$, $14a_2'$; $14b_1'$, $14b_2'$ is disposed adjacent the tread surface, $T_T$, of the tire, T.

Referring to FIGS. 14A-14N, the inflator device 102' may include a tire sidewall engaging portion 106' that engages the upper sidewall, $T_{SU}$, of the tire, T, and a wheel engaging portion 108' that engages one or more of the upper rim, $W_{RU}$, and upper bead seat, $W_{SU}$, of the wheel, W. The inflator device 102' may further comprise an inflation conduit 110' that extends through one or more of the tire sidewall engaging portion 106' and the wheel engaging portion 108' for passing a fluid from a fluid source (not shown) and into the circumferential air cavity, $T_{AC}$, of the tire, T, for inflating the tire, T.

In some implementations, the tire sidewall engaging portion 106' may comprise a circumferential body that, once disposed adjacent the upper sidewall, $T_{SU}$, of the tire, T (as seen, e.g., in FIG. 14E), substantially seals the circumferential air cavity, $T_{AC}$, of the tire, T, from atmosphere. Further, the wheel engaging portion 108' may include a flexible circumferential member 112' having a smaller diameter than the upper rim, $W_{RU}$, of the wheel, W; accordingly, the flexible circumferential member 112' may "flip" (as seen in FIG. 14E) or "flop" (as seen in FIG. 14G) from a static, neutral orientation (as seen in FIGS. 14A-14D and 14F).

Arrangement of the tire sidewall engaging portion 106' adjacent the upper sidewall, $T_{SU}$, of the tire, T, and the "flipped," "flopped" and neutral orientation of the circumferential member 112' may result from axial expansion or axial retraction of the stem member 18'. Referring to FIGS. 14D-14E, the controller 42' may send a signal to the actuator 44' for causing axial retraction (in a direction according to arrow, Y3) of a portion of the stem member 18'. In some implementations, an intermediate portion 18c' of the stem member 18' may be axially retracted, Y3 (see, e.g., FIGS. 14D-14E), in a direction toward the distal portion 18b' of the stem member 18' or axially expanded, Y4 (see, e.g., FIGS. 14F-14G), in a direction away from the distal portion 18b' of the stem member 18'. Because the proximal end 18a' of the stem member 18' is removably-connected to the central opening, $W_O$, formed by the wheel, W, the movement according to the direction of the arrows Y3 and Y4 are correspondingly-imparted to the tire-wheel assembly, TW.

As seen in FIG. 14D-14E, upon axial retraction of the intermediate portion 18c' of the stem member 18', the tire-wheel assembly, TW, is axially pulled, Y5 (see, e.g., FIGS. 14D-14E), toward an axially fixed orientation of the inflator device 102' to thereby cause: (1) the tire sidewall engaging portion 106' of the inflator device 102' to be disposed adjacent the upper sidewall, $T_{SU}$, of the tire, T (as seen in, e.g., FIG. 14E), and (2) the circumferential member 112' of the inflator device 102' to be axially adjusted from a neutral orientation (as seen in, e.g., FIG. 14D) to the "flipped" orientation adjacent a rim portion proximate the upper bead seat, $W_{SU}$, of the wheel, W (as seen in, e.g., FIG. 14E) and then subsequently to a neutral orientation (at least proximate the upper bead seat, $W_{SU}$, of the wheel, W) as seen in FIG. 14F. As seen in FIGS. 14F-14G, upon axial expansion, Y4, of the intermediate portion 18c' of the stem member 18', the tire-wheel assembly, TW, is axially pushed, Y6 (see, e.g., FIGS. 14F-14G), away from an axially fixed orientation of the inflator device 102' to thereby cause: the circumferential member 112' of the inflator device 102' to be axially adjusted from the neutral orientation as seen in FIG. 14F to the "flopped" orientation adjacent the rim portion proximate the upper bead seat, $W_{SU}$, of the wheel, W (as seen in FIG. 14G) and then subsequently to back to the neutral orientation as seen in FIG. 14H. Axial expansion, Y4, of the intermediate portion 18c' of the stem member 18' may occur in response to a signal sent from the controller 42' to the actuator 44' and/or as a result of an expansion force arising from the upper sidewall surface, $T_{SU}$, of the tire, T, as a result of the tire, T, being inflated as described below.

Referring to FIG. 14E, in some implementations, after the circumferential member 112' is arranged adjacent the upper bead seat, $W_{SU}$, of the wheel, W, the inflation conduit 110' may pass inflating fluid into the circumferential air cavity, $T_{AC}$, of the tire, T, as seen in FIGS. 14F-14G. The fluid passed into the circumferential air cavity, $T_{AC}$, of the tire, T, results in the upper sidewall, $T_{SU}$, of the tire, T, being urged axially toward the tire sidewall engaging portion 106' of the inflator device 102' such that the flexible circumferential member 112' may be moved from the engaged, neutral orientation (adjacent the upper bead seat, $W_{SU}$, of the wheel, W) as seen in FIG. 14F to the "flopped" orientation, as seen in FIG. 14G. As the fluid further fills the circumferential air cavity, $T_{AC}$, of the tire, T, the tire sidewall engaging portion 106' of the inflator device 102' is further urged axially away from the tire-wheel assembly, TW, such that the flexible circumferential member 112' is further transitioned from the "flopped" orientation (as seen in FIG. 14G) to the spaced-apart neutral orientation as seen in FIG. 14H. Once arranged in the neutral orientation as seen in FIG. 14H, the tire sidewall engaging portion 106' of the inflator device 102' may no longer be in contact with the upper sidewall, $T_{SU}$, of the tire, T, and, as such, the tire-wheel assembly, $TW_I$, may be said to be arranged in an inflated state.

Although the tire-tread-engaging devices $14a_1'$, $14a_2'/14a_1'$, $14a_2'$; $14b_1'$, $14b_2'$ are shown being radially adjusted according to the direction of the arrow, X2, from the first radial orientation (see, e.g., FIGS. 14A-14C) to the second radial orientation (see, e.g., FIG. 14D), the tire-tread-engaging devices $14a_1'$, $14a_2'/14a_1'$, $14a_2'$; $14b_1'$, $14b_2'$ may be radially adjusted according to the direction of arrow, X2, just before, during or after the controller 42' sends a signal to the actuator 44' for causing the inflation conduit 110' to pass inflating fluid into the circumferential air cavity, $T_{AC}$, of the tire, T. The radial adjustment, X2, of the tire-tread-engaging devices $14a_1'$, $14a_2'/14a_1'$, $14a_2'$; $14b_1'$, $14b_2'$ occurs by slidably-adjusting the tire-tread-engaging devices $14a_1'$, $14a_2'/14a_1'$, $14a_2'$; $14b_1'$, $14b_2'$ in a radial direction (along, for example, the radial reference lines $R_A$, $R_G/R_A$, $R_E$, $R_G$, $R_K$ from a radially retracted, default orientation (as seen in FIGS. 14A-14D) to a radially engaged orientation (as seen in FIG. 14E) by slidably-moving the tire-tread-engaging devices $14a_1'$, $14a_2'/14a_1'$, $14a_2'$; $14b_1'$, $14b_2'$ upon the guide tracks 20a' toward the tire-wheel assembly, TW, such that the tire-tread-engaging devices $14a_1'$, $14a_2'/14a_1'$, $14a_2'$; $14b_1'$, $14b_2'$ are advanced toward the axis, A-A. The tire-tread-engaging devices $14a_1'$, $14a_2'/14a_1'$, $14a_2'$; $14b_1'$, $14b_2'$ may be said to be arranged in the radially engaged orientation when the tire-tread-engaging member 22' of the tire-tread-engaging devices $14a_1'$, $14a_2'/14a_1'$, $14a_2'$; $14b_1'$, $14b_2'$ directly engage the tread surface, $T_T$, of the tire, T. Slidable movement of the tire-tread-engaging devices $14a_1'$, $14a_2'/14a_1'$, $14a_2'$; $14b_1'$, $14b_2'$ according to the direction of arrow, X2, may be automatically conducted as a result of the controller 42' sending an actuating signal to the actuator 44' that is connected to the tire-tread-engaging devices $14a_1'$, $14a_2'/14a_1'$, $14a_2'$; $14b_1'$, $14b_2'$.

Referring to FIGS. 14F-14G, just prior to and/or during (as seen in, e.g., FIGS. 14F-14G) and/or after (as seen in, e.g., FIG. 14H) passing inflating fluid into the circumferential air cavity, $T_{AC}$, of the tire, T, by way of the inflation conduit 110', the first tire-tread-engaging device $14a_1'$ (according to an exemplary implementation shown in FIG. 9A-9B or 10A-10B) and/or the third tire-tread-engaging device $14b_1'$ (according to an exemplary implementation shown in FIGS. 10A-10B) is/are arranged in the activated state in order to impart vibrations to the tire, T, of the tire-wheel assembly. As the beads, $T_{BU}$, $T_{BL}$, of the tire, T, are disposed adjacent the bead seats, $W_{SU}$, $W_{SL}$, of the wheel, W, the vibrations imparted to the tire, T, will assist in removing entrapments, E. Once a predetermined amount time vibrating the tire, T, of the tire-wheel assembly has passed, the controller 42' may send an actuating signal to the actuator 44' for returning the tire-tread-engaging devices $14a_1'$, $14a_2'/14a_1'$, $14a_2'$; $14b_1'$, $14b_2'$ from the second, radially-deployed orientation (as seen in, e.g., FIG. 14H) to the first, radially-retracted orientation (see, e.g., FIG. 14I) according to the direction of arrow, X3, which is opposite the direction of arrow, X2.

Referring to FIG. 14H, at a time before, during or after the tire-tread-engaging devices $14a_1'$, $14a_2'/14a_1'$, $14a_2'$; $14b_1'$, $14b_2'$ being returned to the first, radially-retracted orientation according to the direction of arrow, X3, the controller 42' may send a signal to the actuator 44' for causing further axial expansion, Y4, of the intermediate portion $18c'$ of the stem member 18' in a direction away from the distal portion $18b'$ of the stem member 18', which results in the tire sidewall engaging portion 106' being returned to a spaced-apart orientation with respect to the upper sidewall, $T_{SU}$, of the tire, T (as seen in FIGS. 14D, 14I), from the engaged orientation with respect to the upper sidewall, $T_{SU}$, of the tire, T (as seen in FIG. 14H). After the tire sidewall engaging portion 106' is returned to the spaced-apart orientation with respect to the upper sidewall, $T_{SU}$, of the tire, T, as seen in FIG. 14I, the controller 42' may send a signal to the actuator 44' for causing the tire-tread-engaging devices $14a_1'$, $14a_2'/14a_1'$, $14a_2'$; $14b_1'$, $14b_2'$ to be returned to the radially-deployed orientation (as seen in FIG. 14J) from the radially-retracted orientation (as seen in FIG. 14I).

Figure 15B:
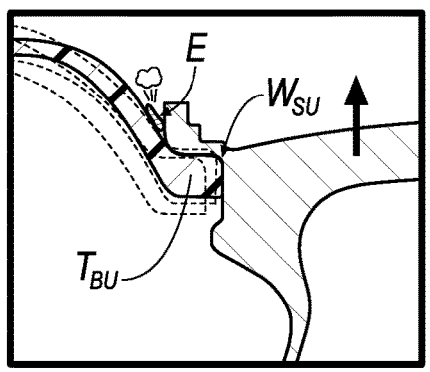
FIG. 15B is an enlarged view of the tire-wheel assembly according to line 15B of FIG. 14L.
Figure 15C:
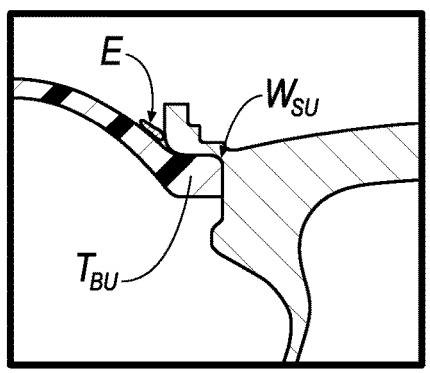
FIG. 15C is an enlarged view of the tire-wheel assembly according to line 15C of FIG. 14M.
Figure 16C:
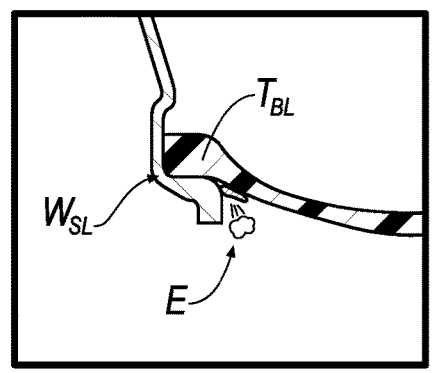
FIG. 16C is an enlarged view of the tire-wheel assembly according to line 16C of FIG. 14M.

Once the tire-tread-engaging devices $14a_1'$, $14a_2'/14a_1'$, $14a_2'$; $14b_1'$, $14b_2'$ are returned to the radially-deployed orientation as seen in FIG. 14J, the first and/or third tire-tread-engaging devices $14a_1'$, $14b_1'$ are arranged in the activated state (as seen in FIG. 14K) for imparting further vibrations to the tire, T, of the inflated tire-wheel assembly, $TW_1$. Just prior to and/or during and/or after the first and/or third tire-tread-engaging devices $14a_1'$, $14b_1'$ are arranged in the activated state, the controller 42' may send a signal to the actuator 44' for causing further periodic axial retraction (according to the direction of arrow, Y5, as seen in FIG. 14K) and axial expansion (according to the direction of arrow, Y6, as seen in FIG. 14L) of the intermediate portion $18c'$ of the stem member 18' in a direction toward/away from the distal portion $18b'$ of the stem member 18'. Because the tire-tread-engaging devices $14a_1'$, $14a_2'/14a_1'$, $14a_2'$; $14b_1'$, $14b_2'$ are returned to the radially-deployed orientation, the tire, T, is clamped and axially-fixed in place by the tire-tread-engaging devices $14a_1'$, $14a_2'/14a_1'$, $14a_2'$; $14b_1'$, $14b_2'$; therefore, because the wheel, W, is attached to the stem member 18', periodic axial retraction and expansion, Y5 and Y6, of the intermediate portion $18c'$ of the stem member 18' results in the wheel, W, being axially moved relative the clamped and axially-fixed orientation of the tire, T. The axial movement, Y5 and Y6, of the W, relative the clamped and axially-fixed orientation of the tire, T, may be referred to as "wheel sequencing" and such movement is conducted for the purpose of at least partially disrupting (see, e.g., FIGS. 15A-15B and 16A-16B) a resting, seated orientation of the beads, $T_{BU}$, $T_{BL}$, of the tire, T, adjacent the bead seats, $W_{SU}$, $W_{SL}$, of the wheel, W, without "breaking" or upsetting the seated orientation of the beads, $T_{BU}$, $T_{BL}$, of the tire, T, adjacent the bead seats, $W_{SU}$, $W_{SL}$, of the wheel, W, to free entrapments, E, that might be lodged between the beads, $T_{BU}$, $T_{BL}$, of the tire, T, and the bead seats, $W_{SU}$, $W_{SL}$, of the wheel, W, as seen in FIGS. 15C and 16C. "Breaking" as used above, in an embodiment, may include disrupting the seated tire bead to the extent that air or air bubbles that may be entrapped between the tire bead and the wheel bead seat is freed from entrapment but the seated tire bead may not be disturbed to the extent that it causes the inflated tire to lose some of its pressure. In an alternative embodiment, the tire bead may be disrupted away from the wheel bead seat sufficiently such that some pressurized air stored in the tire is allowed to leak from the tire.

Once the entrapments, E, are removed as seen in FIGS. 15C and 16C, the first and/or third tire-tread-engaging devices $14a_1'$, $14b_1'$ are arranged in the deactivated state as seen in FIG. 14M. Then, as seen in FIG. 14N, the tire-treadengaging devices 14a₁', 14a₂'/14a₁', 14a₂'; 14b₁', 14b₂' are returned to the radially-retracted orientation such that the tire, T, is no longer clamped and axially-fixed in place by the tire-tread-engaging devices 14a₁', 14a₂'/14a₁', 14a₂'; 14b₁', 14b₂'. Subsequently, the inflator device 102' may return the inflated tire-wheel assembly, TW, to an orientation adjacent the upper surface 16c' of the cart 16a', and, the stem member engaging key 107' may be slidably-retracted from being disposed within the radial passage 105b' such that the inflator device 102' is no longer connected to the stem member 18'. Then, the cart 16a' may be advanced away from the cart docking station 16b' such that the tire-wheel assembly, TW, may be interfaced with another cart docking station (not shown) for permitting a subsequent processing step to be imparted to the tire-wheel assembly, TW.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for processing a tire-wheel assembly including a tire and a wheel for removing entrapments between a bead seat of the wheel and bead of the tire, comprising the steps of:
   mounting a tire to a wheel for forming a tire-wheel assembly;
   disposing tire-tread-engaging members of a tire-wheel assembly exerciser to directly contact a tread surface of the tire; and
   actuating the tire-wheel assembly exerciser such that to impart periodic vibration forces to the tire-tread-engaging members for achieving a resonant vibrational response imparted to the tire-wheel assembly.

2. The method of claim 1, wherein the actuating step includes
   arranging the tire-wheel assembly exerciser in an activated state, wherein the activated state includes
   repeatedly cycling a vibration source of the tire-wheel assembly exerciser in an on state and an off state.

3. The method of claim 1, wherein the actuating the tire-wheel assembly exerciser step occurs when a bead of the tire is firstly arranged in a spaced apart relationship with a bead seat of the wheel.

4. The method of claim 3, further comprising the step of:
   actuating an inflator device for at least partially inflating the tire-wheel assembly and shifting an orientation of the bead of the tire relative the wheel such that the bead of the tire is secondly arranged in an engaged relationship with the bead seat of the wheel.

5. The method of claim 4, further comprising the step of:
   deactivating the inflator device; and
   continuing the actuating of the tire-wheel assembly exerciser step for continuously achieving the resonant vibrational response imparted to the tire-wheel assembly after the inflator device has been deactivated.

6. A method for processing a tire-wheel assembly including a tire and a wheel for removing entrapments between a bead seat of the wheel and bead of the tire, comprising the steps of:
   mounting a tire to a wheel for forming a tire-wheel assembly; and
   disposing a portion of a tire-wheel assembly exerciser adjacent a tread surface of the tire;
   actuating the tire-wheel assembly exerciser for achieving a resonant vibrational response imparted to the tire-wheel assembly;
   aligning a first tire-tread-engaging device of the tire-wheel assembly exerciser with a first radius that projects away from a central axis extending through an axis of rotation of the wheel;
   aligning a second tire-tread-engaging device of the tire-wheel assembly exerciser with a second radius that projects away from the central axis extending through the axis of rotation of the wheel, wherein the first radius is offset from the second radius at an angle; and
   arranging at least one of the first tire-tread-engaging device and the second tire-tread-engaging device in an activated state by repeatedly cycling a vibration source of first tire-tread-engaging device and the second tire-tread-engaging device in an on state and an off state, wherein the resonant vibrational response imparted to the tire-wheel assembly includes:
   vibrating the tire for shaping the tire to include a plurality of anti-nodes that are periodically formed about the tire with nodes that are located between adjacent anti-nodes.

7. A method for processing a tire-wheel assembly including a tire and a wheel for removing entrapments between a bead seat of the wheel and bead of the tire, comprising the steps of:
   mounting a tire to a wheel for forming a tire-wheel assembly;
   disposing tire-tread-engaging members of a tire-wheel assembly exerciser to directly contact a tread surface of the tire;
   actuating the tire-wheel assembly exerciser such that to impart periodic vibration forces to the tire-tread-engaging members for
   achieving a resonant vibrational response imparted to the tire-wheel assembly;
   utilizing the tire-wheel assembly exerciser for clamping the tire in order to prevent axial movement of the tire; and
   utilizing a wheel-engaging portion connected to the wheel for axially-adjusting an orientation of the wheel while the tire is axially-fixed as a result of the tire-wheel assembly exerciser clamping the tire.

8. The method of claim 7, wherein the axially-adjusting an orientation of the wheel step includes:
   axially moving the wheel relative the tire in a first axial direction, and
   axially moving the wheel relative the tire in a second axial direction, wherein the second axial direction is opposite the first axial direction.

9. The method of claim 7, wherein the actuating step includes
   arranging the tire-wheel assembly exerciser in an activated state, wherein the activated state includes:
   repeatedly cycling a vibration source of the tire-wheel assembly exerciser in an on state and an off state.

10. The method of claim 7, wherein the actuating the tire-wheel assembly exerciser step occurs just prior to, during or after when beads of the tire are arranged adjacent to bead seats of the wheel as a result of actuating an inflator device.

11. The method of claim 10, further comprising the step of:

deactivating the inflator device prior to utilizing the wheel-engaging portion connected to the wheel for axially-adjusting an orientation of the wheel.

12. A method for processing a tire-wheel assembly including a tire and a wheel for removing entrapments between a bead seat of the wheel and bead of the tire, comprising the steps of:
   mounting a tire to a wheel for forming a tire-wheel assembly;
   disposing a portion of a tire-wheel assembly exerciser adjacent a tread surface of the tire: actuating the tire-wheel assembly exerciser for
   achieving a resonant vibrational response imparted to the tire-wheel assembly:
   utilizing the tire-wheel assembly exerciser for clamping the tire in order to prevent axial movement of the tire;
   utilizing a wheel-engaging portion connected to the wheel for axially-adjusting an orientation of the wheel while the tire is axially-fixed as a result of the tire-wheel assembly exerciser clamping the tire;
   aligning a first tire-tread-engaging device of the tire-wheel assembly exerciser with a first radius that projects away from a central axis extending through an axis of rotation of the wheel;
   aligning a second tire-tread-engaging device of the tire-wheel assembly exerciser with a second radius that projects away from the central axis extending through the axis of rotation of the wheel, wherein the first radius is offset from the second radius at a first angle; and
   arranging the first tire-tread-engaging device in an activated state by repeatedly cycling a vibration source of first tire-tread-engaging device in an on state and an off state while the second tire-tread-engaging device passively responds to the vibration source of first tire-tread-engaging device, wherein the resonant vibrational response imparted to the tire-wheel assembly includes:
      vibrating the tire for shaping the tire to include a plurality of anti-nodes that are periodically formed about the tire with nodes that are located between adjacent anti-nodes.

13. The method of claim 12, further comprising the steps of
   aligning a third tire-tread-engaging device of the tire-wheel assembly exerciser with a third radius that projects away from the central axis extending through the axis of rotation of the wheel;
   aligning a fourth tire-tread-engaging device of the tire-wheel assembly exerciser with a fourth radius that projects away from the central axis extending through the axis of rotation of the wheel, wherein the third radius is offset from the fourth radius at a second angle; and
   arranging the third tire-tread-engaging device in an activated state by repeatedly cycling a vibration source of third tire-tread-engaging device in an on state and an off state while the fourth tire-tread-engaging device passively responds to the vibration source of third tire-tread-engaging device, wherein the resonant vibrational response imparted to the tire-wheel assembly includes:
      vibrating the tire for shaping the tire to include a plurality of anti-nodes that are periodically formed about the tire with nodes that are located between adjacent anti-nodes.

14. A method for processing a tire-wheel assembly including a tire and a wheel for removing entrapments between a bead seat of the wheel and bead of the tire, comprising the steps of:
   mounting a tire to a wheel for forming a tire-wheel assembly;
   disposing tire-tread-engaging members of a tire-wheel assembly exerciser to directly contact a tread surface of the tire;
   actuating the tire-wheel assembly exerciser such that to impart periodic vibration forces to the tire-tread-engaging members which in turn imparts vibrational force to the tire-wheel assembly in a radial direction;
   utilizing the tire-wheel assembly exerciser for axially-retaining the tire in order to prevent axial movement of the tire; and
   utilizing a wheel-engaging portion connected to the wheel for axially-adjusting the wheel while the tire is axially-fixed as a result of the tire-wheel assembly exerciser clamping the tire.

15. The method of claim 14, wherein the vibrational force imparted to the tire-wheel assembly in the radial direction achieves a resonant vibrational response imparted to the tire-wheel assembly.

16. The method of claim 15, wherein the actuating step includes
   arranging the tire-wheel assembly exerciser in an activated state, wherein the activated state includes:
      repeatedly cycling a vibration source of the tire-wheel assembly exerciser in an on state and an off state.

17. The method of claim 15, wherein the radial direction of the imparted vibrational force to the tire-wheel assembly is a radially-inwardly-directed force.

18. A method for processing a tire-wheel assembly including a tire and a wheel for removing entrapments between a bead seat of the wheel and bead of the tire, comprising the steps of:
   mounting a tire to a wheel for forming a tire-wheel assembly;
   disposing tire-tread-engaging members of a tire-wheel assembly exerciser to directly contact a tread surface of the tire;
   actuating the tire-wheel assembly exerciser such that to impart periodic vibration forces to the tire-tread-engaging members for imparting a vibrational force to the tire-wheel assembly in a radial direction, wherein the vibrational force imparted to the tire-wheel assembly in the radial direction achieves a resonant vibrational response imparted to the tire-wheel assembly;
   utilizing the tire-wheel assembly exerciser for retaining the tire in order to prevent movement of the tire; and
   utilizing a wheel-engaging portion connected to the wheel for sequencing the wheel while the tire is retained as a result of the tire-wheel assembly exerciser retaining the tire.

19. The method of claim 18, wherein the actuating step includes
   arranging the tire-wheel assembly exerciser in an activated state, wherein the activated state includes:
      repeatedly cycling a vibration source of the tire-wheel assembly exerciser in an on state and an off state.

20. The method of claim 18, wherein the radial direction of the imparted vibrational force to the tire-wheel assembly is a radially-inwardly-directed force.

* * * * *